US012601591B2

(12) United States Patent
Fujita et al.

(10) Patent No.: US 12,601,591 B2
(45) Date of Patent: Apr. 14, 2026

(54) DISTANCE MEASURING DEVICE, DISTANCE MEASURING METHOD, PROGRAM, ELECTRONIC APPARATUS, LEARNING MODEL GENERATING METHOD, MANUFACTURING METHOD, AND DEPTH MAP GENERATING METHOD

(71) Applicant: Sony Semiconductor Solutions Corporation, Kanagawa (JP)

(72) Inventors: Takafumi Fujita, Kanagawa (JP); Hiroaki Ono, Kanagawa (JP); Hironaga Sano, Kanagawa (JP); Tomoharu Mukasa, Saitama (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1035 days.

(21) Appl. No.: 17/760,897

(22) PCT Filed: Sep. 25, 2020

(86) PCT No.: PCT/JP2020/036469
§ 371 (c)(1),
(2) Date: Mar. 16, 2022

(87) PCT Pub. No.: WO2021/060539
PCT Pub. Date: Apr. 1, 2021

(65) Prior Publication Data
US 2022/0357155 A1 Nov. 10, 2022

(30) Foreign Application Priority Data

Sep. 25, 2019 (JP) ................................. 2019-174417

(51) Int. Cl.
*G01C 3/02* (2006.01)
*G01B 11/22* (2006.01)
(Continued)

(52) U.S. Cl.
CPC ................ *G01C 3/02* (2013.01); *G01B 11/22* (2013.01); *G06T 7/50* (2017.01);
(Continued)

(58) Field of Classification Search
CPC ... G01C 3/02; G01C 3/08; G01C 3/06; G01B 11/22; G06T 7/50; G06T 2207/10028;
(Continued)

(56) References Cited

U.S. PATENT DOCUMENTS

2008/0143856 A1 6/2008 Pinto
2009/0016638 A1* 1/2009 Nagatsuma .......... H04N 25/683
382/275
(Continued)

FOREIGN PATENT DOCUMENTS

CN 102055918 A 5/2011
CN 102132147 A 7/2011
(Continued)

OTHER PUBLICATIONS

International Search Report (PCT/ISA/210), International Application No. PCT/JP2020/036469, dated Dec. 7, 2020.
(Continued)

*Primary Examiner* — Stephen P Coleman
(74) *Attorney, Agent, or Firm* — Michael Best & Friedrich LLP

(57) ABSTRACT

The present technology relates to a distance measuring device, a distance measuring method, a program, an electronic apparatus, a learning model generating method, a manufacturing method, and a depth map generating method that are designed to enable distance measurement with higher precision.
The distance measuring device includes: a first determination unit that determines whether or not the difference in depth value between a first pixel in a depth map and a second (Continued)

pixel adjacent to the first pixel is larger than a first threshold; and a second determination unit that determines whether or not the difference in confidence between the first pixel and the second pixel is larger than a second threshold, in a case where the first determination unit determines that the difference in distance between the first pixel and the second pixel is larger than the first threshold. In a case where the second determination unit determines that the difference in confidence between the first pixel and the second pixel is larger than the second threshold, the first pixel is confirmed to be a defective pixel. The present technology can be applied to a distance measuring device, for example.

18 Claims, 43 Drawing Sheets

(51) Int. Cl.
  *G06T 7/50*      (2017.01)
  *H04N 25/77*     (2023.01)
(52) U.S. Cl.
  CPC ............... *G06T 2207/10028* (2013.01); *G06T 2207/20081* (2013.01); *G06T 2207/20084* (2013.01); *H04N 25/77* (2023.01)
(58) Field of Classification Search
  CPC ........... G06T 2207/20081; G06T 2207/20084; H04N 25/77; G01S 17/894; G01S 7/497; G01S 17/931; G01S 17/933; G01S 17/89
  USPC ........................................................ 382/106
  See application file for complete search history.

(56)               References Cited

U.S. PATENT DOCUMENTS

| | | | |
|---|---|---|---|
| 2011/0102649 | A1 | 5/2011 | Hashizume |
| 2015/0092017 | A1 | 4/2015 | Kang et al. |
| 2017/0257583 | A1 | 9/2017 | Yoshimura |

FOREIGN PATENT DOCUMENTS

| | | | |
|---|---|---|---|
| CN | 103814306 | A | 5/2014 |
| CN | 107147858 | A | 9/2017 |
| CN | 108432244 | A | 8/2018 |
| CN | 110400340 | A | 11/2019 |
| DE | 102018107801 | A1 | 10/2018 |
| DE | 112019000317 | T5 | 10/2020 |
| JP | 2012078942 | A | 4/2012 |
| JP | 2014506768 | A | 3/2014 |
| JP | 2014524016 | A | 9/2014 |
| JP | 2016090268 | A | 5/2016 |
| JP | 2020155116 | A | 9/2020 |

OTHER PUBLICATIONS

Su, Shuochen; Heide, Felix; Wetzstein, Gordon; Heidrich, Wolfgang, "Deep End-to-End Time-of-Flight Imaging", 2018 IEEE/CVF Conference on Computer Vision and Pattern Recognition, 2018.12. 17, pp. 6383-6392, DOI: 10. 1109/CVPR.2018.00668.

Zhao, Yin; Zhu, Ce; Chen, Zhenzhong; Tian, Dong; Yu, Lu, "Boundary Artifact Reduction in View Synthesis of 3D Video: From Perspective of Texture-Depth Alignment", IEEE Transactions on Broadcasting, 2011.05.25, vol. 57, No. 2, pp. 510-522, DOI: 11. 1109/TBC. 2011. 2120730.

* cited by examiner

LIGHT
EMISSION

PHASE DELAY
0 DEGREES

90 DEGREES

180 DEGREES

270 DEGREES

LIGHT
RECEPTION

*FIG. 11*

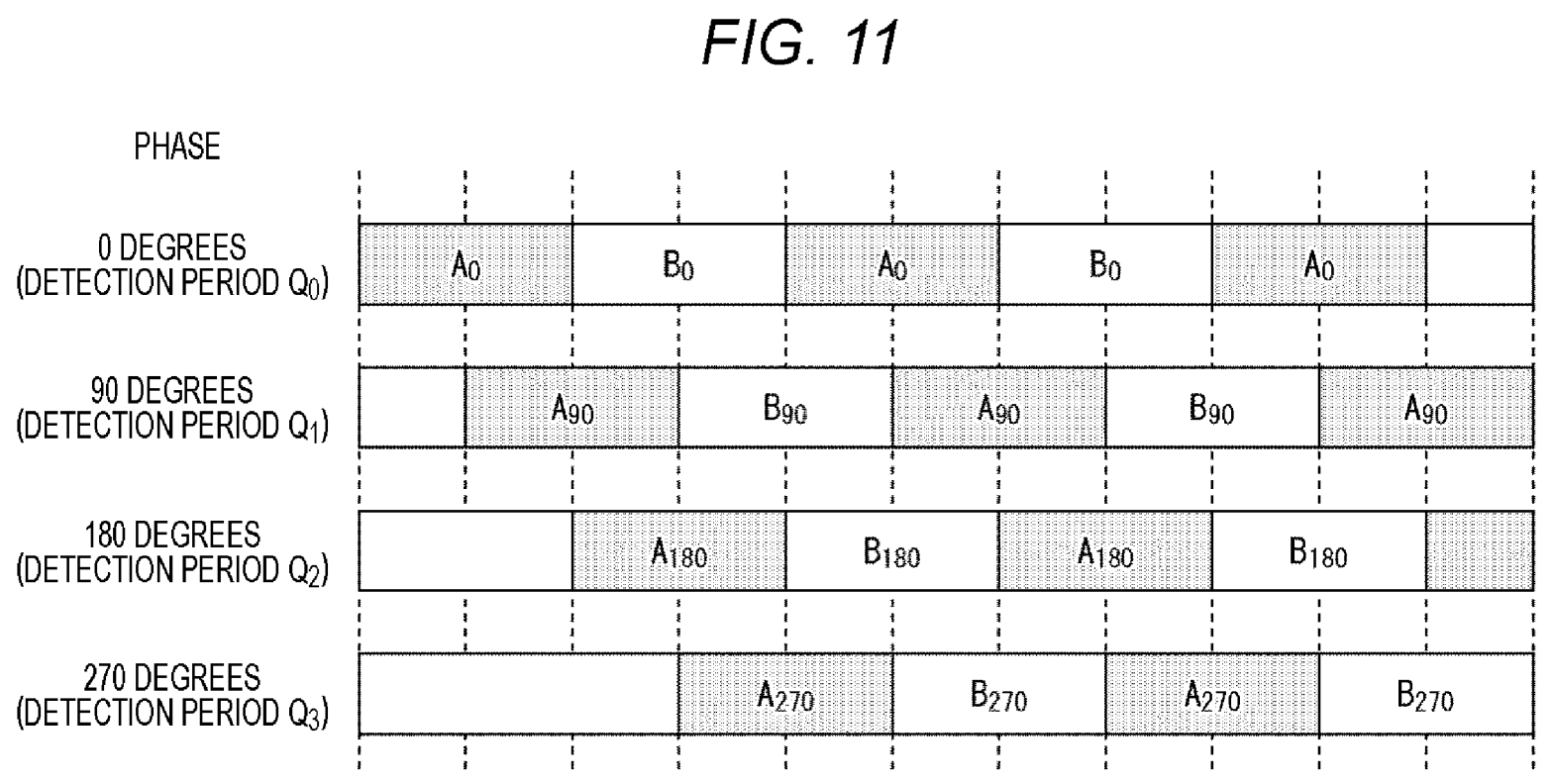

| PHASE | | | | | | | | |
|---|---|---|---|---|---|---|---|---|
| 0 DEGREES (DETECTION PERIOD $Q_0$) | $A_0$ | $B_0$ | $A_0$ | $B_0$ | $A_0$ | $B_0$ | $A_0$ | |
| 90 DEGREES (DETECTION PERIOD $Q_1$) | $A_{90}$ | $B_{90}$ | $A_{90}$ | $B_{90}$ | $A_{90}$ | $B_{90}$ | $A_{90}$ | |
| 180 DEGREES (DETECTION PERIOD $Q_2$) | $A_{180}$ | $B_{180}$ | $A_{180}$ | $B_{180}$ | $A_{180}$ | $B_{180}$ | | |
| 270 DEGREES (DETECTION PERIOD $Q_3$) | $A_{270}$ | $B_{270}$ | $A_{270}$ | $B_{270}$ | $A_{270}$ | $B_{270}$ | | |

DISTANCE MEASUREMENT
INFORMATION PROCESSING START

ACQUIRE DISTANCE
MEASUREMENT INFORMATION                S171

LEARNING MODEL
USAGE PROCESS                          S172

GENERATE THREE-DIMENSIONAL DATA,      S173
ON BASIS OF CORRECTED DEPTH MAP

OUTPUT THREE-DIMENSIONAL DATA          S174

END

701

LEARNING DEVICE 703          704

GENERATION    OUTPUT
UNIT          UNIT

DEFECTIVE PIXEL IDENTIFYING PROCESS START

INPUT DEPTH MAP INCLUDING DEFECTIVE PIXEL TO INPUT LAYER OF NEURAL NETWORK TO WHICH AUTOENCODER IS APPLIED, AND OUTPUT CORRECTED DEPTH MAP FROM OUTPUT LAYER   S311

IDENTIFY DEFECTIVE PIXEL, ON BASIS OF POSITIONAL INFORMATION IN DEPTH MAP   S312

RETURN

LEARNING PROCESS
START

ACQUIRE TRAINING DATA  S411

GENERATE LEARNING MODEL USING TRAINING DATA,
WITH INPUT BEING DEPTH MAP INCLUDING DEFECTIVE PIXEL
AND POSITIONAL INFORMATION ABOUT DEFECTIVE PIXEL,
OUTPUT BEING CORRECTED DEPTH MAP OR POSITIONAL
INFORMATION ABOUT CORRECTED DEFECTIVE PIXEL  S412

OUTPUT LEARNING MODEL  S413

END

Figure 41:
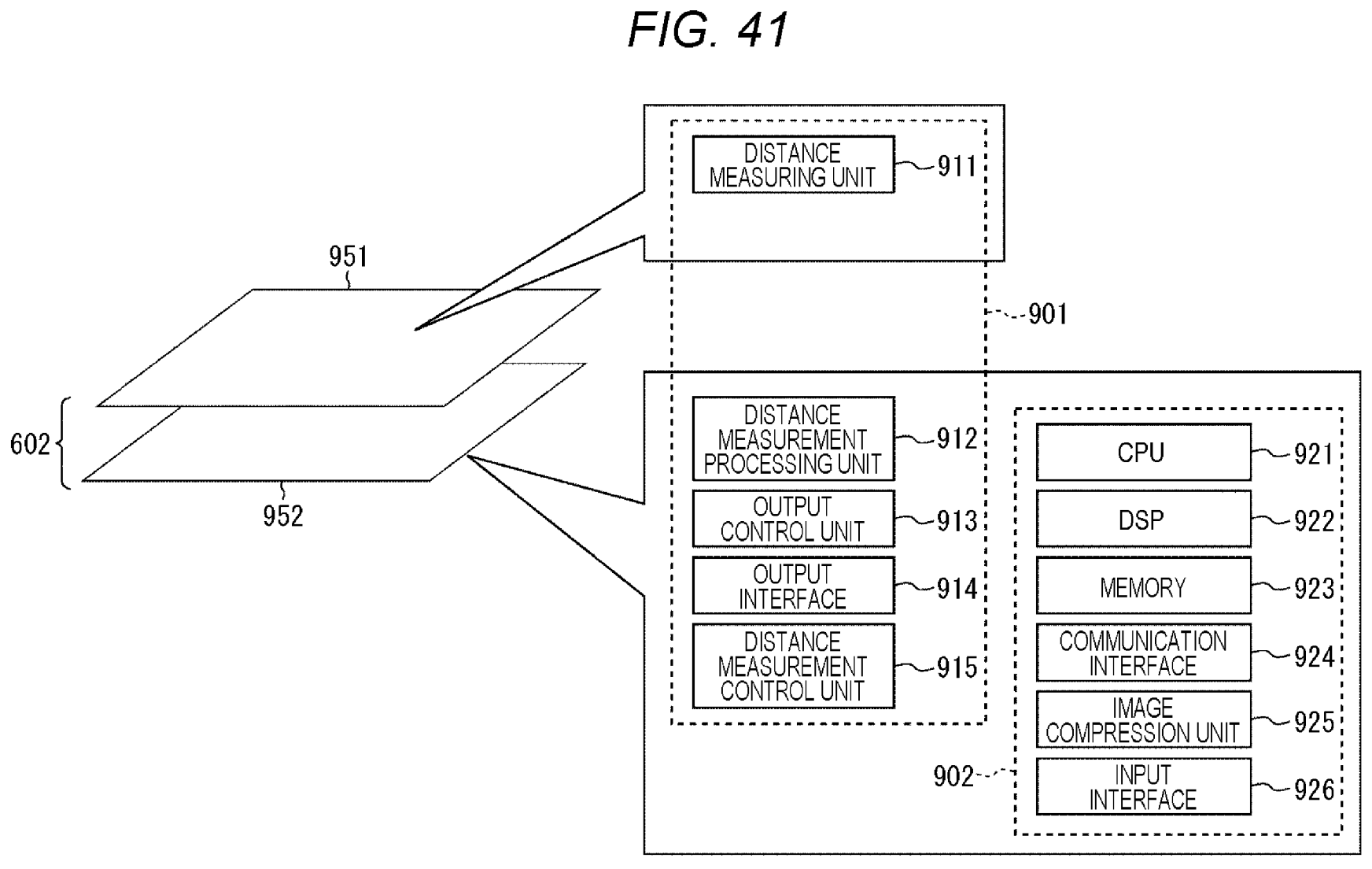

| | |
|---|---|
| 921 | CPU |
| 922 | DSP |
| 923 | MEMORY |
| 924 | COMMUNICATION INTERFACE |
| 925 | IMAGE COMPRESSION UNIT |
| 926 | INPUT INTERFACE |

902

901

| | |
|---|---|
| 911 | DISTANCE MEASURING UNIT |
| 912 | DISTANCE MEASUREMENT PROCESSING UNIT |
| 913 | OUTPUT CONTROL UNIT |
| 914 | OUTPUT INTERFACE |
| 915 | DISTANCE MEASUREMENT CONTROL UNIT |

Figure 45:
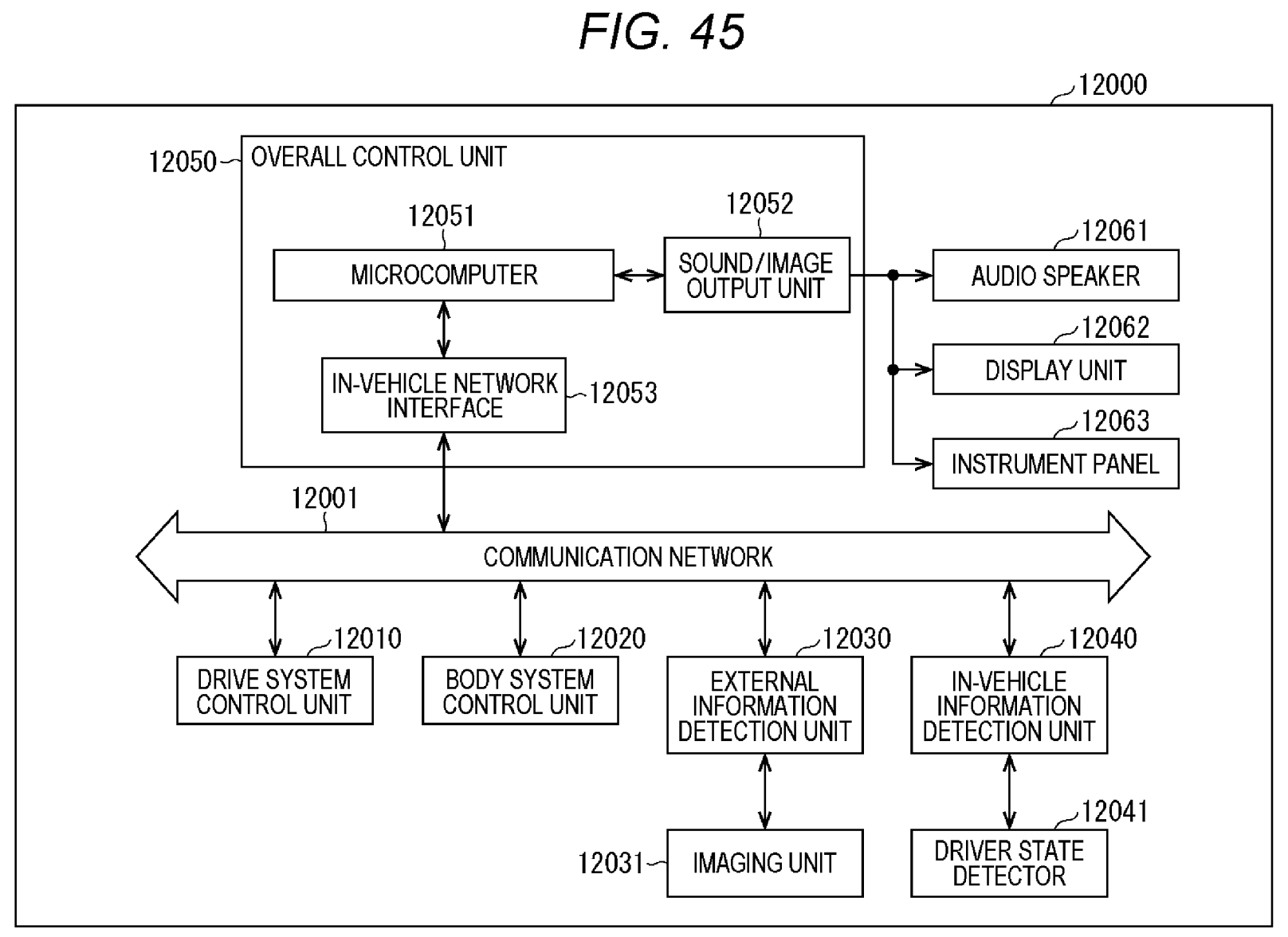

12050 — OVERALL CONTROL UNIT

12051 — MICROCOMPUTER

12052 — SOUND/IMAGE OUTPUT UNIT

12053 — IN-VEHICLE NETWORK INTERFACE

12061 — AUDIO SPEAKER

12062 — DISPLAY UNIT

12063 — INSTRUMENT PANEL

12001 — COMMUNICATION NETWORK

12010 — DRIVE SYSTEM CONTROL UNIT

12020 — BODY SYSTEM CONTROL UNIT

12030 — EXTERNAL INFORMATION DETECTION UNIT

12031 — IMAGING UNIT

12040 — IN-VEHICLE INFORMATION DETECTION UNIT

12041 — DRIVER STATE DETECTOR

DISTANCE MEASURING DEVICE, DISTANCE MEASURING METHOD, PROGRAM, ELECTRONIC APPARATUS, LEARNING MODEL GENERATING METHOD, MANUFACTURING METHOD, AND DEPTH MAP GENERATING METHOD

TECHNICAL FIELD

The present technology relates to a distance measuring device, a distance measuring method, a program, an electronic apparatus, a learning model generating method, a manufacturing method, and a depth map generating method. More particularly, the present technology relates to a distance measuring device, a distance measuring method, a program, an electronic apparatus, a learning model generating method, a manufacturing method, and a depth map generating method that are designed to detect false distance measurement results with high precision, for example.

BACKGROUND ART

In recent years, distance measuring devices that measure distances to objects have become smaller and smaller with the progress of semiconductor technology. As a result, distance measuring devices are actually mounted on mobile terminals such as so-called smartphones, which are small information processing devices having communication functions, for example. Examples of distance measuring devices (sensors) that measure distances to objects include a time of flight (TOF) sensor (see Patent Document 1, for example).

CITATION LIST

Patent Document

Patent Document 1: Japanese Patent Application Laid-Open No. 2016-090268

SUMMARY OF THE INVENTION

Problems to be Solved by the Invention

In a case where there is a false distance measurement result, the false distance measurement result is preferably detected with high precision, so that the accuracy of the distance measurement is improved as desired.

The present technology has been made in view of such circumstances, and aims to enable accurate detection of false distance measurement results.

Solutions to Problems

A first distance measuring device according to one aspect of the present technology includes: a first determination unit that determines whether or not the difference in depth value between a first pixel in a depth map and a second pixel adjacent to the first pixel is larger than a first threshold; and a second determination unit that determines whether or not the difference in confidence between the first pixel and the second pixel is larger than a second threshold, in a case where the first determination unit determines that the difference in distance between the first pixel and the second pixel is larger than the first threshold. In case where the second determination unit determines that the difference in confidence between the first pixel and the second pixel is larger than the second threshold, the first pixel is confirmed to be a defective pixel.

A second distance measuring device according to one aspect of the present technology includes: a first determination unit that determines whether or not the difference in depth value between a first pixel in a depth map and a second pixel adjacent to the first pixel is larger than a first threshold; and a second determination unit that determines whether or not the difference in reflectance between the first pixel and the second pixel is larger than a second threshold, in a case where the first determination unit determines that the difference in distance between the first pixel and the second pixel is larger than the first threshold. In case where the second determination unit determines that the difference in reflectance between the first pixel and the second pixel is larger than the second threshold, the first pixel is confirmed to be a defective pixel.

A first distance measuring method according to one aspect of the present technology is implemented by a distance measuring device that performs distance measurement, and includes: determining whether or not the difference in depth value between a first pixel in a depth map and a second pixel adjacent to the first pixel is larger than a first threshold; determining whether or not the difference in confidence between the first pixel and the second pixel is larger than a second threshold, in a case where the difference in distance between the first pixel and the second pixel is determined to be larger than the first threshold; and confirming the first pixel to be a defective pixel, in a case where the difference in confidence between the first pixel and the second pixel is determined to be larger than the second threshold.

A second distance measuring method according to one aspect of the present technology is implemented by a distance measuring device that performs distance measurement, and includes: determining whether or not the difference in depth value between a first pixel in a depth map and a second pixel adjacent to the first pixel is larger than a first threshold; determining whether or not the difference in reflectance between the first pixel and the second pixel is larger than a second threshold, in a case where the difference in distance between the first pixel and the second pixel is determined to be larger than the first threshold; and confirming the first pixel to be a defective pixel, in a case where the difference in reflectance between the first pixel and the second pixel is determined to be larger than the second threshold.

A first program according to one aspect of the present technology is for causing a computer to perform a process that includes the steps of: determining whether or not the difference in depth value between a first pixel in a depth map and a second pixel adjacent to the first pixel is larger than a first threshold; determining whether or not the difference in confidence between the first pixel and the second pixel is larger than a second threshold, in a case where the difference in distance between the first pixel and the second pixel is determined to be larger than the first threshold; and confirming the first pixel to be a defective pixel, in a case where the difference in confidence between the first pixel and the second pixel is determined to be larger than the second threshold.

A second program according to one aspect of the present technology is for causing a computer to perform a process that includes the steps of: determining whether or not the difference in depth value between a first pixel in a depth map and a second pixel adjacent to the first pixel is larger than a first threshold; determining whether or not the difference in reflectance between the first pixel and the second pixel is larger than a second threshold, in a case where the difference in distance between the first pixel and the second pixel is determined to be larger than the first threshold; and confirming the first pixel to be a defective pixel, in a case where the difference in reflectance between the first pixel and the second pixel is determined to be larger than the second threshold.

In the first distance measuring device, distance measuring method, and program according to one aspect of the present technology, in a case where the difference in depth value between a first pixel in a depth map and a second pixel adjacent to the first pixel is determined to be larger than a first threshold, a check is further made to determine whether or not the difference in confidence between the first pixel and the second pixel is larger than a second threshold. In a case where the difference in confidence between the first pixel and the second pixel is determined to be larger than the second threshold, the first pixel is then confirmed to be a defective pixel.

In the second distance measuring device, distance measuring method, and program according to one aspect of the present technology, in a case where the difference in depth value between a first pixel in a depth map and a second pixel adjacent to the first pixel is determined to be larger than a first threshold, a check is further made to determine whether or not the difference in reflectance between the first pixel and the second pixel is larger than a second threshold. In a case where the difference in reflectance between the first pixel and the second pixel is determined to be larger than the second threshold, the first pixel is then confirmed to be a defective pixel.

An electronic apparatus according to one aspect of the present technology includes a sensor that performs a process using a machine-learned learning model on at least part of first distance measurement information acquired by the sensor, and outputs second distance measurement information after a correction target pixel included in the first distance measurement information is corrected. The process includes: a first process for correcting the correction target pixel, using the first distance measurement information including the correction target pixel as an input; and a second process for outputting the second distance measurement information.

In the electronic apparatus according to one aspect of the present technology, when second distance measurement information is output after a correction target pixel included in first distance measurement information is corrected by a process using a machine-learned learning model on at least part of the first distance measurement information acquired by the sensor, a first process for correcting the correction target pixel using the first distance measurement information including the correction target pixel as an input, and a second process for outputting the second distance measurement information are performed.

A first learning model generating method according to one aspect of the present technology includes: acquiring training data including a depth map that is a depth map including a correction target pixel, the position of the correction target pixel having been identified in the depth map; and generating a learning model using the training data, the learning model receiving an input of the depth map including the correction target pixel and outputting positional information about the correction target pixel included in the depth map.

In the first learning model generating method according to one aspect of the present technology, training data including a depth map including a correction target pixel whose position has been identified in the depth map is acquired, and a learning model is generated with the use of the training data, the learning model receiving an input of the depth map including the correction target pixel and outputting positional information about the correction target pixel included in the depth map.

A second learning model generating method according to one aspect of the present technology includes: acquiring training data that includes a depth map including a correction target pixel and positional informational about the correction target pixel, and a corrected depth map or positional informational about a corrected correction target pixel; and generating a learning model using the training data, the learning model receiving an input of the depth map including the correction target pixel and the positional information about the correction target pixel, and outputting the corrected depth map or the positional information about the corrected correction target pixel.

In the second learning model generating method according to one aspect of the present technology, training data that includes a depth map including a correction target pixel and positional informational about the correction target pixel, and a corrected depth map or positional informational about a corrected correction target pixel is acquired, and a learning model is generated with the use of the training data, the learning model receiving an input of the depth map including the correction target pixel and the positional information about the correction target pixel, and outputting the corrected depth map or the positional information about the corrected correction target pixel.

A depth map generating method according to one aspect of the present technology is implemented by a distance measuring device that performs distance measurement, and includes: determining whether or not the difference in distance between a first pixel in a depth map and a second pixel adjacent to the first pixel is larger than a first threshold; determining whether or not the difference in confidence or reflectance between the first pixel and the second pixel is larger than a second threshold, in a case where the difference in distance between the first pixel and the second pixel is determined to be larger than the first threshold; confirming the first pixel to be a correction target pixel, in a case where the difference in confidence or reflectance between the first pixel and the second pixel is determined to be larger than the second threshold; and generating a depth map in which the confirmed correction target pixel has been corrected.

In the depth map generating method according to one aspect of the present technology, a check is made to determine whether or not the difference in distance between a first pixel in a depth map and a second pixel adjacent to the first pixel is larger than a first threshold; a check is made to determine whether or not the difference in confidence or reflectance between the first pixel and the second pixel is larger than a second threshold, in a case where the difference in distance between the first pixel and the second pixel is determined to be larger than the first threshold; the first pixel is confirmed to be a correction target pixel, in a case where the difference in confidence or reflectance between the first pixel and the second pixel is determined to be larger than the second threshold; and a depth map in which the confirmed correction target pixel has been corrected is generated.

Note that the distance measuring devices and electronic apparatuses may be independent devices, or may be internal blocks in one apparatus.

Further, the program to be provided may be transmitted via a transmission medium or may be recorded on a recording medium.

BRIEF DESCRIPTION OF DRAWINGS

FIG. 11 is a chart for explaining the relationship between detection periods and detection signals.

FIG. 22 is a block diagram showing an example configuration of an electronic apparatus.

FIG. 23 is a block diagram showing an example configuration of a personal computer.

FIG. 40 is a diagram showing an example of the processing unit that performs a machine learning process.

FIG. 41 is a perspective view of an example external configuration of a sensor.

FIG. 43 is a diagram showing an example schematic configuration of an endoscopic surgery system.

FIG. 45 is a block diagram showing an example schematic configuration of a vehicle control system.

MODES FOR CARRYING OUT THE INVENTION

The following is a description of modes (hereinafter referred to as embodiments) for carrying out the present technology.

The present technology can be applied to light receiving elements constituting a distance measuring system that performs distance measurement by an indirect TOF method, for example, and to an imaging device and the like including such light receiving elements.

For example, a distance measuring system can be applied to an in-vehicle system that is mounted on a vehicle and measures the distance to a target object outside the vehicle, a gesture recognizing system that measures the distance to a target object such as the user's hand and recognizes a gesture of the user on the basis of the result of the measurement, and the like. In this case, the result of the gesture recognition can be used in an operation of a car navigation system or the like, for example.

Example Configuration of a Distance Measuring Device

Figure 1:
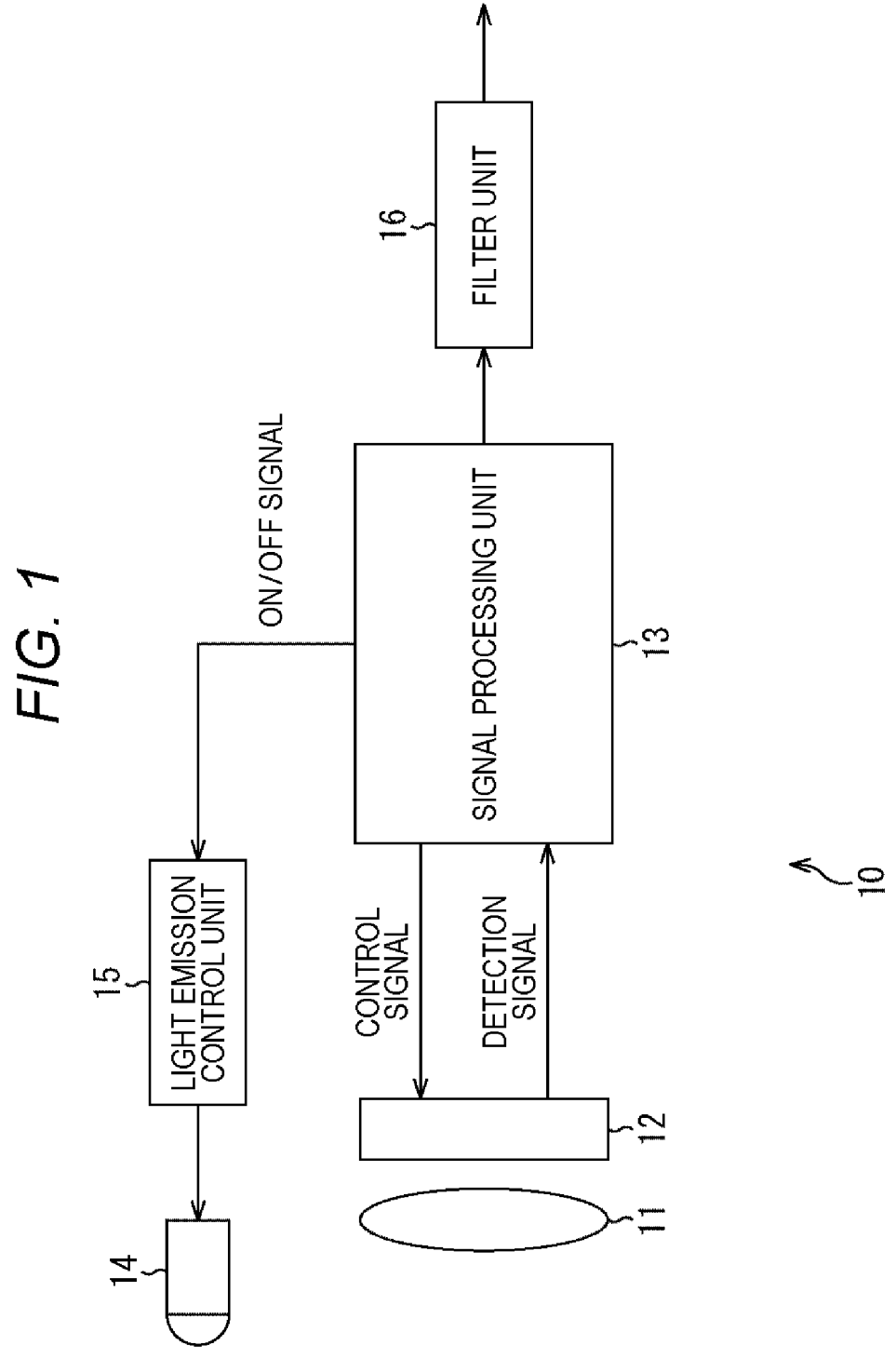
FIG. 1 is a diagram showing the configuration of an embodiment of a distance measuring device to which the present technology is applied.

FIG. 1 is a diagram showing an example configuration of an embodiment of a distance measuring device to which the present technology is applied.

A distance measuring device 10 includes a lens 11, a light receiving unit 12, a signal processing unit 13, a light emitting unit 14, a light emission control unit 15, and a filter unit 16. The distance measuring device 10 in FIG. 1 irradiates an object with light, and receives light (reflected light)

that is the light (irradiation light) reflected by the object, to measure the distance to the object.

The light emission system of the distance measuring device 10 is formed with the light emitting unit 14 and the light emission control unit 15. In the light emission system, the light emission control unit 15 causes the light emitting unit 14 to emit infrared light (IR), under the control of the signal processing unit 13. An IR band filter may be provided between the lens 11 and the light receiving unit 12, and the light emitting unit 14 may emit infrared light corresponding to the transmission wavelength band of the IR band filter.

The light emitting unit 14 may be disposed in the housing of the distance measuring device 10, or may be disposed outside the housing of the distance measuring device 10. The light emission control unit 15 causes the light emitting unit 14 to emit light at a predetermined frequency.

The signal processing unit 13 functions as a calculation unit that calculates the distance (depth value) from the distance measuring device 10 to an object, on the basis of a detection signal (pixel data) supplied from the light receiving unit 12, for example. The signal processing unit 13 generates a depth map in which the depth value (depth information) is stored as the pixel value of each pixel 50 (FIG. 2) of the light receiving unit 12, and outputs the depth map to the filter unit 16. The signal processing unit 13 also calculates the confidence of the depth value calculated with respect to each pixel 50 of the light receiving unit 12, generates a confidence map storing the confidence (luminance information) as the pixel value of each pixel 50 of the light receiving unit 12, and outputs the confidence map to the filter unit 16.

<Configuration of an Imaging Element>

Figure 2:
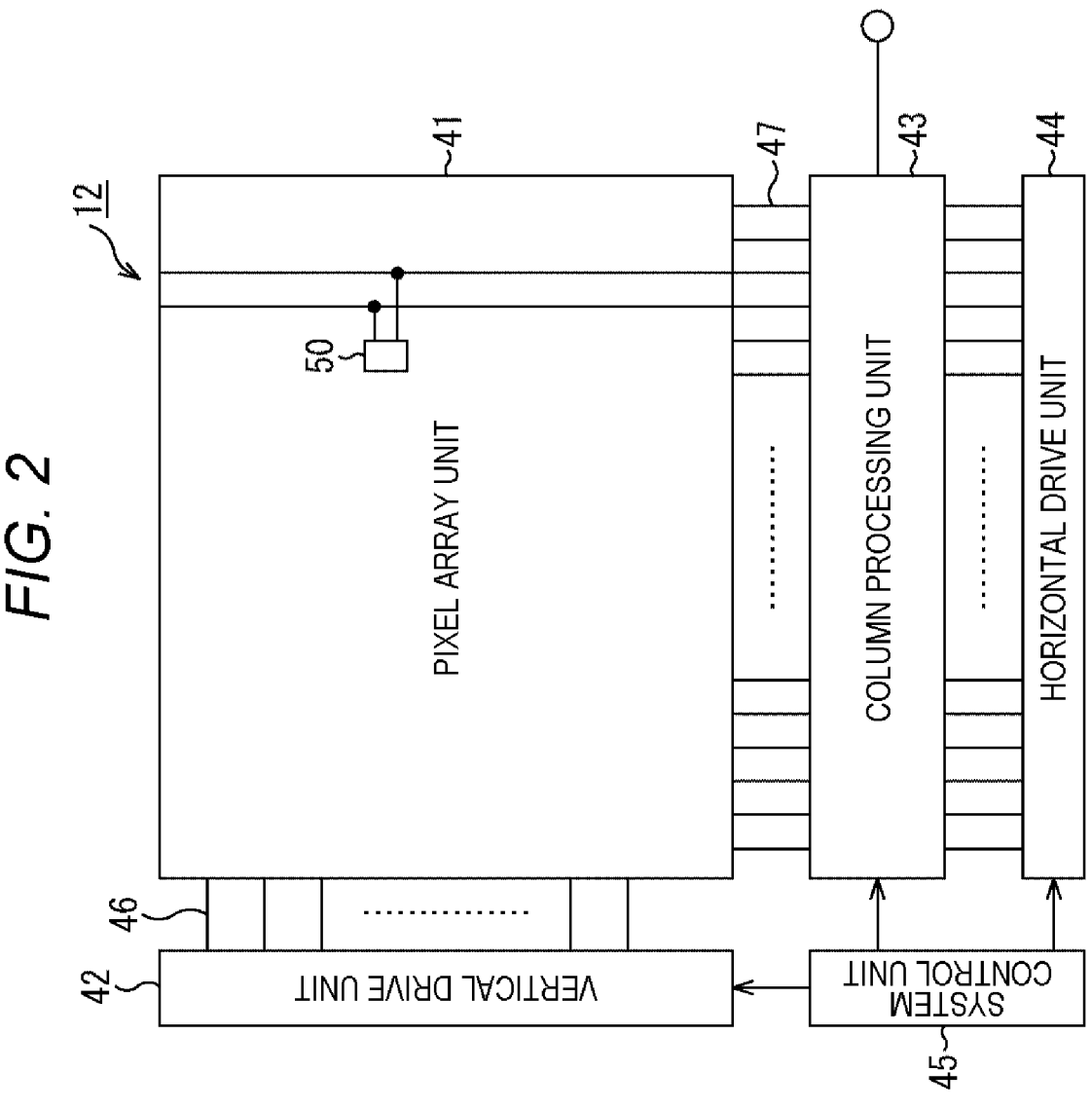
FIG. 2 is a diagram showing an example configuration of a light receiving unit.

FIG. 2 is a block diagram showing an example configuration of the light receiving unit 12. The light receiving unit 12 can be a complementary metal oxide semiconductor (CMOS) image sensor.

The light receiving unit 12 includes a pixel array unit 41, a vertical drive unit 42, a column processing unit 43, a horizontal drive unit 44, and a system control unit 45. The pixel array unit 41, the vertical drive unit 42, the column processing unit 43, the horizontal drive unit 44, and the system control unit 45 are formed on a semiconductor substrate (a chip) that is not shown in the drawing.

In the pixel array unit 41, unit pixels (pixels 50 in FIG. 3, for example) having photoelectric conversion elements that generate and store therein photoelectric charges of a charge amount corresponding to an amount of incident light are two-dimensionally arranged in a matrix. Note that, in the description below, a photoelectric charge of a charge amount corresponding to an amount of incident light may be simply referred to as an "electric charge", and a unit pixel may be simply referred to as a "pixel".

In the matrix-like pixel array of the pixel array unit 41, pixel drive lines 46 are further formed for the respective rows in the transverse direction (the array direction of the pixels in the pixel rows) in the drawing, and vertical signal lines 47 are formed for the respective columns in the vertical direction (the array direction of the pixels in the pixel columns) in the drawing. One end of each pixel drive line 46 is connected to the output end of the vertical drive unit 42 corresponding to the respective rows.

The vertical drive unit 42 is a pixel drive unit that is formed with a shift register, an address decoder, and the like, and drives the respective pixels in the pixel array unit 41 collectively or row by row, for example. Pixel signals that are output from the respective unit pixels of a pixel row selected and scanned by the vertical drive unit 42 are input to the column processing unit 43 through the respective vertical signal lines 47. For the respective pixel columns of the pixel array unit 41, the column processing unit 43 performs predetermined signal processing on pixel signals that are output from the respective unit pixels of a selected row through the vertical signal lines 47, and temporarily holds the pixel signals subjected to the signal processing.

Specifically, the column processing unit 43 performs at least a denoising process such as a correlated double sampling (CDS) process, for example, as the signal processing. Through this correlated double sampling performed by the column processing unit 43, reset noise and the fixed pattern noise unique to the pixels, such as a threshold variation among amplification transistors, are removed. Note that the column processing unit 43 can be made not only to perform the denoising process but also to have an analog-digital (AD) conversion function, for example, and output signal levels as digital signals.

The horizontal drive unit 44 is formed with a shift register, an address decoder, and the like, and sequentially selects the unit circuits corresponding to the pixel columns of the column processing unit 43. As a result of this selective scanning by the horizontal drive unit 44, the pixel signals subjected to the signal processing by the column processing unit 43 are sequentially output to the signal processing unit 48.

The system control unit 45 is formed with a timing generator or the like that generates various timing signals, and performs drive control on the vertical drive unit 42, the column processing unit 43, the horizontal drive unit 44, and the like, on the basis of the various timing signals generated by the timing generator.

In the matrix-like pixel array of the pixel array unit 41, the pixel drive lines 46 are provided in the row direction in the respective pixel rows, and two vertical signal lines 47 are provided in the column direction in each pixel column. For example, the pixel drive lines 46 transmit drive signals for performing driving when signals are read from the pixels. Note that, in FIG. 2, each pixel drive line 46 is shown as one wiring line, but is not necessarily one wiring line. One end of each pixel drive line 46 is connected to the output end of the vertical drive unit 42 corresponding to the respective rows.

<Structure of the Unit Pixels>

Next, a specific structure of the unit pixels 50 arranged in a matrix in the pixel array unit 41 is described.

A pixel 50 includes a photodiode 61 (hereinafter referred to as a PD 61) that is a photoelectric conversion element, and is designed so that electric charges generated in the PD 61 are distributed to a tap 51-1 and a tap 51-2. Of the electric charges generated in the PD 61, the electric charge distributed to the tap 51-1 is then read out from a vertical signal line 47-1 and is output as a detection signal SIG1. Also, the electric charge distributed to the tap 51-2 is read out from a vertical signal line 47-2 and is output as a detection signal SIG2.

The tap 51-1 includes a transfer transistor 62-1, a floating diffusion (FD) 63-1, a reset transistor 64, an amplification transistor 65-1, and a selection transistor 66-1. Likewise, the tap 51-2 includes a transfer transistor 62-2, an FD 63-2, the reset transistor 64, an amplification transistor 65-2, and a selection transistor 66-2.

Figure 3:
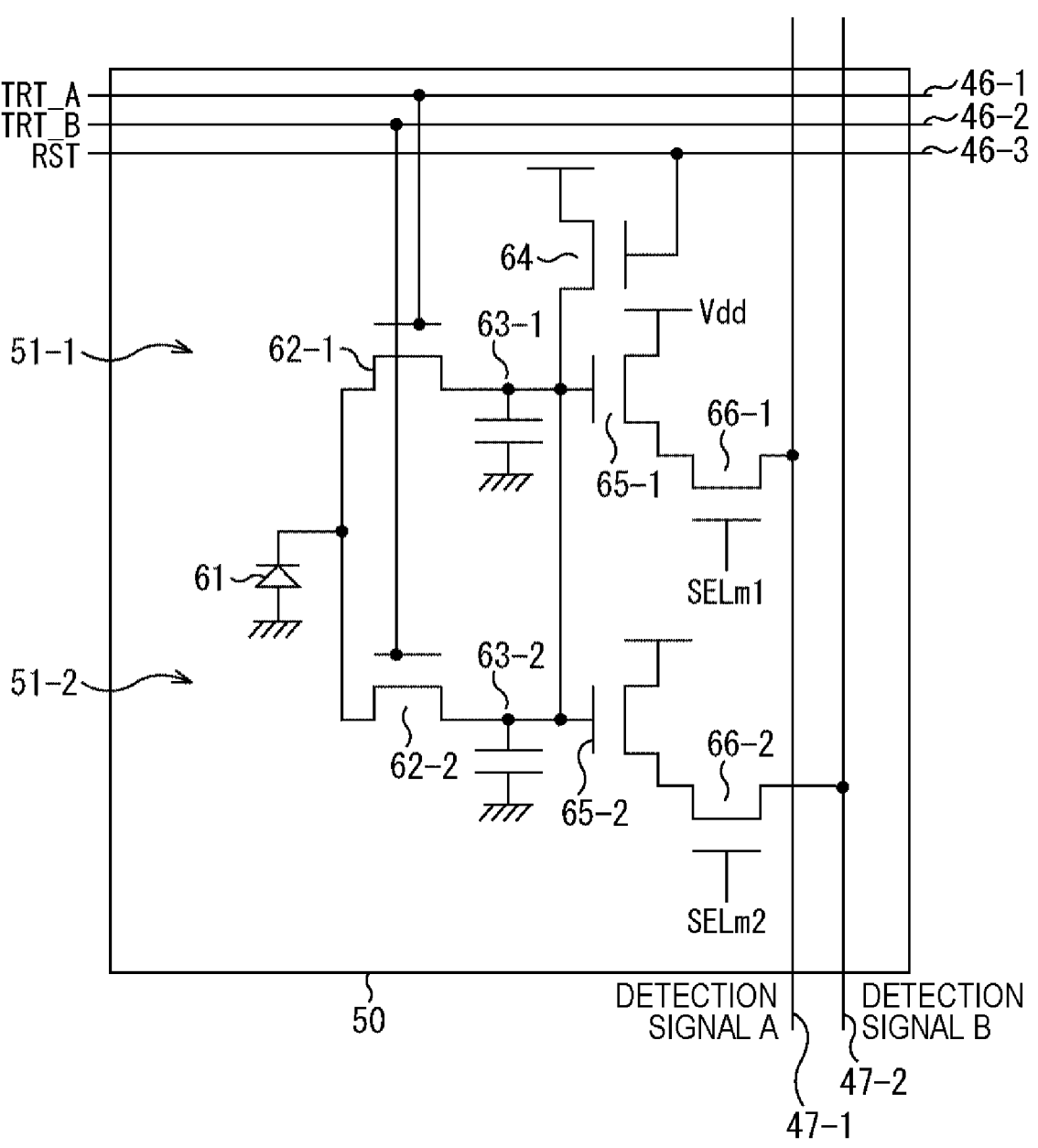
FIG. 3 is a diagram showing an example configuration of a pixel.

Note that, as shown in FIG. 3, the reset transistor 64 may be shared by the FD 63-1 and the FD 63-2, or may be provided in each of the FD 63-1 and the FD 63-2.

In a case where a reset transistor 64 is provided in each of the FD 63-1 and the FD 63-2, the reset timing can be controlled individually for each of the FD 63-1 and the FD 63-2, and thus, finer control can be performed. In a case where a reset transistor 64 common to the FD 63-1 and the FD 63-2 is provided, the reset timing can be made the same between the FD 63-1 and the FD 63-2, the control is simplified, and the circuit configuration can also be simplified.

In the example case described below, the reset transistor 64 common to the FD 63-1 and the FD 63-2 is adopted.

Figure 4:
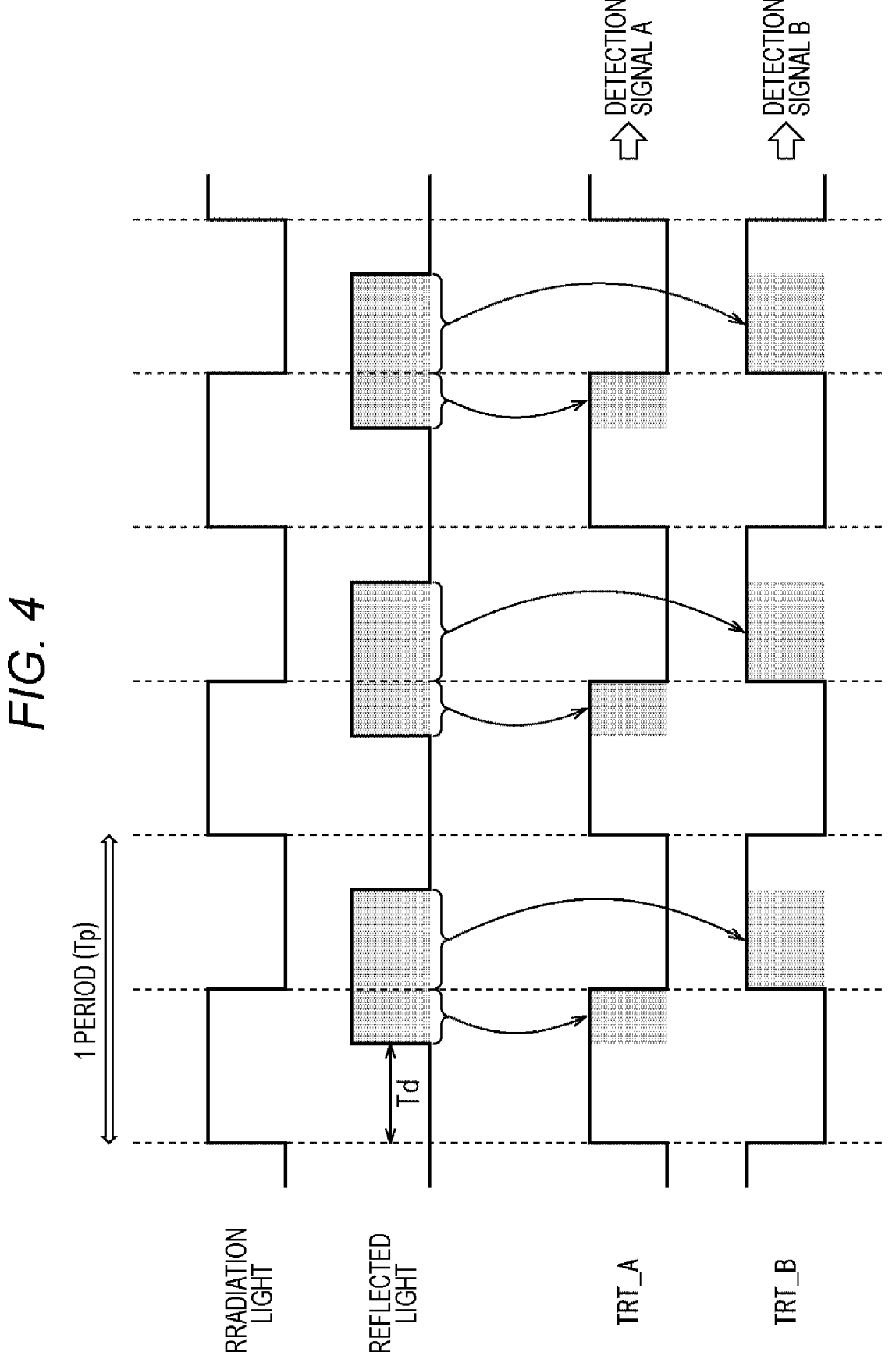
FIG. 4 is a chart for explaining distribution of electric charges in a pixel.

Referring now to FIG. 4, the distribution of electric charges in a pixel 50 is described. Here, the distribution means that the electric charges accumulated in a pixel 50 (PD 61) are read at different timings to perform reading for the respective taps.

As shown in FIG. 4, irradiation light modulated (one cycle=Tp) so as to repeatedly switch on/off irradiation within the irradiation time is output from the light emitting unit 14, and reflected light is received by the PD 61, with a delay time Td depending on the distance to an object.

A transfer control signal TRT_A controls switching on/off of the transfer transistor 62-1, and a transfer control signal TRT_B controls switching on/off of the transfer transistor 62-2. As shown in the drawing, while the transfer control signal TRT_A is in the same phase as the irradiation light, the transfer control signal TRT_B is in a phase that is the inversion of the transfer control signal TRT_A.

Accordingly, while the transfer transistor 62-1 is on in accordance with the transfer control signal TRT_A, electric charges generated by the photodiode 61 receiving reflected light is transferred to the FD portion 63-1. On the other hand, while the transfer transistor 62-2 is on in accordance with the transfer control signal TRT_B, the electric charges are transferred to the FD portion 63-2. As a result, in a predetermined period during which irradiation light with the irradiation time T is periodically emitted, the electric charges transferred via the transfer transistor 62-1 are sequentially accumulated in the FD portion 63-1, and the electric charges transferred via the transfer transistor 62-2 are sequentially accumulated in the FD portion 63-2.

Further, when the selection transistor 66-1 is turned on in accordance with a selection signal SELm1 after the end of the period during which electric charges are accumulated, the electric charges accumulated in the FD portion 63-1 are read out via the vertical signal line 47-1, and the detection signal A corresponding to the charge amount is output from the light receiving unit 12. Likewise, when the selection transistor 66-2 is turned on in accordance with a selection signal SELm2, the electric charges accumulated in the FD portion 63-2 are read out via the vertical signal line 47-2, and the detection signal B corresponding to the charge amount is output from the light receiving unit 12.

The electric charges accumulated in the FD portion 63-1 are released when the reset transistor 64 is turned on in accordance with a reset signal RST. Likewise, the electric charges accumulated in the FD portion 63-2 are released when the reset transistor 64 is turned on in accordance with the reset signal RST.

As described above, the pixel 50 can distribute the electric charges generated by the photodiode 61 receiving the reflected light to the tap 51-1 and the tap 51-2 in accordance with the delay time Td, and output the detection signal A and the detection signal B. Further, the delay time Td corresponds to the time in which light emitted by the light emitting unit 14 flies to the object, is reflected by the object, and then flies to the light receiving unit 12, which is the distance to the object. Thus, the distance measuring device

10 can calculate the distance (depth) to the object from the delay time Td, on the basis of the detection signal A and the detection signal B.

<Distance Measurement, with the Phase Shifted on the Light Receiving Side>

Referring now to FIGS. 5 to 9, a case where the reception side receives light with a shifted phase and acquires detection signals is described.

Figure 5:
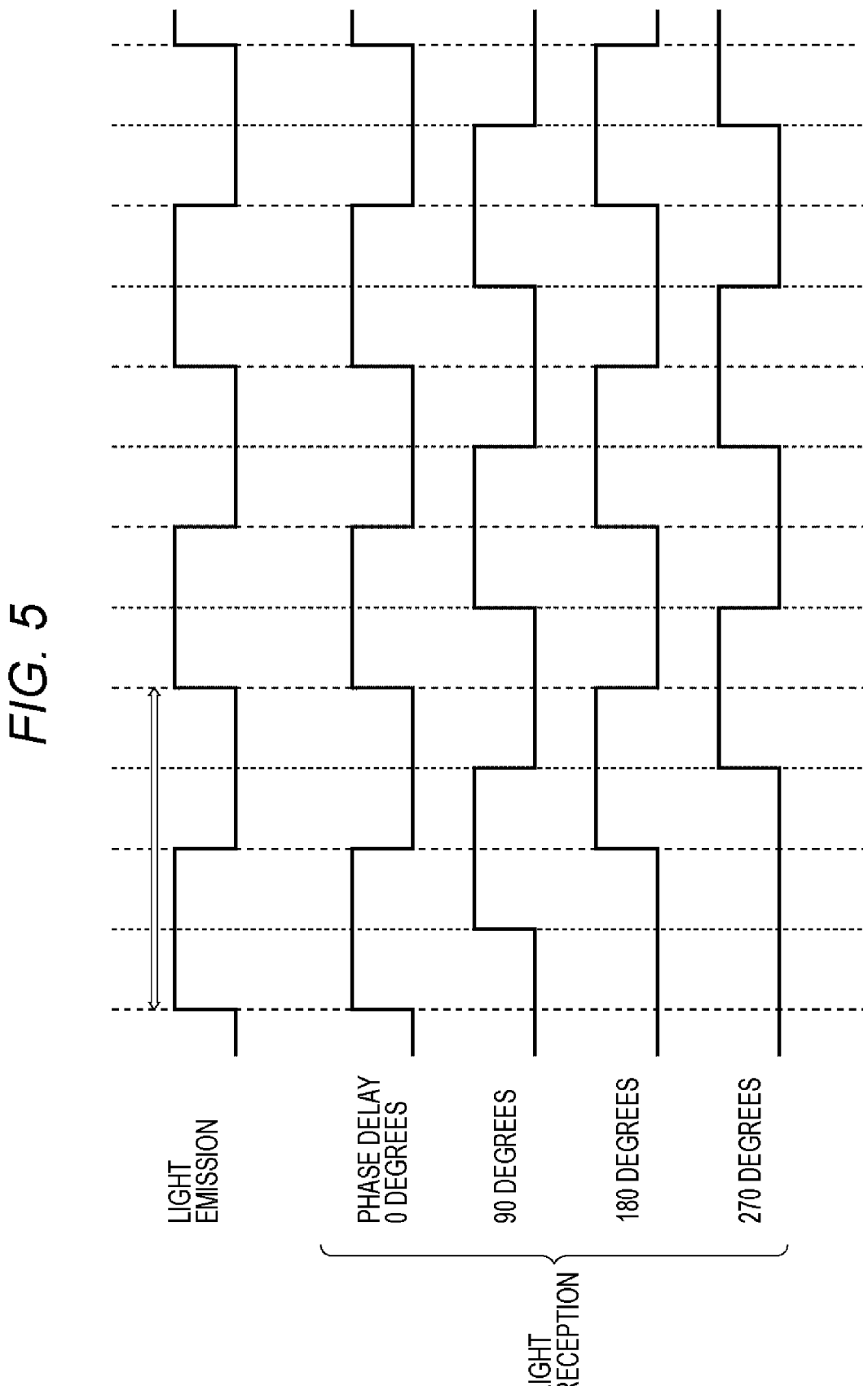
FIG. 5 is a chart showing an example of four kinds of received light, with the phase being delayed by 90 degrees each time.

For example, as shown in FIG. 5, four kinds of light reception with the phase being delayed by 90 degrees each time are performed. That is, on the basis of light reception with a phase delay of 0 degrees for receiving light without any phase shift from that of the light emitting side, light reception with a phase delay of 90 degrees, light reception with a phase delay of 180 degrees, and light reception with a phase delay of 270 degrees are performed, and a period (quad) for detecting the detection signal A and the detection signal B is provided four times.

Figure 6:
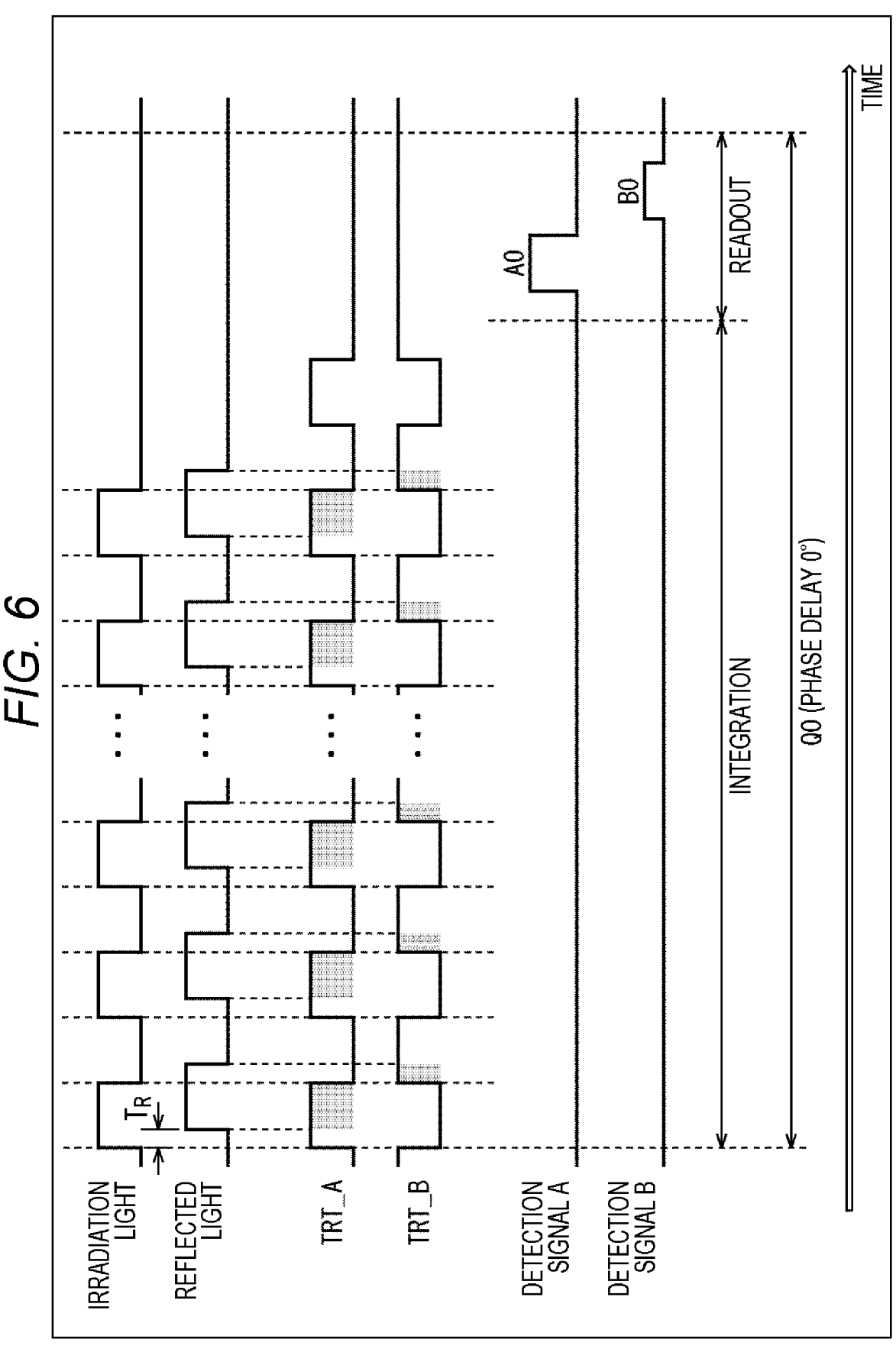
FIG. 6 is a chart showing an example of detection signals during a detection period of received light with a phase delay of 0 degrees.

That is, as shown in FIG. 6, a detection period Q0 for detecting reflected light by receiving light with a phase delay of 0 degrees, a detection period Q1 for detecting reflected light by receiving light with a phase delay of 90 degrees, a detection period Q2 for detecting reflected light by receiving light with a phase delay of 180 degrees, and a detection period Q3 for detecting reflected light by receiving light with a phase delay of 270 degrees are provided in a continuous manner, for example.

FIG. 6 shows an example of the received light, the reflected light, the transfer control signal TRT_A and the transfer control signal TRT_B, and the detection signal A and the detection signal B during the detection period Q0. As shown in FIG. 6, the transfer control signal TRT_A of the tap 51-1 is turned on at the same timing (a phase delay of 0 degrees) as the start of emission of irradiation light, and light reception (transfer) is started at the tap 51-1. Also, at the timing to turn off the transfer control signal TRT_A, the transfer control signal TRT_B is turned on, and the tap 51-2 starts receiving (transferring) light.

As light reception with a phase delay of 0 degrees is performed in this manner, electric charges are distributed to the tap 51-1 and the tap 51-2 with the charge amount depending on the delay time TR, and the respective electric charges are accumulated during an integration period. After that, during a readout period, the electric charges of the charge amount accumulated during the integration period are read out, and a detection signal A0 and a detection signal B0 during the detection period Q0 are output.

Figure 7:
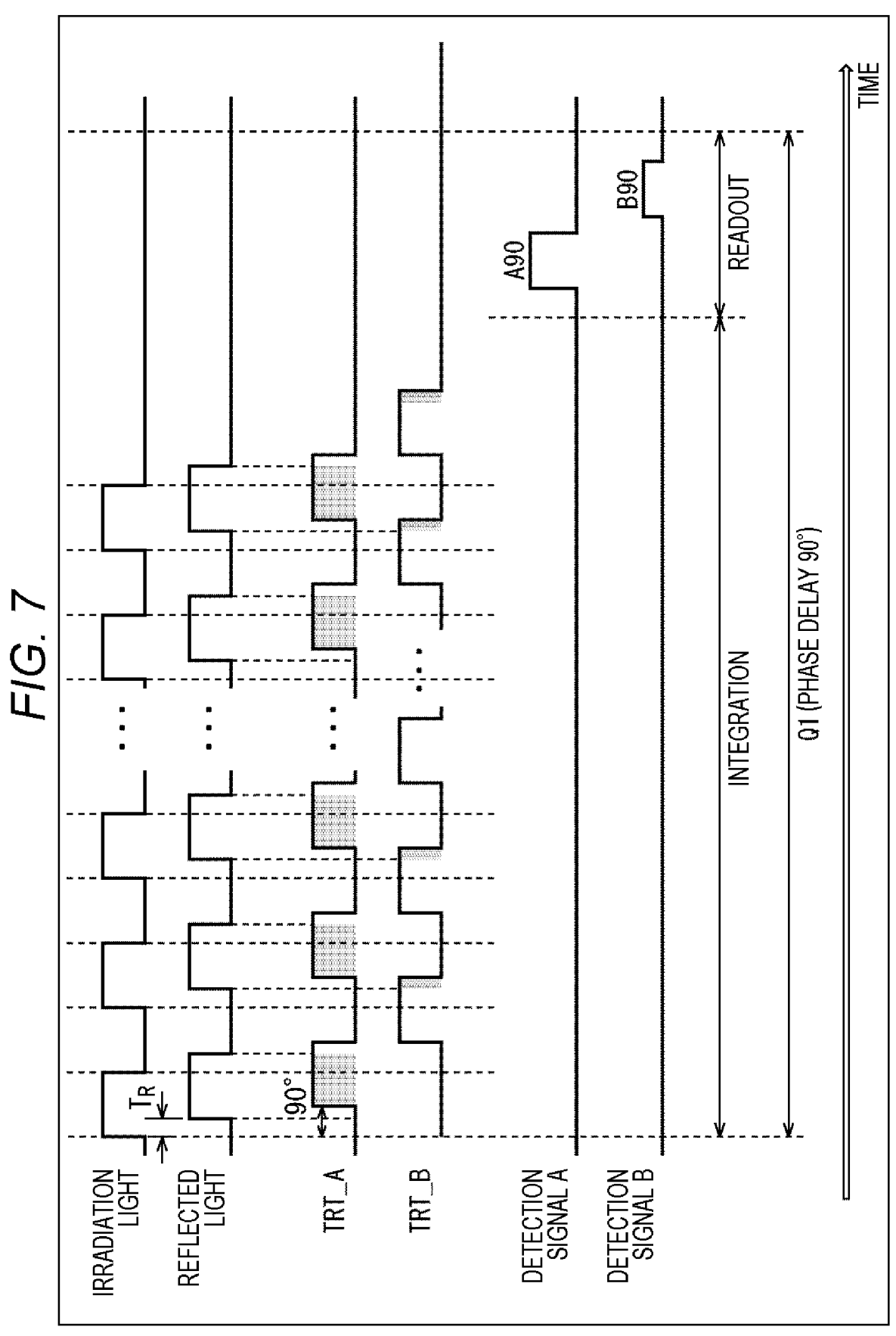
FIG. 7 is a chart showing an example of detection signals during a detection period of received light with a phase delay of 90 degrees.

FIG. 7 shows an example of the received light, the reflected light, the transfer control signal TRT_A and the transfer control signal TRT_B, and the detection signal A and the detection signal B during the detection period Q1. As shown in FIG. 7, the transfer control signal TRT_A of the tap 51-1 is turned on at timing with a phase delay of 90 degrees from the start of emission of irradiation light, and light reception (transfer) is started at the tap 51-1. Also, at the timing to turn off the transfer control signal TRT_A, the transfer control signal TRT_B is turned on, and the tap 51-2 starts receiving (transferring) light.

As light reception with a phase delay of 90 degrees is performed in this manner, electric charges are distributed to the tap 51-1 and the tap 51-2 with the charge amount depending on the delay time TR, and the respective electric charges are accumulated during the integration period. After that, during the readout period, the electric charges of the charge amount accumulated during the integration period are read out, and a detection signal A90 and a detection signal B90 during the detection period Q1 are output.

Figure 8:
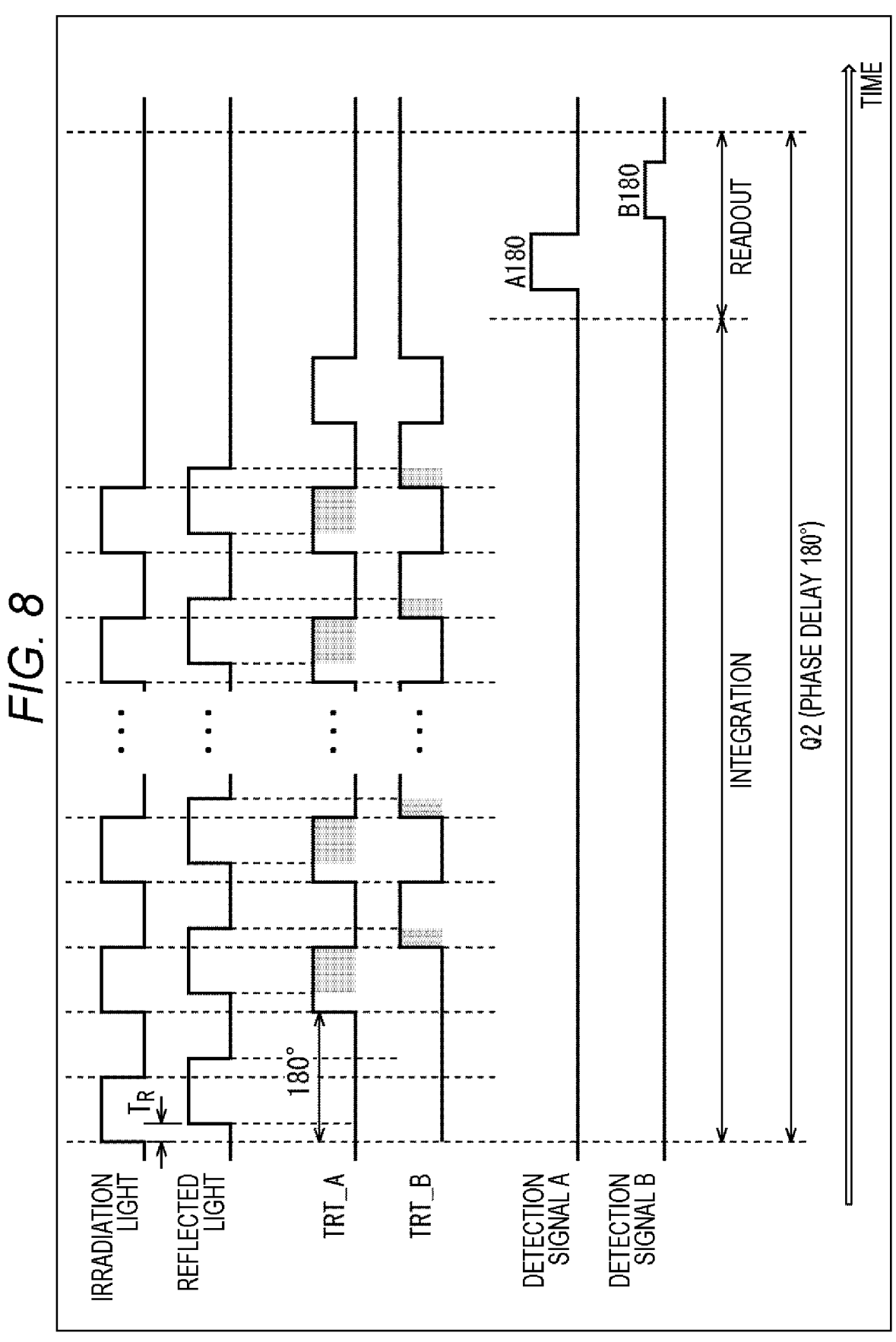
FIG. 8 is a chart showing an example of detection signals during a detection period of received light with a phase delay of 180 degrees.

FIG. 8 shows an example of the received light, the reflected light, the transfer control signal TRT_A and the transfer control signal TRT_B, and the detection signal A and the detection signal B during the detection period Q2. As shown in FIG. 8, the transfer control signal TRT_A of the tap 51-1 is turned on at timing with a phase delay of 180 degrees from the start of emission of irradiation light, and light reception (transfer) is started at the tap 51-1. Also, at the timing to turn off the transfer control signal TRT_A, the transfer control signal TRT_B is turned on, and the tap 51-2 starts receiving (transferring) light.

As light reception with a phase delay of 180 degrees is performed in this manner, electric charges are distributed to the tap 51-1 and the tap 51-2 with the charge amount depending on the delay time TR, and the respective electric charges are accumulated during the integration period. After that, during a readout period, the electric charges of the charge amount accumulated during the integration period are read out, and a detection signal A180 and a detection signal B180 during the detection period Q2 are output.

Figure 9:
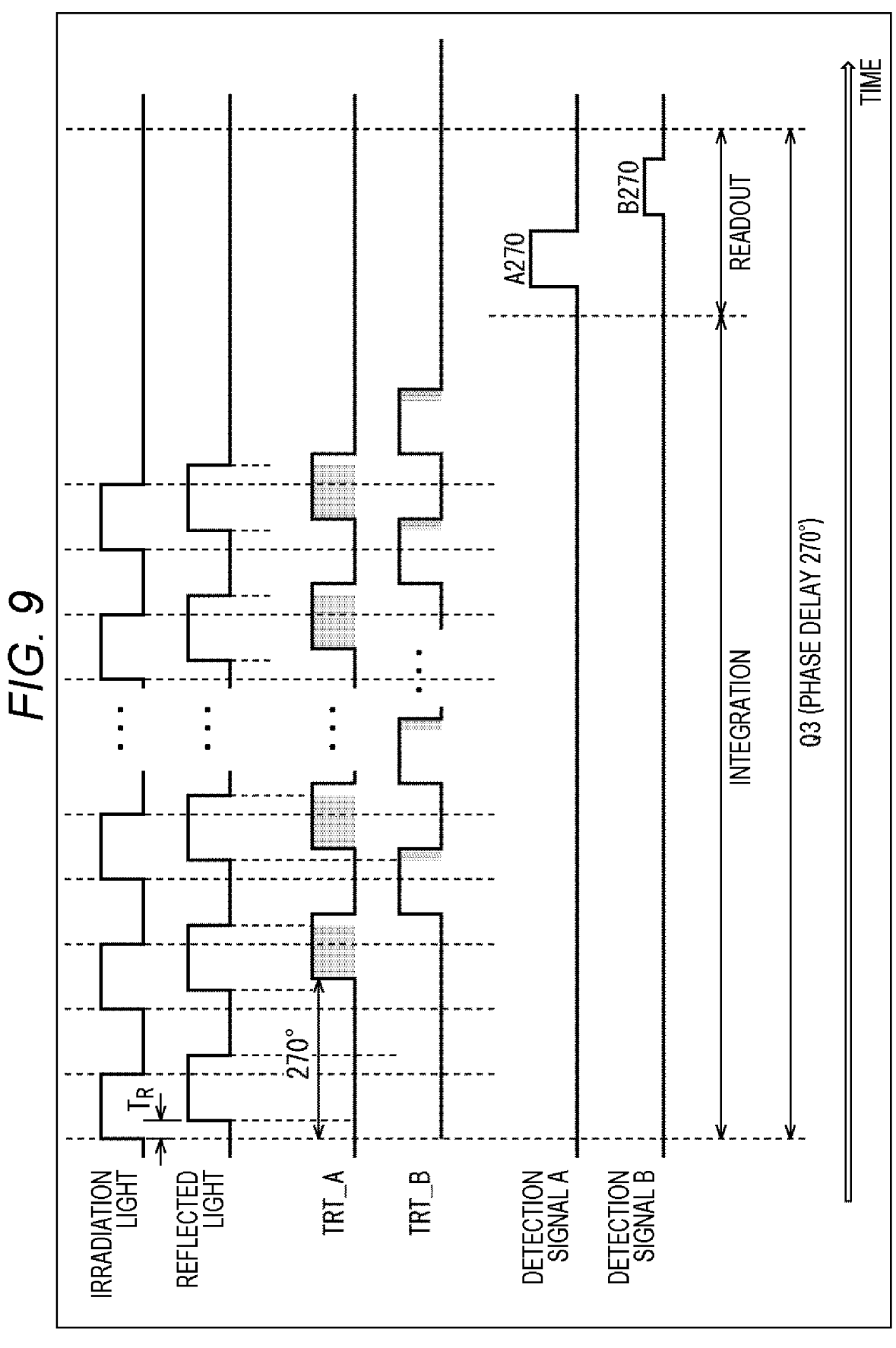
FIG. 9 is a chart showing an example of detection signals during a detection period of received light with a phase delay of 270 degrees.

FIG. 9 shows an example of the received light, the reflected light, the transfer control signal TRT_A and the transfer control signal TRT_B, and the detection signal A and the detection signal B during the detection period Q3. As shown in FIG. 9, the transfer control signal TRT_A of the tap 51-1 is turned on at timing with a phase delay of 270 degrees from the start of emission of irradiation light, and light reception (transfer) is started at the tap 51-1. Also, at the timing to turn off the transfer control signal TRT_A, the transfer control signal TRT_B is turned on, and the tap 51-2 starts receiving (transferring) light.

As light reception with a phase delay of 270 degrees is performed in this manner, electric charges are distributed to the tap 51-1 and the tap 51-2 with the charge amount depending on the delay time TR, and the respective electric charges are accumulated during the integration period. After that, during the readout period, the electric charges of the charge amount accumulated during the integration period are read out, and a detection signal A270 and a detection signal B270 during the detection period Q3 are output.

As described above, the detection signal A0 and the detection signal B0 are detected through light reception with a phase delay of 0 degrees during the detection period Q0, and the detection signal A90 and the detection signal B90 are detected through light reception with a phase delay of 90 degrees during the detection period Q1. Likewise, the detection signal A180 and the detection signal B180 are detected through light reception with a phase delay of 180 degrees during the detection period Q2, and the detection signal A270 and the detection signal B270 are detected through light reception with a phase delay of 270 degrees during the detection period Q3.

On the light emitting side, there are no phase delays despite a phase delay at the start of light reception. In other words, emission of irradiation light is always started at the same timing.

In a case where light reception with four phase delays is performed by the two taps 51 as described above, and the distance to a predetermined object is measured, a process is performed by the signal processing unit 13 (FIG. 1), on the basis of the signals obtained during the four detection periods.

<Calculation of Distance>

Figure 10:
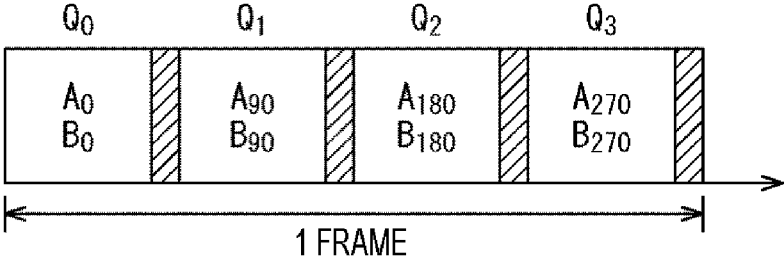
FIG. 10 is a chart for explaining detection signals in one frame.

As shown in FIG. 10, the detection period of one frame includes a detection period Q0, a detection period Q1, a detection period Q2, and a detection period Q3. A detection signal A0 and a detection signal B0 are acquired during the detection period Q0, and a detection signal A90 and a detection signal B90 are acquired during the detection period Q1. Also, a detection signal A180 and a detection signal B180 are acquired during the detection period Q2, and a detection signal A270 and a detection signal B270 are acquired during the detection period Q3.

Using these detection signals, the signal processing unit 13 (FIG. 1) calculates a phase difference $\theta$ according to Expression (1) shown below, calculates a distance D according to Expression (2) shown below, and calculates a confidence c according to Expression (3) shown below.

[Mathematical Formula 1]

$$I = c_0 - c_{180} = (A_0 - B_0) - (A_{180} - B_{180}) \tag{1}$$

$$Q = c_{90} - c_{270} = (A_{90} - B_{90}) - (A_{270} - B_{270})$$

$$\theta = \tan^{-1}\left(\frac{Q}{I}\right)(0 \le \theta < 2\pi)$$

[Mathematical Formula 2]

$$D = \frac{\theta}{2\pi}\left(\frac{T_P c}{2}\right) \tag{2}$$

[Mathematical Formula 3]

$$\text{confidence} = \sqrt{I^2 + Q^2} \tag{3}$$

In Expression (1), I represents the value obtained by subtracting the value C180 obtained by subtracting the detection signal B180 from the detection signal A180, from the value C0 obtained by subtracting the detection signal B0 from the detection signal A0. Q represents the value obtained by subtracting the value C270 obtained by subtracting the detection signal B270 from the detection signal A270, from the value C90 obtained by subtracting the detection signal B90 from the detection signal A90. The phase difference $\theta$ is calculated by determining the arctangent of (Q/I).

In Expression (2), C represents the speed of light, and Tp represents the pulse width. The delay time Td can be obtained on the basis of the phase difference $\theta$, and the distance D to the object can be obtained on the basis of the delay time Td.

Expression (3) is an equation for calculating the value representing the confidence of the calculated distance. The confidence c is obtained by calculating the square root of the value obtained by adding the square of I to the square of Q. Note that the calculation of the confidence c is not an essential element in the calculation of the distance D, and can be omitted. Alternatively, the confidence c may be calculated according to an expression other than Expression (3). For example, the sum of the absolute values of I and Q can be set as the confidence c. Here, the explanation will be continued on the assumption that the confidence is calculated according to Expression (3), but a case where the confidence is calculated according to some other expression is also an application range of the present technology.

In the description below, a case where the distance to a predetermined object is measured with the two taps 51 using irradiation light having four phase differences (hereinafter referred to as "2-tap 4-phase") will be described as an example. However, the present technology can also be applied in a case where the distance to a predetermined object is measured with the two taps 51 using irradiation light having two phase differences, or a case where the distance to a predetermined object is measured with one tap 51 using irradiation light having four phase differences.

<2-Tap 2-Phase>

A case where the distance to a predetermined object is measured with the two taps 51 using irradiation light having two phase differences or through reception of light having two phase differences (hereinafter referred to as "2-tap 2-phase", as appropriate) is now briefly described. Here, explanation is continued, taking as an example a case where light reception is performed with two phase differences so as to measure the distance to a predetermined object.

FIG. 11 is a diagram showing the exposure timings of the four phases of 0 degrees, 90 degrees, 180 degrees, and 270 degrees, with the beginnings being aligned for easy understanding of the phase differences.

In practice, as shown in FIG. 10, imaging for acquiring a detection signal A0 and a detection signal B0 is performed during a detection period Q0, imaging for acquiring a detection signal A90 and a detection signal B90 is performed during a detection period Q1, imaging for acquiring a detection signal A180 and a detection signal B180 is performed during a detection period Q2, and imaging for acquiring a detection signal A270 and a detection signal B270 is performed during a detection period Q3.

FIG. 11 shows this imaging that is sequentially performed in the temporal direction while the beginnings of the detection periods are aligned in the vertical direction. From the beginning of the detection period Q0, exposure for imaging the detection signal A0 is performed, followed by exposure for imaging the detection signal B0.

From the point of time at which the phase is shifted by 90 degrees from the beginning of the detection period Q1, exposure for imaging the detection signal A90 is performed, followed by exposure for imaging the detection signal B90.

From the point of time at which the phase is shifted by 180 degrees from the beginning of the detection period Q2, exposure for imaging the detection signal A180 is performed, followed by exposure for imaging the detection signal B180.

From the point of time at which the phase is shifted by 270 degrees from the beginning of the detection period Q3, exposure for imaging the detection signal A270 is performed, followed by exposure for imaging the detection signal B270.

Here, the exposure time of the detection signal B0 of the detection period Q0 is compared with the exposure time of the detection signal A180 of the detection period Q2, and the result shows that exposure is performed at the same timing. Accordingly, the detection signal A180 of the detection period Q2 can be substituted with the detection signal B0 of the detection period Q0. Likewise, the detection signal B180 of the detection period Q2 can be substituted with the detection signal A0 of the detection period Q0.

Likewise, the exposure time of the detection signal B90 of the detection period Q1 is compared with the exposure time of the detection signal A270 of the detection period Q3, and the result shows that exposure is performed at the same timing. Accordingly, the detection signal A270 of the detection period Q3 can be substituted with the detection signal B90 of the detection period Q1. Likewise, the detection signal B270 of the detection period Q3 can be substituted with the detection signal A90 of the detection period Q1.

Figure 12:
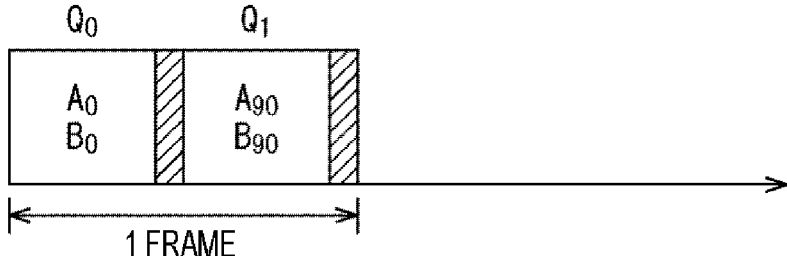
FIG. 12 is a chart for explaining detection signals in one frame.

In view of this, the detection period Q0 and the detection period Q1 are set as the detection period of one frame, and the detection signal A0 and the detection signal B0 are acquired during the detection period Q0, as shown in FIG. 12.

The detection signal A0 acquired during the detection period Q0 can be used as the detection signal B180. Also, the detection signal B0 acquired during the detection period Q0 can be used as the detection signal A180. Accordingly, in this case, during the detection period Q0, the detection signal A0, the detection signal B0, the detection signal A180, and the detection signal B180 can be regarded as if they had actually been acquired.

Likewise, the detection signal A90 acquired during the detection period Q1 can be used as the detection signal B270. Further, the detection signal B90 acquired during the detection period Q1 can be used as the detection signal A270. Accordingly, in this case, during the detection period Q1, the detection signal A90, the detection signal B90, the detection signal A270, and the detection signal B270 can be regarded as if they had actually been acquired.

Thus, the case of 2-tap 2 phase described with reference to FIG. 12 can also be handled like the case of 2-tap 4 phase described with reference to FIG. 10.

The value I and the value Q in Expression (1) in the 2-tap 4 phase described with reference to FIG. 10 are expressed as in Expression (4) shown below.

[Mathematical Formula 4]

$$I = c_0 c_{180} = A_0 - B_0$$

$$Q = c_{90} - c_{270} = A_{90} - B_{90} \tag{4}$$

The value I is obtained by subtracting the detection signal B0 from the detection signal A0, and the value Q is obtained by subtracting the detection signal B90 from the detection signal A90. As the value I and the value Q are acquired, the phase difference $\theta$ can be calculated according to Expression (1), and the distance D can be calculated according to Expression (2), as in the case of the 2-tap system described above.

<1-Tap 4-Phase>

A case where the distance to a predetermined object is measured with one tap 51 (the configuration of a pixel 50 having one tap 51 is not shown) using irradiation light having four phase differences or through reception of light having four phase differences (hereinafter referred to as "1-tap 4-phase", as appropriate) is now briefly described.

Figure 13:
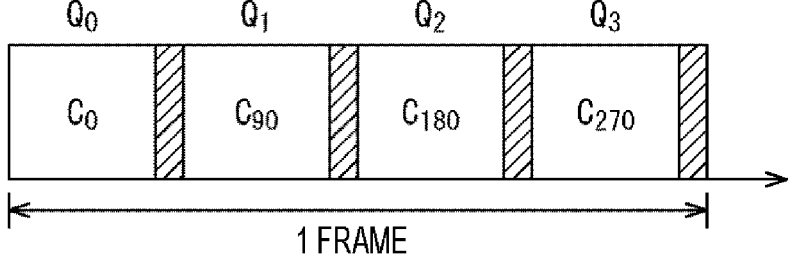
FIG. 13 is a chart for explaining detection signals in one frame.

When the imaging order in the temporal direction in the 1-tap 4-phase is illustrated in the same manner as in FIG. 10, the order shown in FIG. 13 is obtained. During a detection period Q0, the value C0 in Expression (1) shown above is acquired. During a detection period Q1, the value C90 in Expression (1) shown above is acquired. During a detection period Q2, the value C180 in Expression (1) shown above is acquired. During a detection period Q3, the value C270 in Expression (1) shown above is acquired.

In the case of the 1-tap system, the value I and the value Q in Expression (1) shown above are expressed as in Expression (5) shown below.

[Mathematical Formula 5]

$$I = c_0 - c_{180}$$

$$Q = c_{90} - c_{270} \tag{5}$$

As the value I and the value Q are acquired, the phase difference $\theta$ can be calculated according to Expression (1), and the distance D can be calculated according to Expression (2), as in the case of the 2-tap system described above.

The present technology can be applied to the 2-tap 4-phase, the 2-tap 2-phase, and the 1-tap 4-phase described above.

<Flying Pixels>

False detection that occurs near an edge of an object in an environment to be measured is now described. A pixel that is falsely detected near an edge of an object may be referred to as a defective pixel, a flying pixel, or the like.

Figure 14:
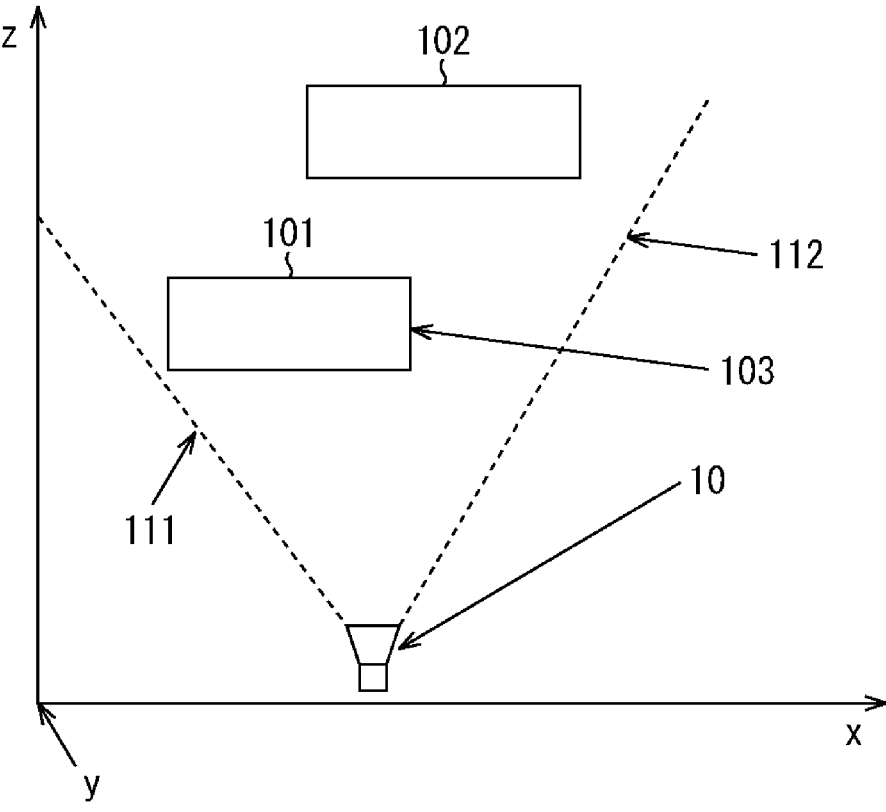
FIG. 14 is a diagram for explaining flying pixels.
Figure 15:
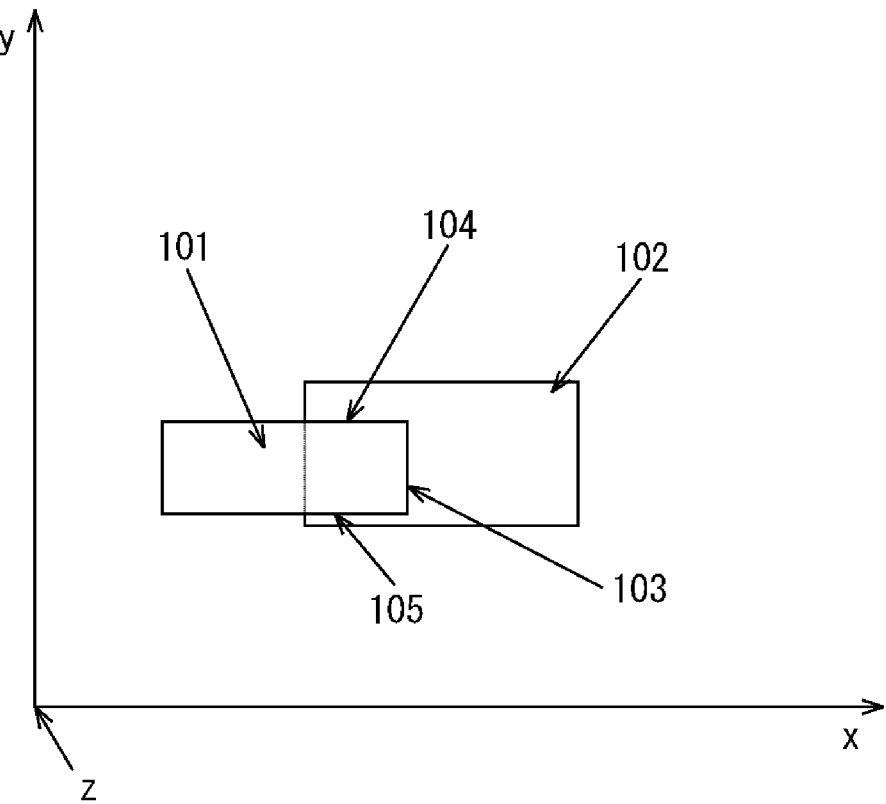
FIG. 15 is a diagram for explaining flying pixels.

As shown in FIGS. 14 and 15, a case where there are two objects in a three-dimensional environment, and the positions of the two objects are measured with the distance measuring device 10 is discussed herein. FIG. 14 is a diagram showing the positional relationship between a foreground object 101 and a background object 102 in an x-z plane. FIG. 15 is a diagram showing the positional relationship between the foreground object 101 and the background object 102 in an x-y plane.

The x-z plane shown in FIG. 14 is the plane when the foreground object 101, the background object 102, and the distance measuring device 10 are viewed from above, and the x-y plane shown in FIG. 15 is a plane located in a direction perpendicular to the x-z plane and is the plane when the foreground object 101 and the background object 102 are viewed from the distance measuring device 10.

Referring to FIG. 14, when the distance measuring device 10 is used as the reference, the foreground object 101 is located on the side closer to the distance measuring device 10, and the background object 102 is located on the side farther from the distance measuring device 10. Also, the foreground object 101 and the background object 102 are located within the angle of view of the distance measuring device 10. The angle of view of the distance measuring device 10 is indicated by a dotted line 111 and a dotted line 112 in FIG. 14.

One side of the foreground object 101, or the side on the right side in FIG. 14, is an edge 103. There is a possibility that a flying pixel will appear in the vicinity of this edge 103.

Referring to FIG. 15, imaging of the foreground object 101 and the background object 102 is performed from the distance measuring device 10 in a situation where these objects overlap each other. In such a case, there is a possibility that flying pixels will appear on the upper side (referred to as an edge 104) of the foreground object 101 and the lower side (referred to as an edge 105) of the foreground object 101.

In this case, a flying pixel is a pixel that is detected as a pixel belonging to an edge portion of the foreground object 101, or is detected as a pixel at such a distance that the pixel is neither of the foreground object 101 nor of the background object 102.

Figure 16:
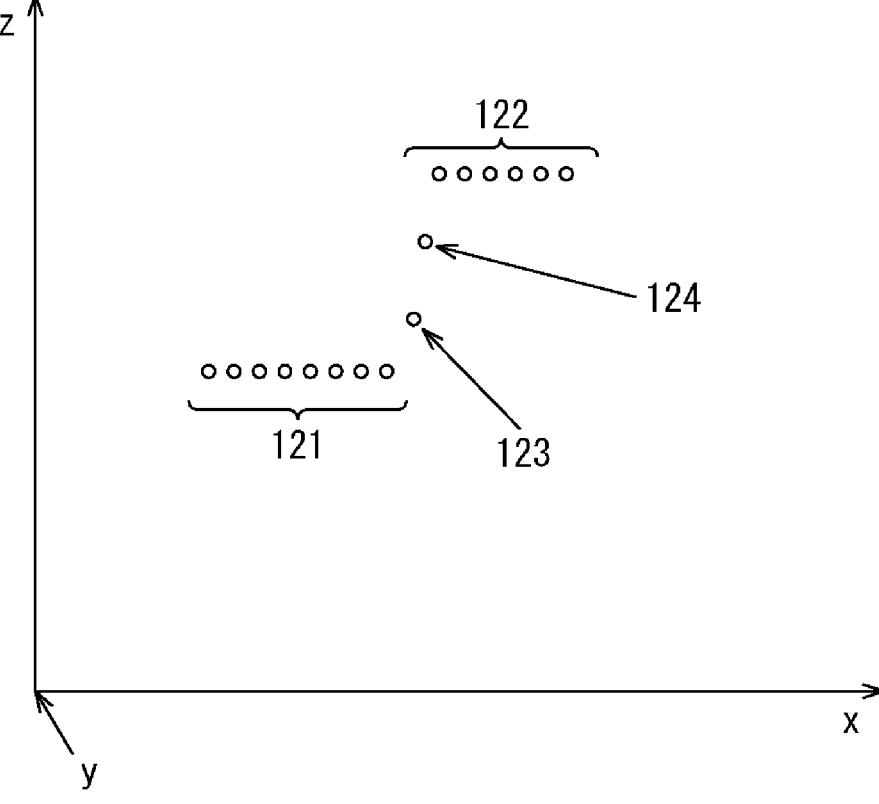
FIG. 16 is a diagram for explaining flying pixels.

FIG. 16 is a diagram in which the foreground object 101 and the background object 102 are represented by the pixels corresponding to the image shown in FIG. 14. A pixel group 121 is the pixels detected from the foreground object 101, and a pixel group 122 is the pixels detected from the background object 102. A pixel 123 and a pixel 124 are flying pixels, and are falsely detected pixels.

The pixel 123 and the pixel 124 are located on the edges between the foreground object 101 and the background object 102 as shown in FIG. 16. Both of these flying pixels may belong to the foreground object 101 or the background object 102. Alternatively, only one of these flying pixels may belong to the foreground object 101 while the other belongs to the background object 102.

Figure 17:
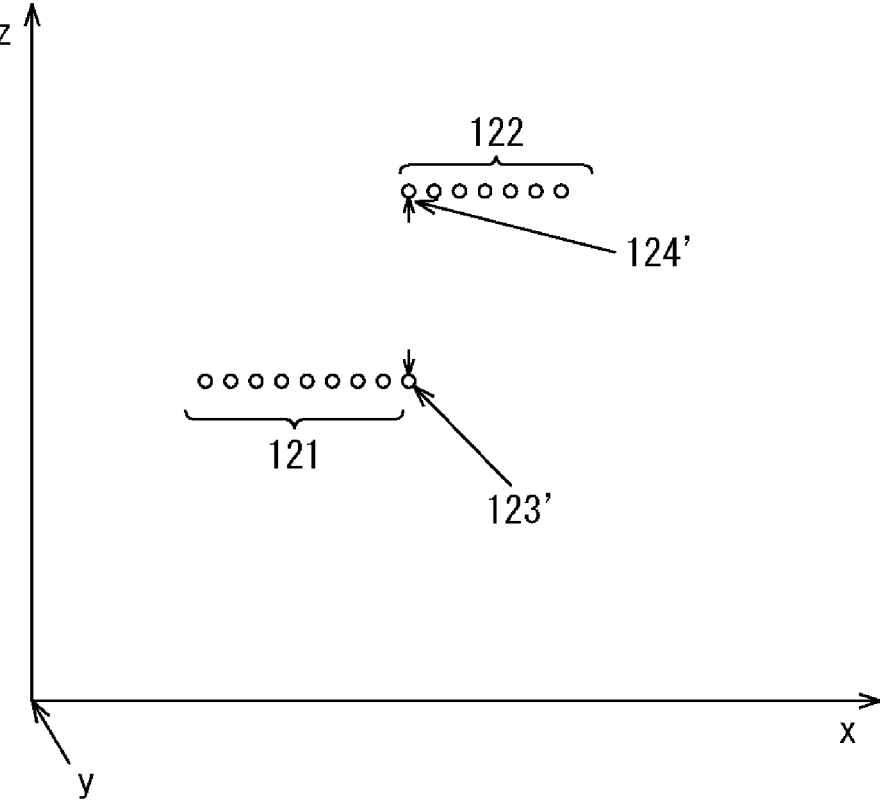
FIG. 17 is a diagram for explaining flying pixels.

The pixels 123 and 124 are detected as flying pixels and are appropriately processed, to be modified as shown in FIG. 17, for example. Referring to FIG. 17, the pixel 123 (FIG. 16) is modified to be a pixel 123' belonging to the pixel group 121 belonging to the foreground object 101, and the pixel 123 (FIG. 16) is modified to be a pixel 124' belonging to the pixel group 122 belonging to the background object 102.

The process for detecting defective pixels such as flying pixels in this manner is further described below.

<First Process Related to Flying Pixel Detection>

Figure 18:
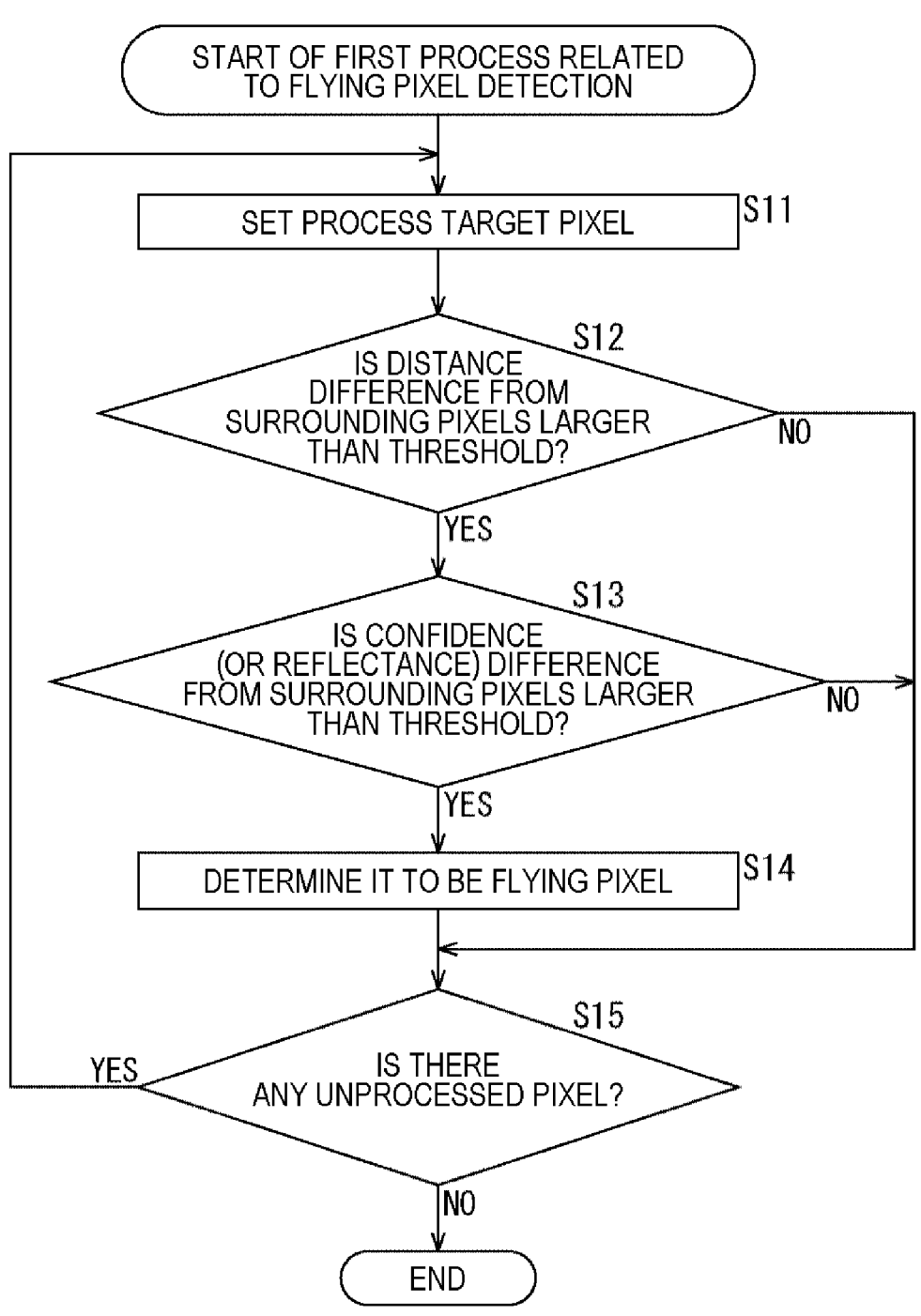
FIG. 18 is a flowchart for explaining a first process related to flying pixel detection.

Referring now to FIG. 18, a first process related to flying pixel detection is described. Flying pixel detection is performed in the filter unit 16 (FIG. 1). Referring again to FIG. 1, a depth map and a confidence map are supplied from the signal processing unit 13 to the filter unit 16. The filter unit 16 detects flying pixels from the depth map (a group of pixels).

In step S11, the filter unit 16 sets a process target (evaluation target) pixel in the supplied depth map.

In step S12, a check is made to determine whether or not the difference between the distance (depth value) of the process target pixel and the distance (depth value) of a surrounding pixel is equal to or larger than a threshold. Referring to FIG. 16, a flying pixel, such as the pixel 123, for example, is located away from the pixel group 121 and the pixel group 122 In other words, the pixel 123 is located at a position distant from the pixels around the pixel 123. Therefore, in a case where the distance difference between the pixel 123 and a surrounding pixel (such as a pixel in the pixel group 121, for example) is calculated, it is assumed that the difference has a predetermined value or larger.

The determination process in step S12 is further described below. A case where a directional derivative around one point corresponding to the process target pixel is used to detect a flying pixel is described below as an example.

Note that, in the description below, directional derivatives can be considered in multiple directions. For ease of explanation, however, the vertical direction and the horizontal direction are taken as examples. However, it goes without saying that the same principle can be applied to directions other than the vertical and horizontal directions. Further, although a case where directional derivatives are used is described as an example herein, other methods can be adopted in the present technology.

Here, "P" represents the pixel being evaluated in the depth map, and "a" represents the selected direction in the plane. In this case, $da(P)$ is the value of the derivative in the direction "a" in the pixel "P". In a case where the absolute value $|da(P)|$ of the directional derivative and $|da+n(P)|$ are greater than predefined thresholds in the direction "a", and the signs of $da(P)$ and $\{da+n(P)\}$ are the same, the pixel is detected as a flying pixel. Note that $(a+n)$ indicates a direction opposite to a.

Using the directional derivative, it is also possible to detect a pixel with noise. In a case where the pixel being evaluated has a depth value significantly different from the depth values of all the pixels adjacent to the pixel being evaluated, or a case where at least one directional derivative is greater than a predefined threshold, and at least two directional derivatives have opposite signs, the pixel is detected as a pixel having noise.

Detection of a pixel having noise is also described herein. However, in a case where the first process related to flying pixel detection is performed, the detection of a pixel having noise described below is a process that can be omitted as appropriate.

For each pixel, detection of a pixel having noise or/and detection of a flying pixel can be performed in any desired number of directions. These directions preferably cover a unit circle, which is a circle having the radius equivalent to one pixel. Typically, where i=1 to n, a set of directions {a_i} can be used, and the following expression is satisfied:

$$a\_i=(i-1)\times\pi/n$$

Figure 19:
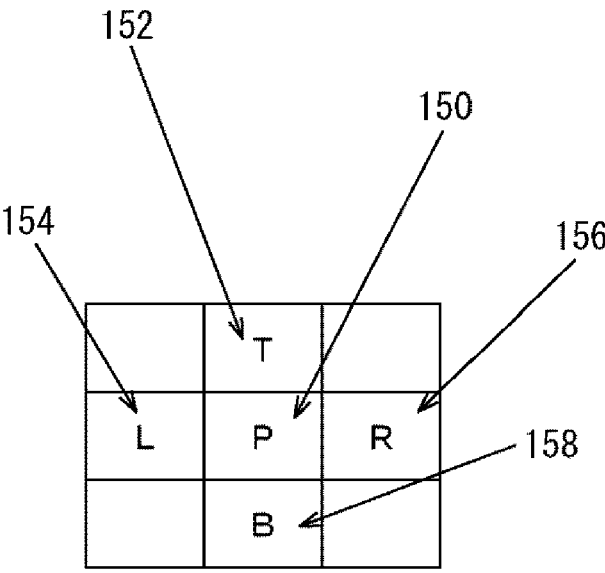
FIG. 19 is a diagram for explaining the relationship between the process target and the surrounding pixels.

A directional derivative can be estimated from a finite difference. In FIG. 19, a pixel 150 is the pixel "P" being evaluated with the use of a pixel 152, a pixel 154, a pixel 156, and a pixel 158 that correspond to a pixel "T" above the pixel "P", a pixel "L" to the left, a pixel "R" to the right, and a pixel "B" below the pixel The values of the pixels 152, 154, 156, and 158 can be used in determining whether or not the pixel 150 is a flying pixel, and whether or not the pixel is a pixel having noise, in two directions that are directions at angles of 0° and π/2 (the horizontal and vertical directions).

In the case of the horizontal and vertical directions, the detection of a pixel having noise is performed according to the following expressions:

$$(|R-P|<Th, \text{ and } |L-P|<Th), \text{ or } (|T-P|<Th, \text{ and } |B-P|<Th),$$

and
sign(R–P)≠sign(P–L), or sign(T–P)*sign(P–B) These expressions are defined as Expression (6). In Expression (6), Th represents the threshold.

In Expression (6), P represents the depth value of the pixel 150, T represents the depth value of the pixel 152, L represents the depth value of the pixel 154, R represents the depth value of the pixel 156, and B represents the depth value of the pixel 158. Note that the same applies to Expression (7) shown later.

Further, each value will be described as being smaller than the threshold or being greater than the threshold in the description below. However, each value may be equal to or greater than the threshold, or be equal to or smaller than the threshold, for example.

The expression, (|R–P|<Th, and |L–P|<Th), is the expression for determining whether the absolute value of the depth value difference between the pixel 150 and the pixel 156 located on the right side of the pixel 150 (FIG. 19) is smaller than the threshold Th, and the absolute value of the depth value difference between the pixel 150 and the pixel 154 located on the left side of the pixel 150 is smaller than the threshold Th.

In a case where determination is made according to this expression, a check is also made to determine whether sign(R–P)≠sign(P–L). The expression, sign(R–)≠sign(P–L), is the expression for determining whether or not the positive/negative sign of the value obtained by subtracting the depth value of the pixel 150 from the depth value of the pixel 156 is unequal to the positive/negative sign of the value obtained by subtracting the pixel 150 from the pixel 154. In a case where these two expressions are satisfied, the process target pixel is detected as a pixel having noise.

In a case where processing is performed with attention being paid to the vertical direction, (|T–P|<Th, and |B–P|<Th), and sign(T–P)≠sign(P–B) are used. The expression, (|T–P|<Th, and |S–P|<Th), is the expression for determining whether the absolute value of the depth value difference between the pixel 150 and the pixel 152 located above the pixel 150 (FIG. 19) is smaller than the threshold Th, and the absolute value of the depth value difference between the pixel 150 and the pixel 158 located below the pixel 150 is smaller than the threshold Th.

In a case where determination is made according to this expression, a check is also made to determine whether sign(T–P)≠sign(P–B). The expression, sign(T–P)≠sign(P–

B), is the expression for determining whether or not the positive/negative sign of the value obtained by subtracting the depth value of the pixel 150 from the depth value of the pixel 152 is unequal to the positive/negative sign of the value obtained by subtracting the depth value of the pixel 150 from the depth value of the pixel 158. In a case where these two expressions are satisfied, the process target pixel is detected as a pixel having noise.

The detection of a flying pixel is performed according to the following expressions:

$$(|R-P|>kTh, \text{ and } |L-P|>kTh), \text{ or } (|T-P|>kTh \text{ and } |B-P|>kTh),$$

and
sign(R–P)=sign(P–L), or sign(T–P)=sign(P–B) These expressions are defined as Expression (7). In Expression (7), Th represents the threshold, and k represents a predetermined weighting factor.

The expression, (|R–P|>kTh, and |L–P|>kTh), is the expression for determining whether or not the absolute value of the depth value difference between the pixel 150 and the pixel 156 located on the right side of the pixel 150 (FIG. 19) is greater than the value obtained by multiplying the threshold value Th by the weighting factor k, and the absolute value of the depth value difference between the pixel 150 and the pixel 154 located on the left side of the pixel 150 is greater than the value obtained by multiplying the threshold value Th by the weighting factor k.

In a case where determination is made according to this expression, a check is also made to determine whether sign(R–P)=sign(P–L). The expression, sign(R–P)=sign(P–L), is the expression for determining whether or not the positive/negative sign of the value obtained by subtracting the depth value of the pixel 150 from the depth value of the pixel 156 is the same as the positive/negative sign of the value obtained by subtracting the depth value of the pixel 150 from the depth value of the pixel 154. In a case where these two expressions are satisfied, the process target pixel is detected as a flying pixel.

In a case where processing is performed with attention being paid to the vertical direction, (|T–P|>kTh, and |B–P|>kTh), and sign(T–P)=sign(P–B) are used. The expression, (|T–P|>kTh, and |S–P|>kTh), is the expression for determining whether or not the absolute value of the depth value difference between the pixel 150 and the pixel 152 located above the pixel 150 (FIG. 19) is greater than the value obtained by multiplying the threshold value Th by the weighting factor k, and the absolute value of the depth value difference between the pixel 150 and the pixel 158 located below the pixel 150 is greater than the value obtained by multiplying the threshold value Th by the weighting factor k.

In a case where determination is made according to this expression, a check is also made to determine whether sign(T–P)=sign(P–B). The expression, sign(T–P)=sign(P–B), is the expression for determining whether or not the positive/negative sign of the value obtained by subtracting the depth value of the pixel 150 from the depth value of the pixel 152 is the same as the positive/negative sign of the value obtained by subtracting the depth value of the pixel 150 from the depth value of the pixel 158. In a case where these two expressions are satisfied, the process target pixel is detected as a flying pixel.

Note that, as an alternative to the above detection of a flying pixel or a pixel having noise, Expression (8) shown below can be used in place of Expression (6) and Expression (7).

$$|L-R|>Th, \text{ and } |T-B|>Th$$

The expression, $(|L-R|>Th$, and $|T-B|>Th)$, is the expression for determining whether or not the absolute value of the depth value difference between the pixel 156 located on the right side of the pixel 150 to be evaluated and the pixel 154 located on the left side is greater than the threshold Th, and the absolute value of the depth value difference between the pixel 152 located above the pixel 150 to be evaluated and the pixel 158 located on the lower side is greater than the threshold Th. In a case where this expression is satisfied, the process target pixel is detected as a flying pixel.

According to this Expression (8), the value between the two pixels surrounding the pixel being evaluated is used. Therefore, the threshold Th may be greater than the threshold Th in Expression (6) and Expression (7) shown above.

In step S12 (FIG. 18), the filter unit 16 determines whether or not the process target pixel is a flying pixel, on the basis of Expression (7). In step S12, a determination process is performed to determine whether or not the depth value (distance) difference from a surrounding pixel is greater than (equal to or greater than) the threshold. Although a flying pixel can be detected only by this process in step S12, there is a possibility that a pixel that is not a flying pixel is detected as a flying pixel.

For example, there is a possibility that a plane that is close to a direction parallel to the directional vector of the distance measuring device 10 and is located at a long distance is detected as a flying pixel.

Detection of a flying pixel from such a plane in the process in step S12 will result in false detection. The determination process in step S13 is performed as a mechanism for correcting such false detection performed in step S12.

If the distance difference between the process target pixel and the surrounding pixel is determined to be equal to or larger than (or to be larger than) the threshold value in step S12, in other words, if it is determined that there is a possibility of a flying pixel, the process moves on to step S13.

In step S13, a check is made to determine whether or not the difference in confidence or reflectance between the process target pixel and the surrounding pixel is equal to or larger than the threshold. Confidence is a value calculated according to Expression (3). Reflectance is a value calculated according to Expression (9) shown below. Note that, as described above, the confidence may be the sum of the absolute values of I and Q in an expression other than Expression (3), for example.

$$\text{reflectance}=\text{confidence}\times\text{depth}^2 \qquad (9)$$

The reflectance is the value obtained by multiplying the confidence by the square of the distance (depth value).

In step S13, either the confidence or the reflectance may be used. Alternatively, a mechanism may be provided in which a certain index is introduced, and the case of use of the confidence and the case of use of the reflectance can be switched.

In a case where the determination process in step S13 is performed with the use of confidence, the determination process is performed on the basis of Expression (10) shown below. The confidence is calculated on the basis of Expression (3) shown above.

$$(|Rc-Pc|>Thc, \text{ and } |Lc-Pc|>Thc)$$

or $$(|Tc-Pc|>Thc, \text{ and } |Bc-Pc|>Thc) \qquad (10)$$

In Expression (10), Pc represents the confidence of the pixel 150, Tc represents the confidence of the pixel 152, Lc represents the confidence of the pixel 154, Rc represents the confidence of the pixel 156, and Bc represents the confidence of the pixel 158.

The expression, $(|Rc-Pc|>Thc$, and $|Lc-Pc|>Thc)$, is the expression for determining whether or not the absolute value of the difference between the confidence of the pixel 150 and the confidence of the pixel 156 located on the right side of the pixel 150 (FIG. 19) is greater than a threshold Thc, and the absolute value of the difference between the confidence of the pixel 150 and the confidence of the pixel 154 located on the left side of the pixel 150 is greater than the threshold Thc. In a case where this expression is satisfied, the process target pixel is detected (confirmed) as a flying pixel.

In a case where processing is performed with attention being paid to the vertical direction, $(|Tc-Pc|>Thc$, and $|Bc-Pc|>Thc)$ is used. The expression, $(|Tc-Pc|>Thc$, and $|Bc-Pc|>Thc)$, is the expression for determining whether or not the absolute value of the difference between the confidence of the pixel 150 and the confidence of the pixel 152 located above the pixel 150 (FIG. 19) is greater than the threshold Thc, and the absolute value of the difference between the confidence of the pixel 150 and the confidence of the pixel 158 located below the pixel 150 is greater than the threshold Thc. In a case where this expression is satisfied, the process target pixel is detected (confirmed) as a flying pixel.

In a case where the determination process in step S13 is performed with the use of reflectance, the determination process is performed on the basis of Expression (11) shown below. The reflectance is calculated on the basis of Expression (9) shown above.

$$(|Rr-Pr|>Thr, \text{ and } |Lr-Pr|>Thr),$$

or $$(|Tr-Pr|>Thr, \text{ and } |Br-Pr|>Thr) \qquad (11)$$

In Expression (11), Pr represents the reflectance of the pixel 150, Tr represents the reflectance of the pixel 152, Lr represents the reflectance of the pixel 154, Rr represents the reflectance of the pixel 156, and Br represents the reflectance of the pixel 158.

The expression, $(|Rr-Pr|>Thr$, and $|Lr-Pr|>Thr)$, is the expression for determining whether or not the absolute value of the difference between the reflectance of the pixel 150 and the reflectance of the pixel 156 located on the right side of the pixel 150 (FIG. 19) is greater than a threshold Thr, and the absolute value of the difference between the reflectance of the pixel 150 and the reflectance of the pixel 154 located on the left side of the pixel 150 is greater than the threshold Thr. In a case where this expression is satisfied, the process target pixel is detected (confirmed) as a flying pixel.

In a case where processing is performed with attention being paid to the vertical direction, $(|Tr-Pr|>Thr$, and $|Br-Pr|>Thr)$ is used. The expression, $(|Tr-Pr|>Thr$, and $|Br-Pr|>Thr)$, is the expression for determining whether or not the absolute value of the difference between the reflectance of the pixel 150 and the reflectance of the pixel 152 located above the pixel 150 (FIG. 19) is greater than the threshold Thr, and the absolute value of the difference between the reflectance of the pixel 150 and the reflectance of the pixel 158 located below the pixel 150 is greater than the threshold Thr. In a case where this expression is satisfied, the process target pixel is detected (confirmed) as a flying pixel.

The determination process in step S13 may be either determination using confidence or determination using reflectance. In a case where the confidence is calculated by the signal processing unit 13 (FIG. 1) and is supplied to the filter unit 16, the filter unit 16 performs the determination process using the supplied confidence. Alternatively, in a case where the filter unit 16 performs the determination process using reflectance, the reflectance is calculated with the use of the confidence supplied from the signal processing unit 13, and the determination process is performed with the use of the calculated reflectance.

The threshold Thc in Expression (10) and the threshold Thr in Expression (11) are fixed values, and are values that have been set in advance. Note that, although a check is made to determine whether or not a value is greater than the threshold Thc (threshold Thr) in the explanation made herein, a check may be made to determine whether or not a value is equal to or greater than the threshold Thc (threshold Thr).

In step S13, a check is made to determine whether or not the difference in confidence or reflectance between the process target pixel and a surrounding pixel is larger than the threshold, and, if the difference is determined to be larger than the threshold, the process moves on to step S14.

In step S14, the filter unit 16 confirms the process target (evaluation target) pixel to be a flying pixel. The pixel confirmed to be a flying pixel is then changed to a pixel belonging to the pixel group 121 of the foreground object 101 or the pixel group 122 of the background object 102, or is deleted, as described above with reference to FIG. 17, for example. Thus, the pixel is corrected.

If the difference in confidence or reflectance between process target pixel and the surrounding pixel is determined to be equal to or smaller than the threshold in step S13, on the other hand, the process moves on to step S15.

The process moves on to step S15 in a case where process target pixel is determined not to be a flying pixel in step S12, in a case where the process target pixel is determined not to be a flying pixel in step S13 though it has been determined that there is a possibility of a flying pixel, or in a case where the process target pixel is confirmed to be a flying pixel in step S14.

In step S15, a check is made to determine whether or not there is any unprocessed pixel. If it is determined in step S15 that there is an unprocessed pixel, the process returns to step S11, and the processes thereafter are repeated.

If it is determined in step S15 that there are no unprocessed pixels, the first process related to flying pixel detection comes to an end.

In this manner, a pixel that might be a flying pixel is detected in step S12, and a check is made to confirm the pixel to be a flying pixel in step S13. That is, a flying pixel is detected (confirmed) through two stages. Thus, false detection of flying pixels can be reduced, and flying pixel detection can be performed with higher precision.

<Second Process Related to Flying Pixel Detection>

The first process related to flying pixel detection has been described through an example case where the threshold Thc (Expression 10) and the threshold Thr (Expression 11) are fixed values. However, an example case where the threshold Thc (Expression 10) and the threshold Thr (Expression 11) are variable values is now described as a second process related to flying pixel detection.

Figure 20:
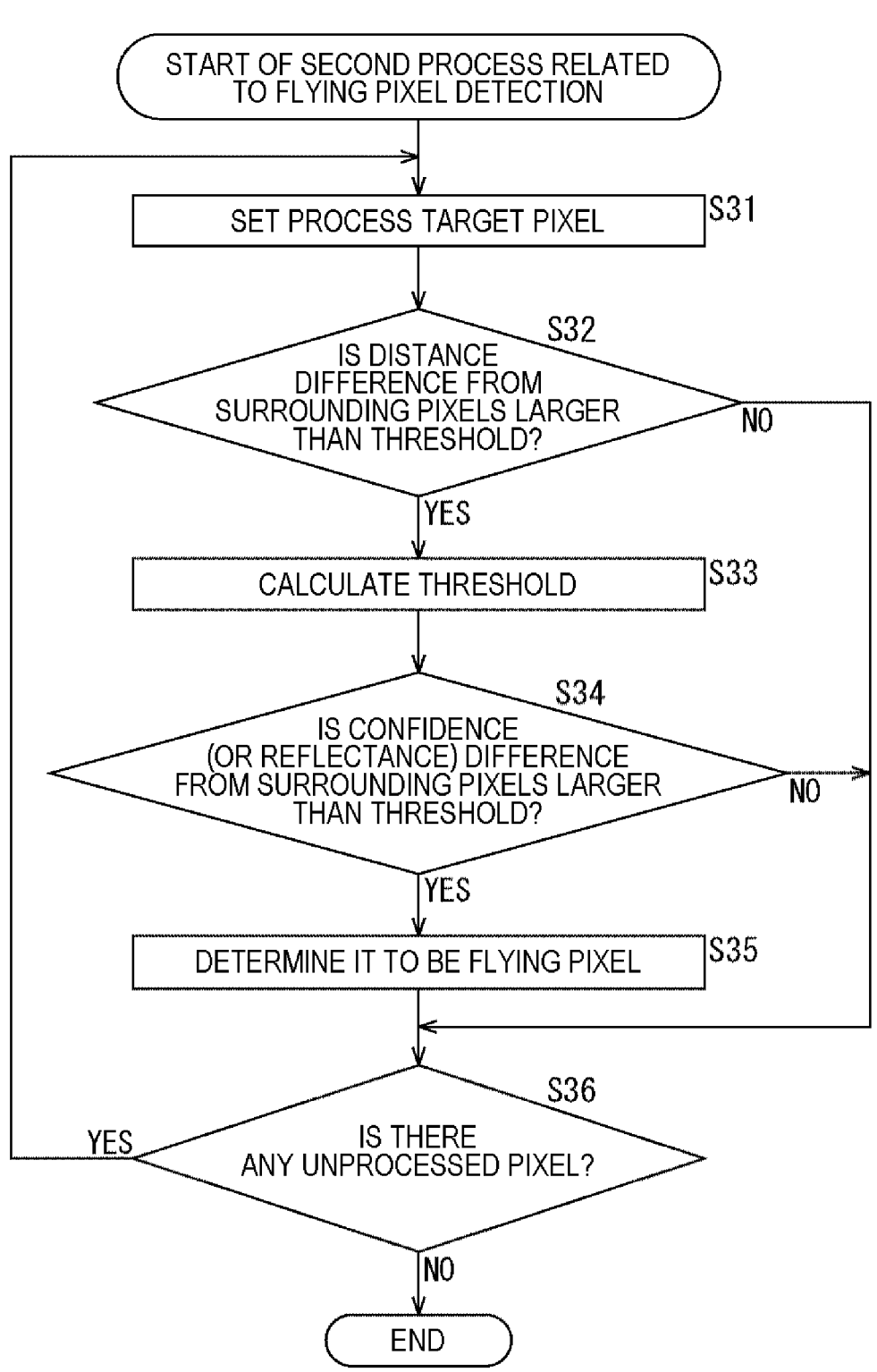
FIG. 20 is a flowchart for explaining a second process related to flying pixel detection.

FIG. 20 is a flowchart for explaining the second process related to flying pixel detection.

The processes in steps S31 and S32 are similar to the processes in steps S11 and S12 (FIG. 18). A process target pixel is set, and a check is made to determine whether or not the value of the distance difference between the pixel and a surrounding pixel is greater than a threshold. In this manner, a pixel that might be a flying pixel is detected.

In step S33, the threshold is calculated. Methods for setting the threshold will be described later. This threshold is the threshold Thc (Expression 10) or the threshold Thr (Expression 11). After the threshold is set in step S33, the process in step S34 is carried out with the set threshold.

In step S34, a check is made to determine whether or not the difference in confidence or reflectance between the process target pixel and a surrounding pixel is larger than the threshold. The process in step S34 is similar to the process in step S13 (FIG. 18), but differs in that the threshold calculated in step S33 is used as the threshold Thc (Expressions 10) or the threshold Thr (Expression 11).

Figure 28:
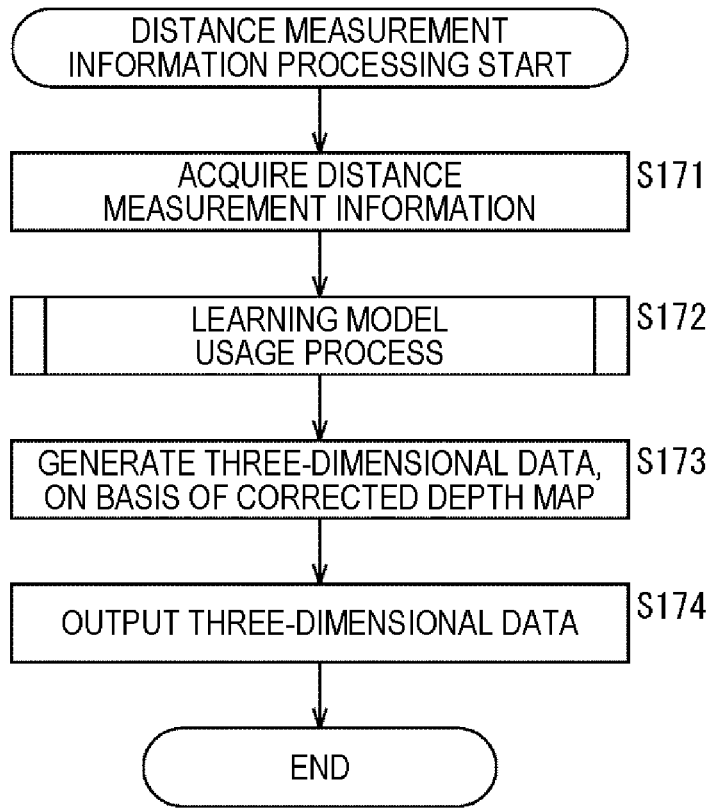
FIG. 28 is a flowchart for explaining second distance measurement information processing.

The second process related to flying pixel detection is similar to the first process except that a threshold is adaptively set, and determination to confirm a flying pixel is performed with the threshold. Steps S34 to S36 are carried out in a manner similar to the processes in steps S13 to S15 (FIG. 28).

Here, methods for calculating the threshold in step S33 are additionally explained.

First method for setting the threshold

The threshold is set at a value that is x times the average value of the confidences or the reflectances of the upper, lower, left, and right pixels. For example, x can be set at a value such as 0.1.

Referring to FIG. 19, in a case where the determination process in step S34 is performed on the basis of confidences, the average value of the confidence of the pixel 152 above the pixel 150 as the process target, the confidence of the pixel 158 below the process target, the confidence of the pixel 154 to the left of the process target, and the confidence of the pixel 156 to the right of the process target is calculated. After that, x times the average value of the confidences is set as the threshold Thc.

Referring to FIG. 19, in a case where the determination process in step S34 is performed on the basis of reflectances, the average value of the reflectance of the pixel 152 above the pixel 150 as the process target, the reflectance of the pixel 158 below the process target, the reflectance of the pixel 154 to the left of the process target, and the reflectance of the pixel 156 to the right of the process target is calculated. After that, x times the average value of the reflectances is set as the threshold Thr.

Note that, in a case where processing is performed with the use of pixels located in one of the vertical and horizontal directions as in Expression (10) and Expression (11), the threshold may be set with the use of the pixels aligned in that one direction. That is, although the upper, lower, left, and right pixels are used in the above example, the threshold value may be calculated with the use of pixels aligned in the vertical direction or pixels aligned in the horizontal direction.

Note that the same applies to the setting methods described below. Although the upper, lower, left, and right pixels are used in the example cases described below, the threshold may of course be calculated with the use of the pixels above and below the process target or the pixels to the right and left of the process target.

Second Method for Setting the Threshold

The threshold is set at a value that is x times the standard deviation of the confidences or the reflectances of the upper, lower, left, and right pixels. For example, x can be set at a value such as 0.2.

Referring to FIG. 19, in a case where the determination process in step S34 is performed on the basis of confidences, the standard deviation of the confidence of the pixel 152 above the pixel 150 as the process target, the confidence of the pixel 158 below the process target, the confidence of the pixel 154 to the left of the process target, and the confidence of the pixel 156 to the right of the process target is calculated. After that, x times the standard deviation of the confidences is set as the threshold Thc.

Referring to FIG. 19, in a case where the determination process in step S34 is performed on the basis of reflectances, the standard deviation of the reflectance of the pixel 152 above the pixel 150 as the process target, the reflectance of the pixel 158 below the process target, the reflectance of the pixel 154 to the left of the process target, and the reflectance of the pixel 156 to the right of the process target is calculated. After that, x times the standard deviation of the reflectances is set as the threshold Thr.

Third Method for Setting the Threshold

The threshold is set at a value that is x times the difference between the greatest value and the smallest value of the confidences or the reflectances of the upper, lower, left, and right pixels. For example, x can be set at a value such as 0.2.

Referring to FIG. 19, in a case where the determination process in step S34 is performed on the basis of confidences, the greatest value and the smallest value among the confidence of the pixel 152 above the pixel 150 as the process target, the confidence of the pixel 158 below the process target, the confidence of the pixel 154 to the left of the process target, and the confidence of the pixel 156 to the right of the process target are detected. The difference between the greatest value and the smallest value is then calculated. Further, x times the difference value is set as the threshold Thc.

Referring to FIG. 19, in a case where the determination process in step S34 is performed on the basis of reflectances, the greatest value and the smallest value among the reflectance of the pixel 152 above the pixel 150 as the process target, the reflectance of the pixel 158 below the process target, the reflectance of the pixel 154 to the left of the process target, and the reflectance of the pixel 156 to the right of the process target are detected. The difference between the greatest value and the smallest value is then calculated. Further, x times the difference value is set as the threshold Thr.

Fourth Method for Setting the Threshold

The threshold is set at a value that is x times the confidence or the reflectance of the process target pixel. For example, x can be set at a value such as 0.1.

Referring to FIG. 19, in a case where the determination process in step S34 is performed with the use of the confidence, x times the confidence of the pixel 150 as the process target is set as the threshold Thc.

Referring to FIG. 19, in a case where the determination process in step S34 is performed with the use of the reflectance, x times the reflectance of the pixel 150 as the process target is set as the threshold Thr.

Fifth Method for Setting the Threshold

The sum of the squares of distances of two pixels that are the process target pixel and an adjacent pixel is set as the threshold. The fifth method for setting the threshold is implemented in a case where the determination process in step S34 is performed with the use of reflectance.

In a case where the threshold is set with the use of the pixel 150 as the process target (FIG. 19) and the pixel 152 (FIG. 19) located above the pixel 150, the sum of the square $(d_{150}^2)$ of the distance $(d_{150})$ of the pixel 150 and the square $(d_{152}^2)$ of the distance $(d_{152})$ of the pixel 152 is set as the threshold Thr.

$$\text{Threshold } Thr = (d_{150}^2) + (d_{152}^2) \tag{12}$$

Note that, although an example case where the pixel located above the process target pixel is used has been described herein, it is of course possible to use a pixel located at an adjacent position other than the position above the process target pixel.

The derivation process according to the fifth setting method is now briefly described. In the description below, d represents a distance (depth value), c represents a true value of confidence, c' represents a measured value of confidence, r represents a true value of reflectance, and r' represents a measured value of reflectance.

An error in confidence and an error in reflectance can be expressed as in Expression (13) shown below.

[Mathematical Formula 6]

$$c \in [c'-1, c'+1]$$

$$r = cd^2 \in [r'-d^2, r'+d^2] \tag{13}$$

Figure 21:
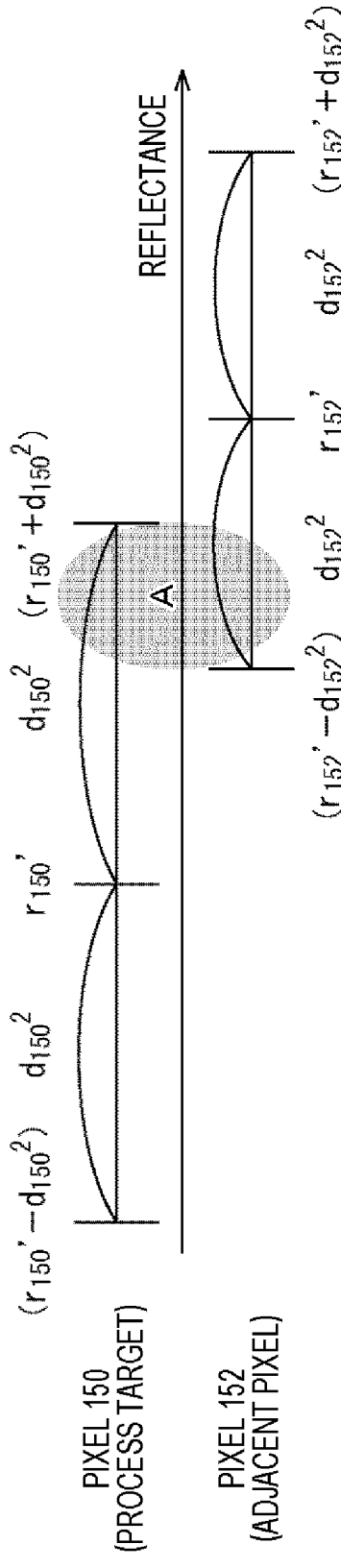
FIG. 21 is a diagram for explaining setting of a threshold.

For example, the relationship between the error, the measured value, and the true value of the pixel 150 as the process target, and the relationship between the error and the measured value of the adjacent pixel 152 can be expressed as shown in FIG. 21.

The upper part of FIG. 21 is a relationship diagram of the pixel 150 (process target). In a case where the measured value $r_{150}'$ of the reflectance of the pixel 150 is put at the center, the true value $r_{150}$ falls between $(r_{150}'31\ d_{150}^2)$ and $(r_{150}'+d_{150}^2)$.

The lower part of FIG. 21 is a relationship diagram of the pixels 152 (adjacent pixel). In a case where the measured value $r_{152}'$ of the reflectance of the pixel 152 is put at the center, the true value $r_{152}$ falls between $(r_{152}'-d_{152}^2)$ and $(r_{152}'+d_{152}^2)$.

The true value r of the reflectance of the pixel 150 is considered to fall within a range A in which the relationship diagram of the pixel 150 (process target) and the relationship diagram of the pixel 152 (adjacent pixel) overlap. The range A exists when Expression (14) shown below is satisfied.

$$|r_{150}'r_{152}'| < d_{150}^2 + d_{152}^2 \tag{14}$$

That is, the range A exists in a case where the absolute value of the difference between the measured value $r_{150}'$ of the reflectance of the pixel 150 and the measured value $r_{152}'$ of the reflectance of the pixel 152 is smaller than the sum of the square of the distance $d_{150}$ of the pixel 150 and the square of the distance $d_{152}$ of the pixel 152.

When Expression (14) is satisfied, it can be assumed that the true value r exists. This means that there is a possibility that the true value r does not exist when Expression (14) is not satisfied. A time when Expression (14) is not satisfied is a time when Expression (15) is satisfied, for example.

$$|r_{150}-r_{152}'d_{150}^2+d_{152}^2 \tag{15}$$

In a case where Expression (15) is satisfied, it is assumed that there is a possibility that the true value r does not exist, and the process target pixel might be a defective pixel. In this case, it is assumed that the pixel might be a flying pixel.

Expression (15) is now compared with Expression (11). Here, a part of Expression (11) (the expression in a case where the pixels aligned in the vertical direction are used) is shown again.

$$(|Tr-Pr|>Thr, \text{ and } |Br-Pr|>Thr) \tag{11}$$

Attention is now paid to ($|Tr-Pr|>Thr$) in Expression (11), for example. Tr represents a measured value of the reflectance of the pixel 152 (FIG. 19), and corresponds to the measured value $r_{152}'$. Pr represents a measured value of the reflectance of the pixel 150 (FIG. 19), and corresponds to the measured value $r_{150}'$. Therefore, $|Tr-Pr|$ is $|r_{150}'-r_{152}'|$. That is, the left side of Expression (11) can be regarded as equal to the left side of Expression (15).

Accordingly, the threshold Thr in the right side of Expression (11) can be ($d_{150}^2+d_{152}^2$), which is the right side of Expression (15).

As described above, by the fifth method for setting the threshold value, the sum of the squares of the distances of two pixels that are the process target pixel and an adjacent pixel can be set as the threshold Thr.

Although the first to fifth setting methods have been described as examples of methods for setting the threshold herein, these are merely examples, and do not indicate any restrictions. Therefore, the threshold can be set by some other method.

As a defective pixel is detected and confirmed through two determination processes in the above manner, it is possible to reduce false detection of defective pixels. Thus, the accuracy of distance measurement can be further improved.

Example Configuration of an Electronic Apparatus

The distance measuring device 10 described above can be mounted in an electronic apparatus such as a smartphone, a tablet terminal, a mobile telephone, a personal computer, a game machine, a television receiver, a wearable terminal, a digital still camera, or a digital video camera, for example.

Figure 22:
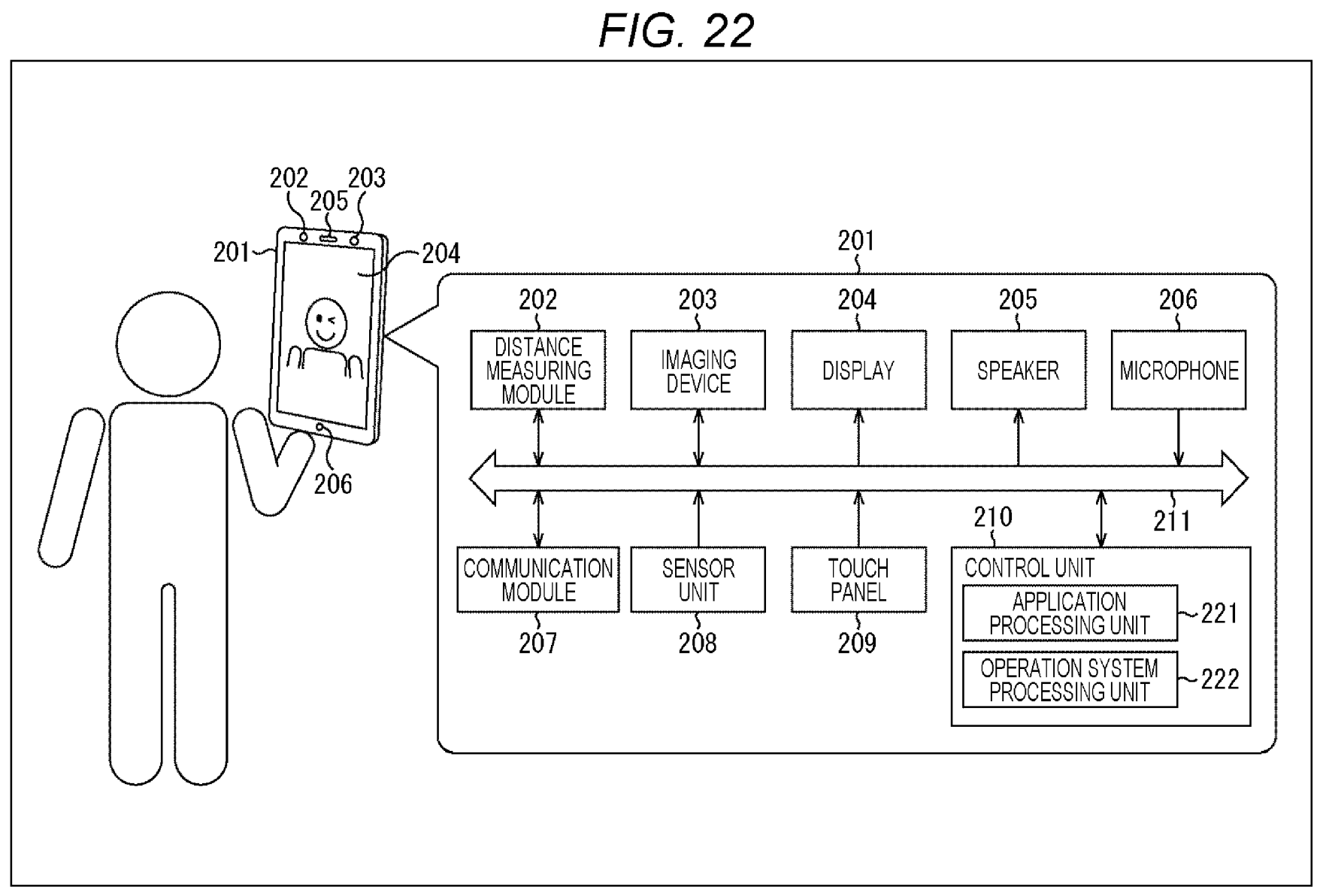

FIG. 22 is a block diagram showing an example configuration of a smartphone as an electronic apparatus in which the distance measuring device 10 is mounted as a distance measuring module.

As shown in FIG. 22, a smartphone 201 includes a distance measuring module 202, an imaging device 203, a display 204, a speaker 205, a microphone 206, a communication module 207, a sensor unit 208, a touch panel 209, and a control unit 210, which are connected to one another via a bus 211. Further, in the control unit 210, a CPU executes a program, to achieve functions as an application processing unit 221 and an operation system processing unit 222.

The distance measuring device 10 in FIG. 1 is applied to the distance measuring module 202. For example, the distance measuring module 202 is disposed in the front surface of the smartphone 201, and performs distance measurement for the user of the smartphone 201, to output the depth value of the surface shape of the user's face, hand, finger, or the like as a measurement result.

The imaging device 203 is disposed in the front surface of the smartphone 201, and acquires an image showing the user by performing imaging of the user of the smartphone 201 as the object. Note that, although not shown in the drawing, the imaging device 203 may also be disposed in the back surface of the smartphone 201.

The display 204 displays an operation screen for performing processing with the application processing unit 221 and the operation system processing unit 222, an image captured by the imaging device 203, or the like. The speaker 205 and the microphone 206 output the voice from the other end, and collect the voice of the user, when a voice call is made with the smartphone 201, for example.

The communication module 207 performs communication via a communication network. The sensor unit 208 senses velocity, acceleration, proximity, and the like, and the touch panel 209 acquires a touch operation performed by the user on an operation screen displayed on the display 204.

The application processing unit 221 performs processing for providing various services through the smartphone 201. For example, the application processing unit 221 can perform a process for creating a face by computer graphics that virtually reproduces the user's expression and displaying the face on the display 204, on the basis of the depth supplied from the distance measuring module 202. The application processing unit 221 can also perform a process for creating three-dimensional shape data of a three-dimensional object, for example, on the basis of the depth supplied from the distance measuring module 202.

The operation system processing unit 222 performs a process to achieve the basic functions and operations of the smartphone 201. For example, the operation system processing unit 222 can perform a process for authenticating the user's face on the basis of the depth value supplied from the distance measuring module 202, and releasing the lock on the smartphone 201. Further, the operation system processing unit 222 performs a process for recognizing a gesture of the user on the basis of the depth value supplied from the distance measuring module 202, and then performs a process for inputting various operations in accordance with the gesture, for example.

<Recording Medium>

The above described series of processes can be performed by hardware, or can be performed by software. In a case where the series of processes are to be performed by software, the program that forms the software is installed into a computer. Here, the computer may be a computer incorporated into special-purpose hardware, or may be a general-purpose personal computer or the like that can execute various kinds of functions, having various kinds of programs installed thereinto, for example.

Figure 23:
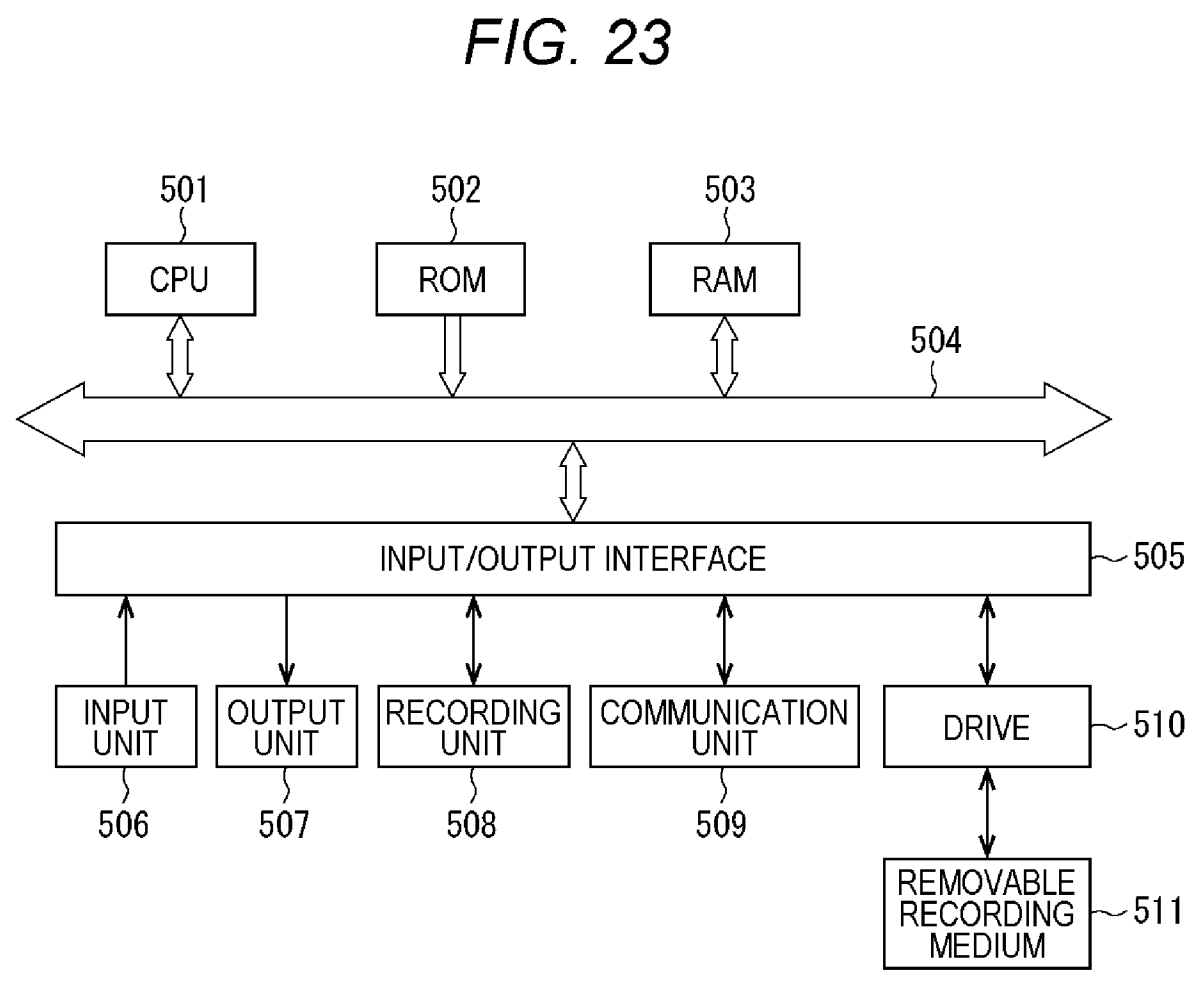

FIG. 23 is a block diagram showing an example configuration of the hardware of a computer that performs the above described series of processes in accordance with a program. In the computer, a central processing unit (CPU) 501, a read only memory (ROM) 502, and a random access memory (RAM) 503 are connected to one another by a bus 504. An input/output interface 505 is further connected to the bus 504. An input unit 506, an output unit 507, a storage unit 508, a communication unit 509, and a drive 510 are connected to the input/output interface 505.

The input unit 506 is formed with a keyboard, a mouse, a microphone, and the like. The output unit 507 is formed with a display, a speaker, and the like. The storage unit 508 is formed with a hard disk, a nonvolatile memory, or the like. The communication unit 509 is formed with a network interface or the like. The drive 510 drives a removable recording medium 511 such as a magnetic disc, an optical disc, a magnetooptical disc, or a semiconductor memory.

In the computer having the above described configuration, for example, the CPU 501 loads a program stored in the storage unit 508 into the RAM 503 via the input/output interface 505 and the bus 504, and executes the program, so that the above described series of processes are performed.

The program to be executed by the computer (the CPU 501) may be recorded on the removable recording medium 511 as a packaged medium or the like, and be then provided, for example. Alternatively, the program can be provided via a wired or wireless transmission medium, such as a local area network, the Internet, or digital satellite broadcasting.

In the computer, the program can be installed into the storage unit 508 via the input/output interface 505 when the removable recording medium 511 is mounted in the drive 510. Alternatively, the program may be received by the communication unit 509 through a wired or wireless transmission medium, and be installed into the storage unit 508. Other than the above, the program may be installed beforehand into the ROM 502 or the storage unit 508.

Note that the program to be executed by the computer may be a program for performing processes in chronological order in accordance with the sequence described in this specification, or may be a program for performing processes in parallel or performing a process when necessary, such as when there is a call.

Example Configuration Using Machine Learning

In a configuration to which the technology according to the present disclosure (the present technology) is applied, a configuration using machine learning can be adopted. For example, a configuration using machine learning can be adopted in an electronic apparatus equipped with the above-described distance measuring device 10.

Figure 24:
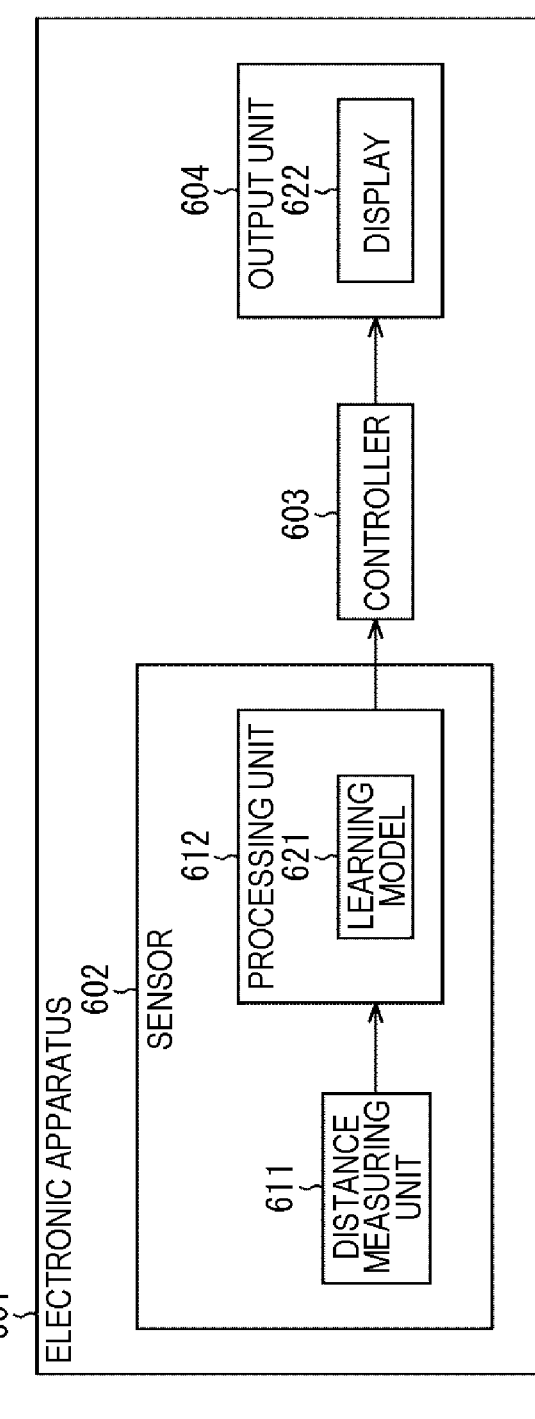
FIG. 24 is a diagram showing an example configuration of an embodiment of an electronic apparatus to which the present technology is applied.

FIG. 24 is a diagram showing an example configuration of an embodiment of an electronic apparatus to which the present technology is applied.

An electronic apparatus 601 is an apparatus such as a smartphone, a tablet terminal, a mobile telephone, a personal computer, a game machine, a television receiver, a wearable terminal, a digital still camera, or a digital video camera. For example, the electronic apparatus 601 may be the smartphone 201 shown in FIG. 22. The electronic apparatus 601 includes a sensor 602, a controller 603, and an output unit 604. The sensor 602 includes a distance measuring unit 611 and a processing unit 612.

The distance measuring unit 611 is designed to correspond to the distance measuring device 10 shown in FIG. 1, and includes a lens 11, a light receiving unit 12, a signal processing unit 13, a light emitting unit 14, and a light emission control unit 15. The distance measuring unit 611 irradiates an object with light, and receives the light reflected by the object, to measure the distance to the object. The distance measuring unit 611 acquires distance measurement information obtained by measuring the distance to the object, and supplies the distance measurement information to the processing unit 612.

For example, a depth map having data (distance information) regarding distance measurement for each pixel can be used as the distance measurement information. In the depth map, a group of pixels can be represented by an X-Y-Z coordinate system (such as a Cartesian coordinate system) or a polar coordinate system. The depth map includes data regarding a correction target pixel in some cases. Also, three-dimensional data can be generated using the depth map. For example, the three-dimensional data is expressed by a point cloud, a series (a data structure) of X-Y-Z coordinate points, a mesh (surface), or the like. Note that the distance measurement information may include a luminance value, confidence information, and the like, in addition to depth information such as distance information (depth value).

Correction target pixels include a defective pixel, a flying pixel, and the like. As described above with reference to FIGS. 14 to 17, a flying pixel is a pixel that belongs to neither the foreground object 101 nor the background object

102 at the boundary between the foreground object 101 and the background object 102. In the description below, a defective pixel is explained as an example of a correction target pixel.

The processing unit 612 is a processor such as a CPU, for example. The processing unit 612 has the functions corresponding to the filter unit 16. That is, in the distance measuring device 10 in FIG. 1, the filter unit 16 identifies and corrects a defective pixel. However, part or all of the processes corresponding to this may be performed by the processing unit 612 as described below. Note that, instead of the distance measuring unit 611, the processing unit 612 may have the functions corresponding to the signal processing unit 13.

As described above, in the sensor 602, the distance measuring unit 611 has a function of receiving the reflected light that is the irradiation light reflected by the object and outputting a signal obtained from the reception, and the processing unit 612 has a function of performing signal processing using the signal output from the distance measuring unit 611. Although details will be described later with reference to FIG. 40 and others, the processing unit 612 may be provided inside the sensor 602 or may be provided in the electronic apparatus 601 or a server. Further, the processing unit 612 may perform all the processes inside the sensor 602, or may perform processes in a distributed manner in which some processes are performed by a processor in the sensor, and the remaining processes are then performed by the processor of the electronic apparatus 601 or a server.

The processing unit 612 performs a process using a machine-learned learning model 621 on at least part of the distance measurement information supplied from the distance measuring unit 611, and outputs distance measurement information after the defective pixel included in the distance measurement information is corrected (this distance measurement information will be hereinafter referred to as the corrected distance measurement information as appropriate).

The process using the learning model 621 includes a first process for correcting a defective pixel using the depth map including the defective pixel as an input, and a second process for outputting the corrected depth map.

The first process includes an identifying process for identifying a defective pixel, and a correction process for correcting the defective pixel identified through the identifying process. That is, in the first process, the identifying process is performed as a first step, and the correction process is performed as a second step.

In the identifying process or the correction process, a process using the learning model 621 can be performed. Hereinafter, a process using machine learning such as a process using the learning model 621 will be also referred to as the machine learning process, as appropriate.

For example, the learning model 621 in the identifying process is a learning model that receives an input of a depth map including a defective pixel, and outputs positional information about the defective pixel included in the depth map. Also, for example, the learning model 621 in the correction process is a learning model that receives an input of the depth map including the defective pixel and the positional information about the defective pixel, and outputs a corrected depth map or positional information about the corrected defective pixel. Note that methods for generating a learning model will be described later in detail with reference to FIGS. 29 to 31, 36, 37, and others.

Further, the identifying process or the correction process is not limited to the machine learning process, but a process similar to the process described above with reference to FIG. 18 or 20 may be performed. That is, in the identifying process, instead of the machine learning process, a process can be performed to identify the defective pixel, on the basis of a result of distance information threshold determination as to the process target pixel in the depth map, or confidence information or reflectance information threshold determination. Further, in the correction process, signal processing can be performed in place of the machine learning process, to change the process target pixel in the depth map to the correct position, or delete the process target pixel. Thus, the defective pixel can be corrected. Hereinafter, the signal processing such as the process described above with reference to FIG. 18 or 20 will be also referred to as the regular processing, as appropriate.

Note that the processing unit 612 may generate three-dimensional data, on the basis of the corrected depth map. In this three-dimensional data generating process, the machine learning process may be used, or signal processing (the regular processing) for generating three-dimensional data may be used. That is, the machine learning process can be used in at least one of the identifying process, the correction process, and the three-dimensional data generating process.

The corrected distance measurement information obtained in this manner is output from the processing unit 612 of the sensor 602 to the controller 603. The controller 603 is a processor such as a CPU, for example. The processor of the controller 603 may be the same as or different from the processor used in the processing unit 612. The output unit 604 includes a display 622, for example. The controller 603 executes software such as an application and middleware, to cause the display 622 to display various kinds of information. For example, the controller 603 causes the display 622 to display various kinds of information, on the basis of the corrected distance measurement information output from the sensor 602. Note that the output unit 604 may include a communication module, and transmit various kinds of information from the controller 603 to other devices via a network.

Figure 25:
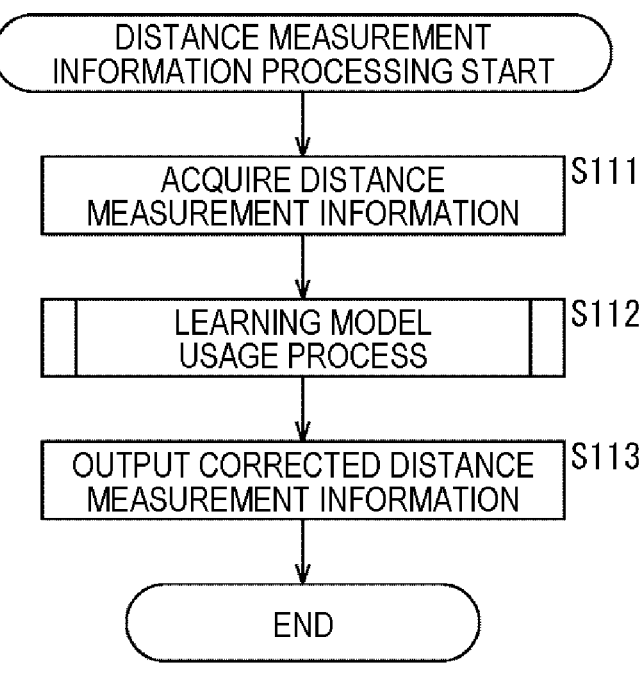
FIG. 25 is a flowchart for explaining first distance measurement information processing.

Next, the processes to be performed by the sensor 602 of the electronic apparatus 601 in FIG. 24 are described with reference to FIGS. 25 to 28. Referring first to FIG. 25, distance measurement information processing is described.

In step S111, the distance measuring unit 611 measures the distance to the object, and acquires distance measurement information obtained through the measurement.

In step S112, the processing unit 612 performs a learning model usage process, using the distance measurement information acquired by the distance measuring unit 611. In this learning model usage process, a process using the learning model 621 is performed on at least part of the distance measurement information (a yet-to-be-corrected depth map, for example), and the distance measurement information (the corrected depth map, for example) after correction of the defective pixel included in the distance measurement information is acquired. The learning model usage process will be described later in detail with reference to FIG. 26.

In step S113, the processing unit 612 outputs the corrected distance measurement information obtained in the learning model usage process, to the controller 603.

Next, the learning model usage process corresponding to step S112 in FIG. 25 is described with reference to FIG. 26.

In step S131, the processing unit 612 performs a defective pixel correction process, using the distance measurement information. In this defective pixel correction process, the defective pixel is corrected, with the depth map including the defective pixel being an input.

Figure 27:
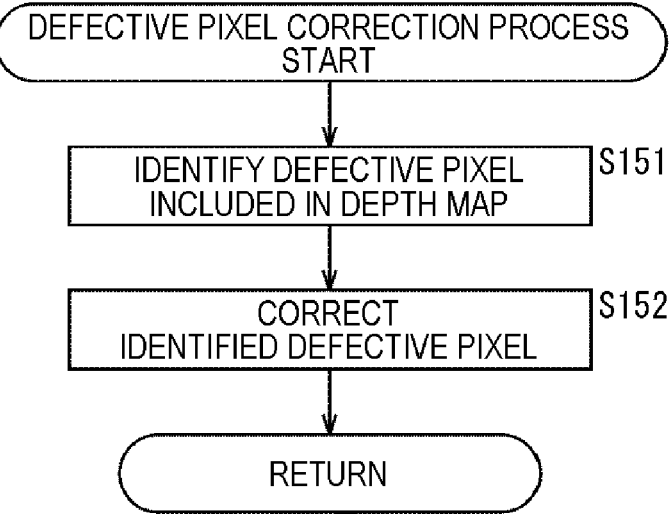
FIG. 27 is a flowchart for explaining a defective pixel correction process.

Here, the defective pixel correction process is described in detail, with reference to FIG. 27. In step S151, the processing unit 612 identifies the defective pixel included in the input depth map. In this identifying process, the machine learning process or the regular processing is performed.

In a case where the machine learning process is performed as the identifying process, the processing unit 612 uses, as the learning model 621, a learning model that receives an input of the depth map including the defective pixel, and outputs positional information about the defective pixel included in the depth map. As the processing unit 612 inputs the depth map including the defective pixel to the learning model 621, positional information about the defective pixel included in the input depth map is output. Thus, the defective pixel can be identified. A method for generating the learning model to be used in the identifying process will be described later in detail with reference to FIGS. 29 to 31.

Further, in a case where a neural network is used as machine learning in the machine learning process used in the identifying process, an autoencoder is used, so that the defective pixel included in the input depth map can be identified. A method for generating the learning model in a case where an autoencoder is used will be described later in detail with reference to FIGS. 32 and 33.

In a case where the regular processing is performed as the identifying process, the processing unit 612 identifies the defective pixel, on the basis of a result of distance information threshold determination as to the process target pixel in the depth map, or a result of confidence information or reflectance information threshold determination.

Specifically, as described above with reference to FIG. 18 or 20, in the regular processing, distance information (depth value) threshold determination is performed to determine whether or not the difference in distance between the process target pixel (the pixel 123, for example) in the depth map and a surrounding pixel (a pixel in the pixel group 121 around the pixel 123, for example) is larger than a predetermined threshold (step S12 in FIG. 18). In a case where the difference in distance is determined to be larger than the predetermined threshold, a check is made to determine whether or not the difference in confidence or reflectance between the process target pixel (the pixel 150, for example) and a surrounding pixel (the pixel 156 on the right side of the pixel 150, for example) is larger than a predetermined threshold (step S13 in FIG. 18). In a case where the difference in confidence or reflectance is determined to be larger than the predetermined threshold, the process target pixel is then identified as a defective pixel (step S14 in FIG. 18).

After the defective pixel included in the depth map is identified in step S151, the process moves on to step S152. In step S152, the processing unit 612 corrects the identified defective pixel. In this correction process, the machine learning process or the regular processing is performed.

In a case where the machine learning process is performed as the correction process, a learning model that receives an input of the depth map including the defective pixel and the positional information about the defective pixel, and outputs a corrected depth map or positional information about the corrected defective pixel is used as the learning model 621 in the processing unit 612. As the processing unit 612 inputs the depth map including the defective pixel and the positional information about the defective pixel to the learning model 621, the corrected depth map or the positional information about the corrected defective pixel is output. Thus, the defective pixel can be corrected. A method for generating the learning model to be used in the correction process will be described later in detail with reference to FIGS. 36 and 37.

In a case where the regular processing is performed as the correction process, the processing unit 612 corrects the defective pixel by changing the process target pixel in the depth map to the correct position or deleting the process target pixel through signal processing. Specifically, as described above with reference to FIG. 18 or 20, in the regular processing, the process target pixel identified (confirmed) as the defective pixel is changed to a pixel belonging to the pixel group 101 of the foreground object 101 or the pixel group 122 of the background object 102, or is deleted. Thus, the defective pixel is corrected.

As described above, in the defective pixel correction process, the identifying process for identifying a defective pixel included in a depth map is performed as the first step, and the correction process for correcting the identified defective pixel is performed as the second step.

Note that, in a case where the machine learning process is used in the identifying process and the correction process, the identifying process and the correction process may be performed integrally (simultaneously). For example, in a case where a neural network is used for machine learning, it is possible to correct a defective pixel included in an input depth map by using an autoencoder. A method for generating the learning model in a case where an autoencoder is used will be described later in detail with reference to FIGS. 34 and 35.

Figure 26:
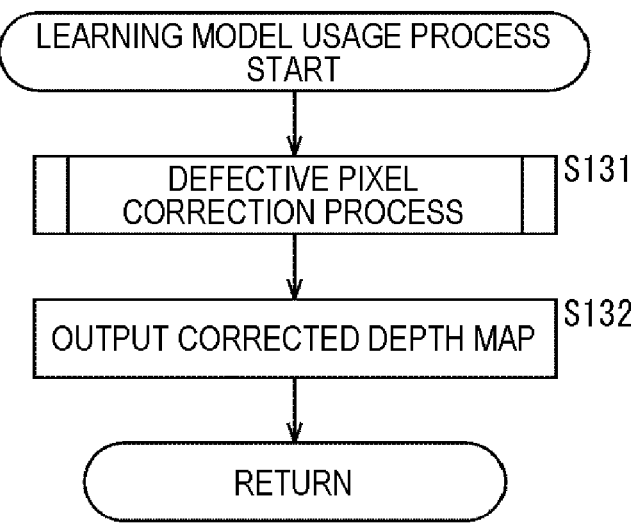
FIG. 26 is a flowchart for explaining a learning model usage process.

After the identified defective pixel is corrected in step S152, the process moves on to step S132 in FIG. 26. In step S132, the processing unit 612 outputs a depth map (a corrected depth map) including the defective pixel corrected in the learning model usage process.

As described above, in the distance measurement information processing, a process using the learning model 621 is performed as the learning model usage process by the processing unit 612 on at least part of the distance measurement information acquired by the distance measuring unit 611. For example, the machine learning process can be used for at least either the identifying process or the correction process included in the first process. In a case where the machine learning process is performed in neither the identifying process nor the correction process at this point of time, the regular processing can be performed.

Note that, in the distance measurement information processing, three-dimensional data may be generated with the use of a corrected depth map. FIG. 28 shows the distance measurement information processing in a case where three-dimensional data is to be generated.

In steps S171 and S172 in FIG. 28, a learning model usage process using the distance measurement information acquired by the distance measuring unit 611 is performed, as in steps S111 and S112 in FIG. 25.

In step S173, the processing unit 612 generates three-dimensional data, on the basis of the corrected depth map. In this three-dimensional data generating process, the machine learning process may be used, or the regular processing may be used. For example, a point cloud, a data structure, or the like is generated as the three-dimensional data. In step S174, the processing unit 612 outputs the generated three-dimensional data to the controller 603.

Note that the distance measurement information processing described with reference to FIG. 28 may be performed in an end-to-end machine learning process. Specifically, in the sensor 602 of the electronic apparatus 601, the processing unit 612 may output three-dimensional data by using the learning model 621 when distance measurement information (a depth map including a defective pixel) is input from the distance measuring unit 611. As the learning model 621 herein, a generation model of a generative adversarial network (GAN), a variational autoencoder (VAE), or the like can be used.

As described above, in an end-to-end machine learning, learning is performed by replacing the machine learning process that requires multi-stage processes from receipt of input data to a result output with one neural network including a plurality of layers that performs various processes. Using the end-to-end machine learning, the processing unit 612 to which the distance measurement information is supplied from the distance measuring unit 611 performs the machine learning process with the learning model 621, and outputs three-dimensional data.

As described above, in the electronic apparatus 601, the processing unit 612 of the sensor 602 performs a process including the identifying process for identifying a defective pixel included in a depth map and the correction process for correcting the identified defective pixel, as the distance measurement information processing using the distance measurement information supplied from the distance measuring unit 611.

Furthermore, the distance measurement information processing can include a three-dimensional data generating process for generating three-dimensional data.

In the distance measurement information processing, the machine learning process can be used in at least one process among the identifying process, the correction process, and the three-dimensional data generating process. That is, in the identifying process, the correction process, and the three-dimensional data generating process, the machine learning process may be performed in all the processes, or the machine learning process may be performed in some of the processes while the regular processing is performed in the remaining processes. Specifically, after the machine learning process or the regular processing is performed in the identifying process, the machine learning process or the regular processing is performed in the correction process, and the machine learning process or the regular processing is further performed in the three-dimensional data generating process.

Here, for ease of explanation, the identifying process, the correction process, and the three-dimensional data generating process are represented by the alphabets "A", "B", and "C", respectively, the machine learning process and the regular processing are represented by the numbers "1" and "2", respectively, and the alphabets and the numbers are connected by "–". In this case, a series of processes in the distance measurement information processing are performed as one of the combinations A-1 or A-2, B-1 or B-2, and C-1 or C-2. In the description below, A-1 (a case where the machine learning process is performed in the identifying process) and B-1 (a case where the machine learning process is performed in the correction process) among those combinations are explained in detail.

Figure 29:
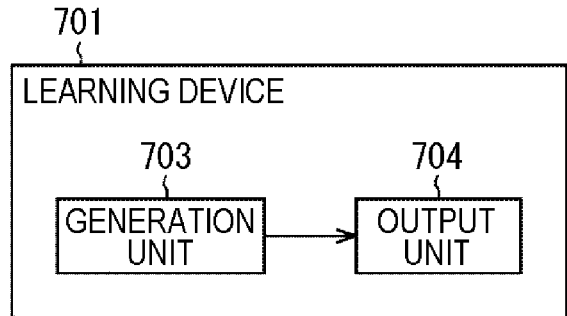
FIG. 29 is a diagram showing an example configuration of an embodiment of a learning device to which the present technology is applied.
Figure 30:
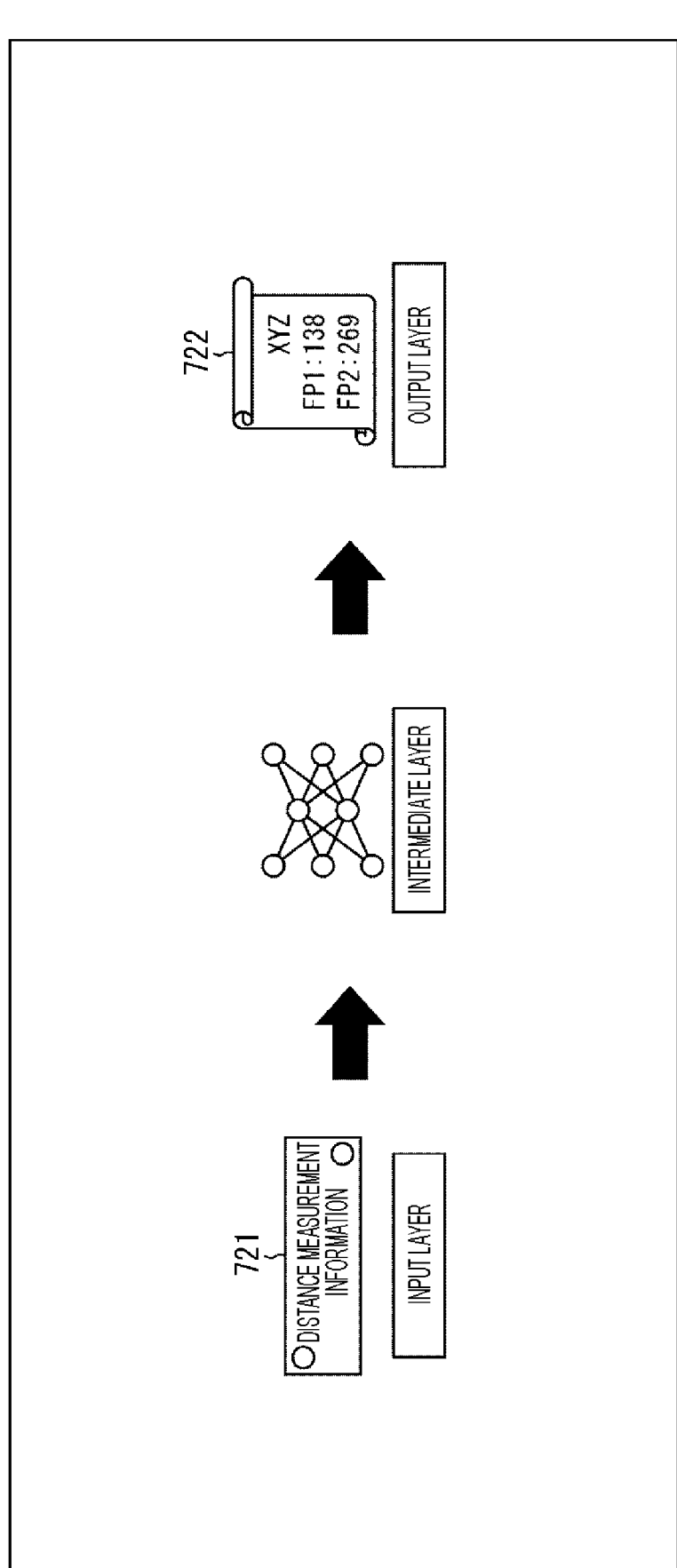
FIG. 30 is a diagram showing an example of a learning model.
Figure 31:
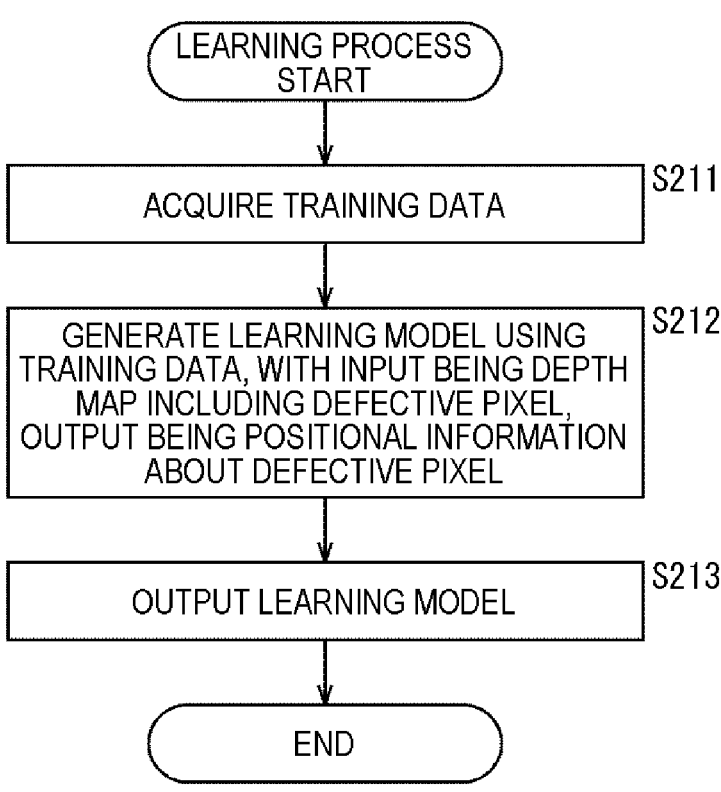
FIG. 31 is a flowchart for explaining a learning process for generating the learning model.

(A-1) Example Case where the Machine Learning Process is Performed in the Identifying Process Referring now to FIGS. 29 to 31, a case where the machine learning process is performed in the identifying process is described. In a case where the machine learning process is performed in the identifying process, the learning model to be used in the machine learning process is generated beforehand by a learning device.

FIG. 29 shows an example configuration of an embodiment of a learning device to which the present technology is applied.

A learning device 701 generates a learning model, using training data. The learning device 701 may be the same device as the electronic apparatus 601 (such as a smart-phone), or may be a different device (such as a server). The learning device 701 includes a generation unit 703 and an output unit 704.

The generation unit 703 is a processor such as a CPU, for example. The processor of the generation unit 703 may be the same as or different from the processor of the processing unit 612 or the processor of the controller 603. Alternatively, all the processors of the generation unit 703, the processing unit 612, and the controller 603 may be the same processors. The generation unit 703 acquires training data. For example, the training data is a depth map including a defective pixel, and includes a depth map in which the position of the defective pixel is identified. In addition to measurement data obtained through actual measurement, data generated by a simulator can be used as the training data.

For example, the simulator uses information regarding the distance measuring unit 611 (such as the type of the sensor and distortion of the lens) as parameters, and virtually processes data (performs a process for generating a depth map purposefully including a defective pixel at a specific position or the like). As a result, a data set for identifying a defective pixel, such as a depth map including a defective pixel and a depth map in which the position of the defective pixel is identified, is generated.

The generation unit 703 generates a learning model using the acquired training data, and supplies the learning model to the output unit 704. For example, the generation unit 703 generates a learning model that receives an input of a depth map including a defective pixel and outputs positional information about the defective pixel included in the depth map. The generation unit 703 may also perform a relearning process (an additional learning process) using data such as additional training data, to update the learned learning model. In the description below, generation and update of the learning model will be explained separately from each other. However, it can also be said that a learning model is generated by updating a learning model, and therefore, the meaning of the phrase "generation of a learning model" includes "update of a learning model".

The output unit 704 outputs the learning model supplied from the generation unit 703. For example, the output unit 704 is a communication module, and can transmit the learning model to another device via a network.

FIG. 30 shows an example of a learning model generated by the generation unit 703 of the learning device 701 in FIG. 29. FIG. 30 shows a machine-learned learning model that uses a neural network, and includes three layers: an input layer, an intermediate layer, and an output layer.

The learning model in FIG. 30 is a learning model generated with the use of training data including a depth map including defective pixels whose positions are identified, and is a learning model that receives an input of distance measurement information 721 (a depth map including defective pixels as indicated by circles in the drawing), and outputs positional information 722 about the defective pixels (coordinate information about the defective pixels included in the input depth map).

The processing unit 612 of the electronic apparatus 601 in FIG. 24 can use the learning model in FIG. 30 as the learning model 621, when performing the machine learning process in the identifying process. That is, using the learning model shown in FIG. 30, the processing unit 612 performs an arithmetic operation on the defective-pixel-including depth map input to the input layer, at the intermediate layer having the parameters that have been learned so as to determine the positions of the defective pixels. Positional information about the defective pixels included in the input depth map is output from the output layer.

In this arithmetic operation at the intermediate layer, when the position of a defective pixel is identified, it is possible to acquire the positional information about the defective pixel by identifying the defective pixel on the basis of a result of distance information threshold determination as to the process target pixel in the depth map, and a result of confidence information or reflectance information threshold determination, as in the process described above with reference to FIG. 18 or 20.

Specifically, through the distance information (depth value) threshold determination, a check is made to determine whether or not the difference in distance between the process target pixel in the depth map and a surrounding pixel is larger than a predetermined threshold (step S12 in FIG. 18). In a case where the difference in distance is determined to be larger than the predetermined threshold, a check is made to determine whether or not the difference in confidence or reflectance between the process target pixel and a surrounding pixel is larger than a predetermined threshold (step S13 in FIG. 18). In a case where the difference in confidence or reflectance is determined to be larger than the predetermined threshold, the process target pixel is then identified as a defective pixel (step S14 in FIG. 18).

The defective pixel positional information output from the output layer can be information in which the positional information is labeled on the defective pixels whose positions are identified. For example, for each piece of information for identifying a defective pixel, the defective pixel positional information can express the position of the defective pixel in the X-Y-Z coordinate system. Alternatively, a map (an abnormality probability map) showing the probability of being a defective pixel for each pixel may be used as the defective pixel positional information. According to this abnormality probability map, for example, a pixel certainly belonging to the foreground object or the background object has its value approaching 0, while a pixel with a high possibility of being a defective pixel has its value approaching 100.

Referring now to FIG. 31, a learning process for generating the learning model shown in FIG. 30 is described.

In step S211, the generation unit 703 acquires training data. This training data includes a depth map including defective pixels whose positions are identified. In addition to measurement data, data generated by a simulator can be used as the training data.

In step S212, using the acquired training data, the generation unit 703 generates a learning model that receives an input of the depth map including defective pixels, and outputs positional information about the defective pixels included in the depth map. This learning model (FIG. 30) is used as a learning model for identifying the defective pixels included in the depth map.

In step S213, the output unit 704 outputs the learning model generated by the generation unit 703. This learning model (FIG. 30) is supplied to the sensor 602 of the electronic apparatus 601, and is used when the processing unit 612 performs the identifying process for identifying a defective pixel.

As described above, in a case where the machine learning process is performed in the identifying process, a learning model that receives an input of a depth map including defective pixels, and outputs positional information about the defective pixels included in the depth map is used, so that the defective pixels included in the depth map can be identified.

Figure 32:
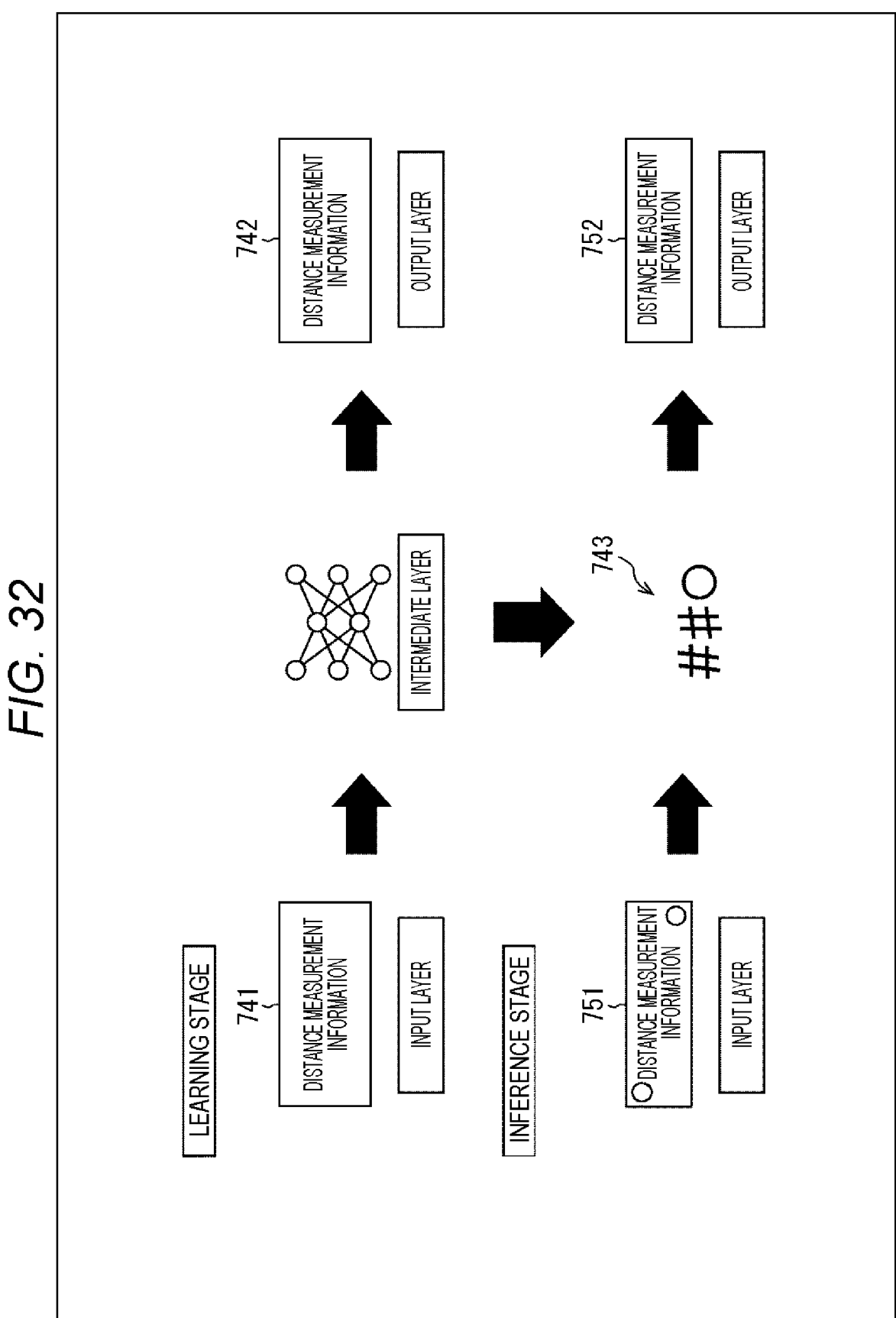
FIG. 32 is a diagram showing an example method for identifying defective pixels using an autoencoder.
Figure 33:
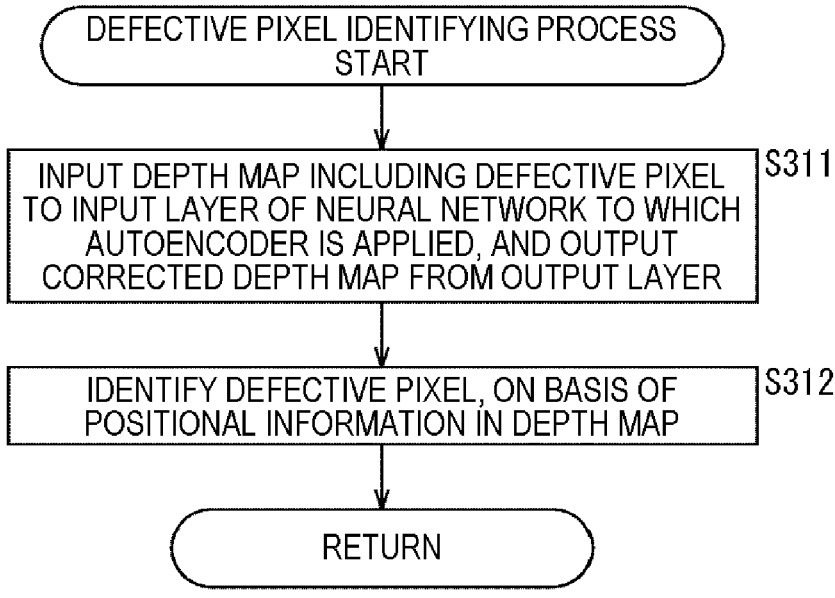
FIG. 33 is a flowchart for explaining a defective pixel identifying process.

(A-1) Another Example Case where the Machine Learning Process is Performed in the Identifying Process Referring now to FIGS. 32 to 33, another example case where the machine learning process is performed in the identifying process is described. In this example, in machine learning using a neural network, an autoencoder is used to identify defective pixels.

The autoencoder includes an encoder and a decoder. One or more feature amount values included in data are input to the autoencoder, for example. The encoder converts the input feature amount group into a compressed expression. On the other hand, the decoder generates a feature amount group from the compressed expression. At this point of time, the decoder generates data having a structure similar to that of the input data. In the learning using the autoencoder, normal data is input, and each parameter of the autoencoder is optimized so that the difference between the input data and the reconfigured data (data generated by the autoencoder) becomes smaller. Therefore, after sufficient learning is performed, the input data and the reconfigured data have substantially the same value.

FIG. 32 shows an example method for identifying defective pixels using an autoencoder. In FIG. 32, the learning process in a learning stage is shown in the upper portion, and the inference process in an inference stage is shown in the lower portion. That is, the learning process is a process to be performed by the learning device 701 (FIG. 29), and the inference process is a process to be performed by the electronic apparatus 601 (FIG. 24). The learning process and the inference process are included in the machine learning process, and are performed by the same device in a case where the learning device 701 and the electronic apparatus 601 are formed as the same device.

In the learning stage, the learning process using an autoencoder is performed on distance measurement information 741 input to the input layer, so that distance measurement information 742 is output from the output layer. In a case where a normal depth map not including any defective pixel is input as the distance measurement information 741, a depth map not including any defective pixel is output as the distance measurement information 742. At this point of time, parameters that are optimized so that the input normal depth map and the reconfigured depth map have the same value can be extracted as feature amounts 743.

In the inference stage, the inference process using a learning model (a neural network) reflecting the feature amounts 743 obtained in the learning stage is performed on distance measurement information 751 input to the input layer, so that distance measurement information 752 is output from the output layer. In a case where a depth map including defective pixels is input as the distance measurement information 751, the portions of the defective pixels cannot be reconfigured in the inference process, and a depth map including substantially no defective pixels is output as the distance measurement information 752.

Accordingly, when performing the machine learning process in the identifying process, the processing unit 612 of the electronic apparatus 601 in FIG. 24 can identify the pixels having different positional information between the depth map input to the input layer and the depth map output from the output layer as defective pixels. For example, in a case where each pixel is expressed in an X-Y-Z coordinate system in a depth map, a pixel having a large difference in coordinates between the depth map including defective pixels at the input layer and the depth map from which the defective pixels have disappeared at the output layer can be identified as a defective pixel.

Note that, in a case where a normal depth map is input as the distance measurement information 751 to the input layer, a depth map not including any defective pixel is output as the distance measurement information 752 from the output layer. Accordingly, there is not a pixel having a large difference in coordinates between the depth map at the input layer and the depth map at the output layer, and no defective pixels are identified.

Referring now to FIG. 33, a defective pixel identifying process using the learning model shown in FIG. 32 is described. The identifying process shown in FIG. 33 is a process corresponding to a case where the machine learning process is performed in step S151 in FIG. 27.

In step S311, using a neural network (FIG. 32) that has learned a normal depth map with an autoencoder, the processing unit 612 inputs a depth map including defective pixels as the learning model 621 to the input layer, and outputs a depth map in which the defective pixels have been corrected from the output layer.

In step S312, the processing unit 612 identifies the defective pixels included in the depth map, on the basis of the positional information in the depth map input to the input layer and the positional information in the depth map output from the output layer. For example, the pixels having different positional information between the depth map input to the input layer and the depth map output from the output layer can be identified as defective pixels.

As described above, in a case where a learning model using an autoencoder is used when the machine learning process is performed in the identifying process, the positional information in the depth map input to the input layer and the positional information in the depth map output from the output layer are used, so that defective pixels can be identified.

Figure 34:
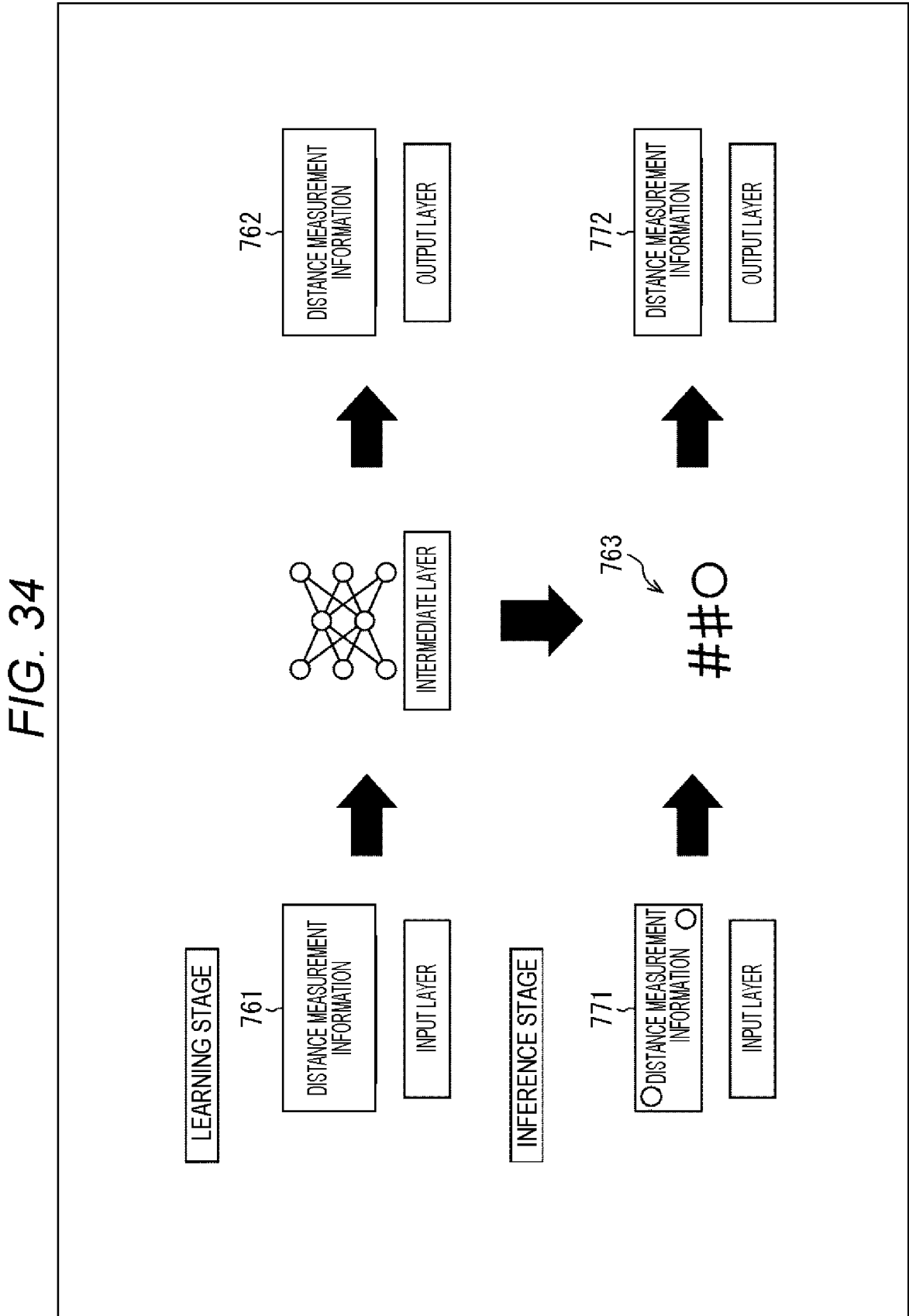
FIG. 34 is a diagram showing an example method for correcting defective pixels using an autoencoder.
Figure 35:
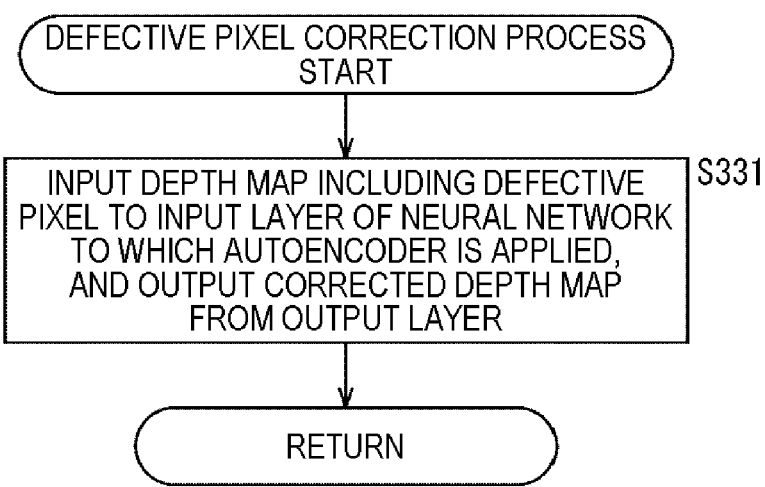
FIG. 35 is a flowchart for explaining a defective pixel correction process.

(A-1, B-1) Example Case where the Machine Learning Process is Performed in a Series of Identifying and Correction Processes Referring now to FIGS. 34 and 35, a case where the machine learning process is performed in the identifying process and the correction process being performed as a series of processes is described. In this example, in machine learning using a neural network, an autoencoder is also used to correct defective pixels.

FIG. 34 shows an example method for correcting defective pixels using an autoencoder. In FIG. 34, the learning process in the learning stage is shown in the upper portion, and the inference process in the inference stage is shown in the lower portion, as in FIG. 32.

In the learning stage, in a case where a normal depth map not including any defective pixel is input as distance measurement information 761 to the input layer, the learning process is performed, and a depth map not including any defective pixel is output as distance measurement information 762 from the output layer. At this point of time, parameters that are optimized so that the input normal depth map and the reconfigured depth map have the same value can be extracted as feature amounts 763.

In the inference stage, in a case where a depth map including defective pixels is input as distance measurement information 771 to the input layer, the inference process using a learning model (neural network) reflecting the feature amounts 763 obtained in the learning stage is performed. However, the portions of the defective pixels cannot be reconfigured, and a depth map including substantially no defective pixels is obtained. Here, in the inference process using the learning model, the pixels having different positional information between the depth map input to the input layer and the depth map output from the output layer are corrected as defective pixels.

For example, in a case where each pixel is expressed in an X-Y-Z coordinate system in a depth map, a pixel having a large difference in coordinates between the depth map including defective pixels at the input layer and the depth map from which the defective pixels have disappeared at the output layer can be corrected as a defective pixel. In the defective pixel correction, the process target pixel can be moved to the foreground object or the background object, or be deleted, as in the process described above with reference to FIG. 18 or 20.

That is, the processing unit 612 of the electronic apparatus 601 in FIG. 24 performs the inference process shown in FIG. 34, to integrally (simultaneously) identify and correct the defective pixels included in the depth map. As the inference process is performed in this manner, a depth map in which the defective pixels have been corrected can be output as distance measurement information 772 from the output layer.

Referring now to FIG. 35, a defective pixel correction process using the learning model shown in FIG. 34 is described. The correction process shown in FIG. 35 is a process corresponding to a case where the machine learning process is performed in step S131 in FIG. 26.

In step S331, using a neural network (FIG. 34) that has learned a normal depth map with an autoencoder, the processing unit 612 inputs a depth map including defective pixels as the learning model 621 to the input layer, and outputs a depth map in which the defective pixels have been corrected from the output layer.

As described above, in a case where a learning model using an autoencoder is used when the machine learning process is performed in a series of identifying and correction processes, as a result of inputting of a depth map including defective pixels to the input layer, a depth map in which the defective pixels have been corrected is output from the output layer. Thus, the defective pixels can be corrected.

Figure 36:
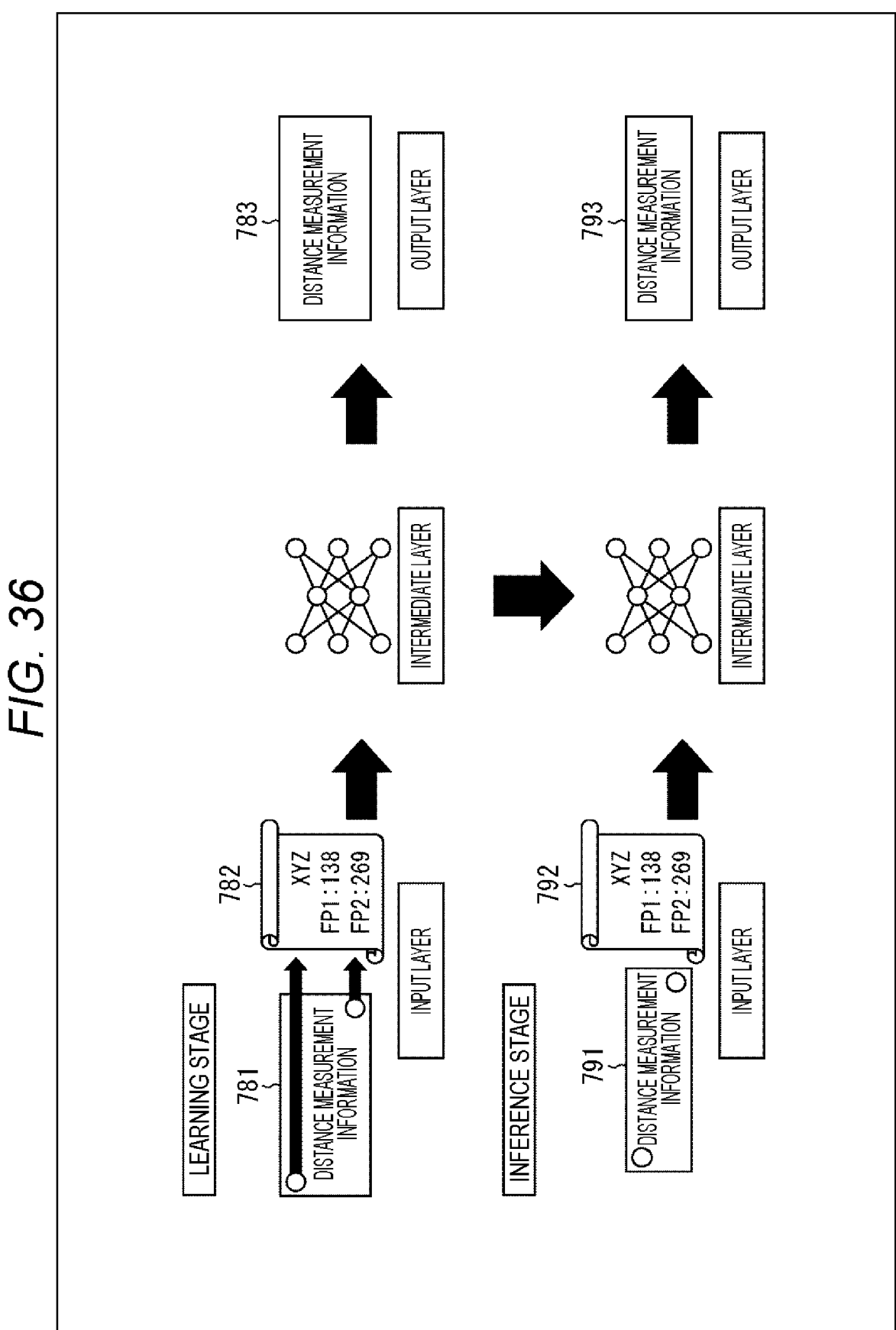
FIG. 36 is a diagram showing an example of a learning model.
Figure 37:
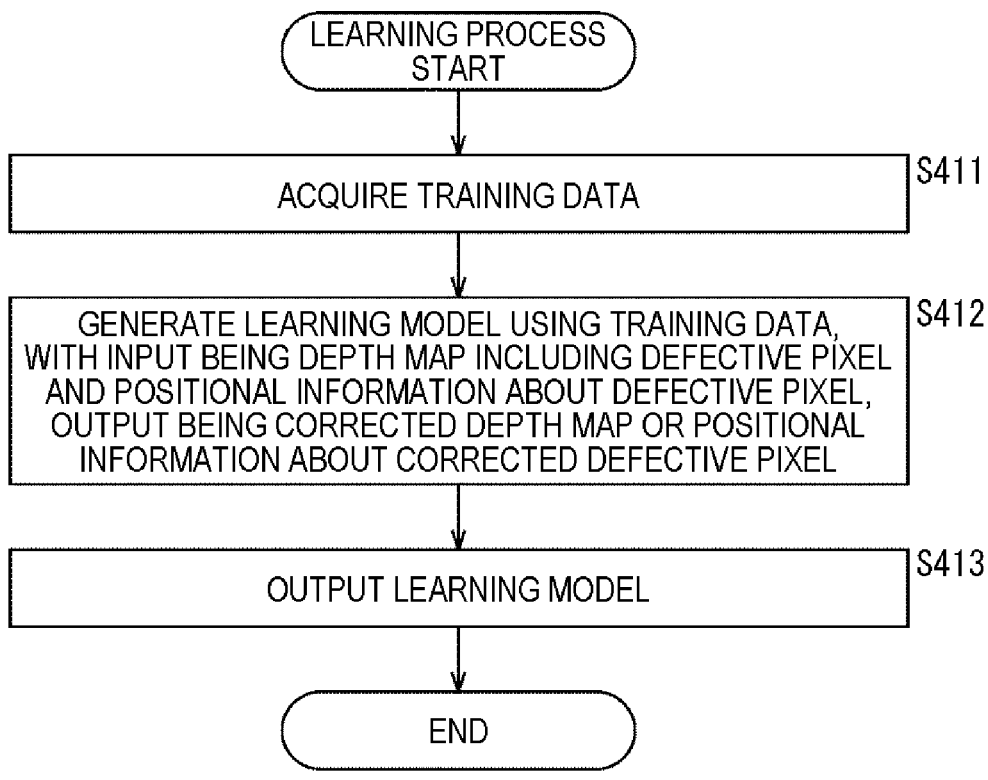
FIG. 37 is a flowchart for explaining a learning process for generating the learning model.

(B-1) Example Case where the Machine Learning Process is Performed in the Correction Process Referring now to FIGS. 36 to 37, a case where the machine learning process is performed and used in the correction process is described.

FIG. 36 shows an example of a learning model generated by the generation unit 703 of the learning device 701 in FIG. 29. In FIG. 36, the learning process in the learning stage is shown in the upper portion, and the inference process in the inference stage is shown in the lower portion.

In the learning stage, a depth map including defective pixels and positional information about the defective pixels, and a corrected depth map or positional information about the corrected defective pixels are used as training data. In FIG. 36, the learning process using these pieces of training data is performed, to generate a learning model that receives an input of distance measurement information 781 (a depth map including defective pixels) and positional information 782 about the defective pixels (coordinate information about the defective pixels), and outputs distance measurement information 783 (a corrected depth map).

Note that, in the defective pixel correction, the process target pixel can be moved to the foreground object or the background object, or be deleted, as in the process described above with reference to FIG. 18 or 20. Further, although FIG. 36 shows a case where the output of the learning model is a corrected depth map, the learning process may be performed, with the output of the learning model being the positional information about the corrected defective pixels. As for the positional information about the defective pixels, coordinate information expressing the positions of the defective pixels in an X-Y-Z coordinate system can be used.

In the inference stage, the learning model generated in the learning process is used, and the inference process is performed on distance measurement information 791 (a depth map including defective pixels) and positional information 792 about the defective pixels (coordinate information about the defective pixels) input to the input layer, so that distance measurement information 793 (a corrected depth map) is output from the output layer. Note that, instead of a corrected depth map, positional information about the corrected defective pixels may be output.

Referring now to FIG. 37, a learning process for generating the learning model shown in FIG. 36 is described.

In step S411, the generation unit 703 acquires training data. This training data includes a depth map including defective pixels and positional information about the defective pixels, and a corrected depth map or positional information about the corrected defective pixels. In addition to measurement data, data generated by a simulator can be used as the training data.

In step S412, using the acquired training data, the generation unit 703 generates a learning model that receives an input of a depth map including defective pixels and positional information about the defective pixels, and outputs a corrected depth map or positional information about the corrected defective pixels. This learning model (FIG. 36) is used as a learning model for correcting the defective pixels included in the depth map.

In step S413, the output unit 704 outputs the learning model generated by the generation unit 703. This learning model (FIG. 36) is supplied to the processing unit 612 and the like of the sensor 602 in the electronic apparatus 601, and is used in the correction process for correcting defective pixels.

As described above, in a case where the machine learning process is performed in the correction process, a learning model that receives an input of a depth map including defective pixels and positional information about the defective pixels, and outputs a corrected depth map or positional information about the corrected defective pixels is used, so that the identified defective pixels can be corrected.

Note that, in another example case where the machine learning process is performed in the correction process, defective pixels can be corrected with the use of a generative adversarial network (GAN). A GAN is formed with two networks: a generation network (a generator) and an identification network (a discriminator). In the learning stage, a normal depth map is used, and training is performed so that a depth map can be generated from random values. In the inference stage, when a depth map including defective pixels is input, the generation network (generator) generates a depth map using parameters designed for generating a depth map similar to the input depth map, and the generated depth map can be set as a corrected depth map. Alternatively, the identification network (discriminator) determines the loss in a depth map, so that defective pixels can be detected and corrected. Note that, although a GAN has been described as an example, a neural network such as a U-net may also be used.

Example Usage of a Depth Map

Note that, in the above description, cases where the machine learning process is used have been mainly explained. However, after defective pixels included in a depth map are identified in the regular processing, a depth map in which the identified defective pixels have been corrected may be generated, and the corrected depth map may be used.

Figure 38:
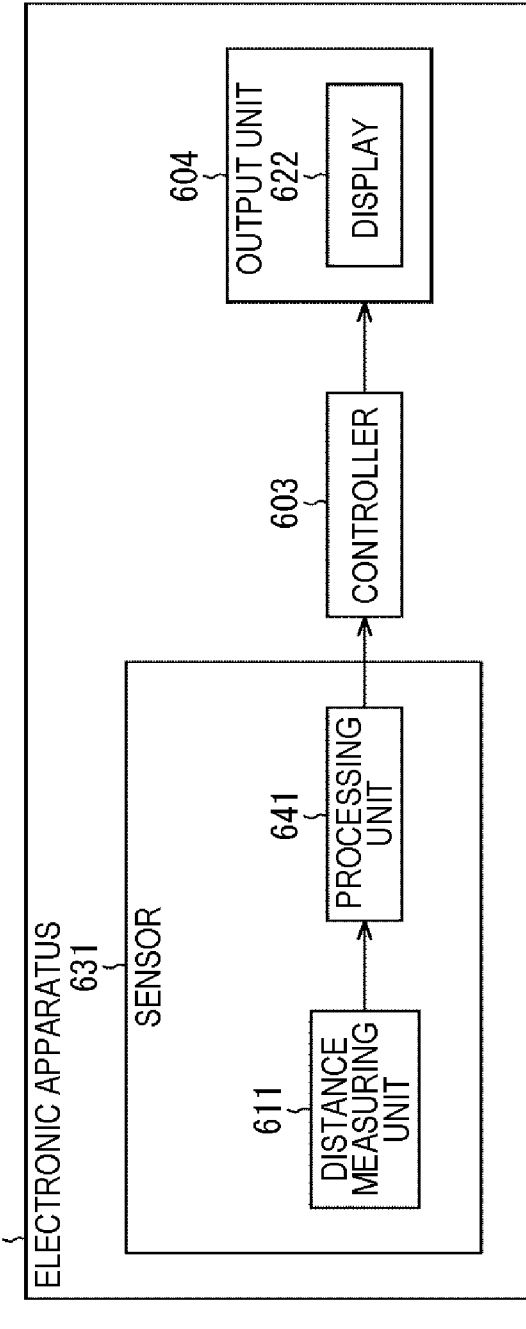
FIG. 38 is a diagram showing another example configuration of an embodiment of an electronic apparatus to which the present technology is applied.

FIG. 38 is a diagram showing another example configuration of an embodiment of an electronic apparatus to which the present technology is applied.

The electronic apparatus 601 in FIG. 38 differs from the electronic apparatus 601 in FIG. 24 in including a sensor 631 in place of the sensor 602. The sensor 631 in FIG. 38 differs from the sensor 602 in FIG. 24 in including a processing unit 641 in place of the processing unit 612. Note that, in the electronic apparatus 601 in FIG. 38, the components corresponding to those of the electronic apparatus 601 in FIG. 24 are denoted by the same reference numerals as those in FIG. 24, and explanation of them is not made herein.

Figure 39:
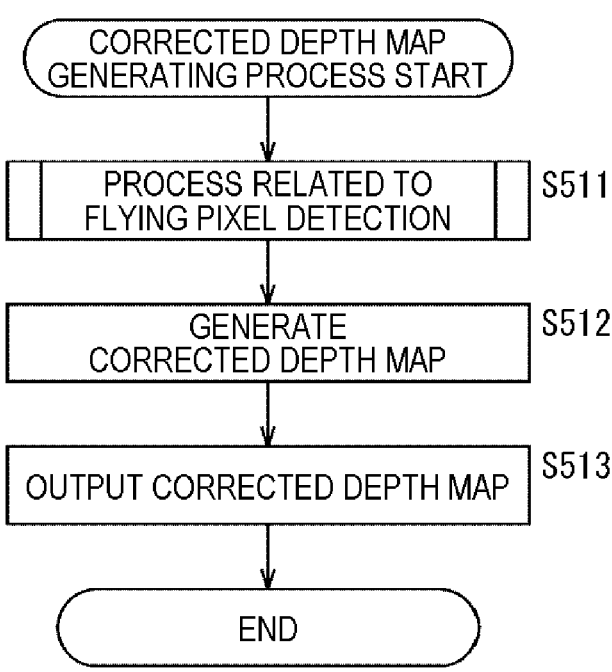
FIG. 39 is a flowchart for explaining a corrected depth map generating process.

The processing unit 641 generates a corrected depth map, using distance measurement information supplied from the distance measuring unit 611. Referring now to FIG. 39, a corrected depth map generating process is described.

In step S511, the distance measuring unit 611 performs a process related to flying pixel detection. In this process related to flying pixel detection, as described above with reference to FIG. 18 or 20, a process can be performed to identify a defective pixel, on the basis of a result of distance information threshold determination as to the process target pixel in the depth map, or confidence information or reflectance information threshold determination.

In step S512, the processing unit 641 corrects the defective pixel identified in the depth map, and generates a corrected depth map. In the defective pixel correction, the process target pixel in the depth map is changed to the correct position, or is deleted.

In step S513, the processing unit 641 outputs the generated corrected depth map. The corrected depth map may of course be used inside the electronic apparatus 601, and may also be supplied to an external device. For example, the uncorrected depth map can be supplied, together with the corrected depth map, to the learning device 701. With this arrangement, the learning device 701 can generate a learning model, using the data set of the uncorrected depth map and the corrected depth map as the training data.

<Process Subject in the Machine Learning Process>

Figure 40:
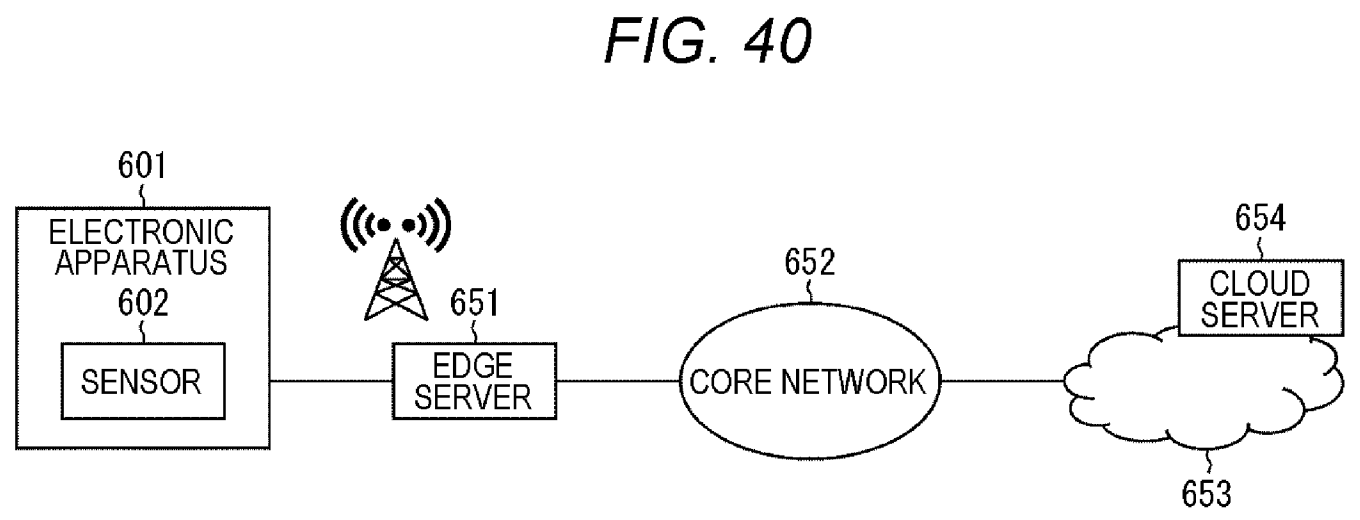

In the configuration using the machine learning described above, the processing unit 612 in the sensor 602 performs the machine learning process in the electronic apparatus 601. However, the machine learning process is not necessarily performed by the processing unit 612 in the sensor 602, but may be performed by some other device. FIG. 40 shows an example of a device that performs the machine learning process in a case where the electronic apparatus 601 is a mobile terminal.

In FIG. 40, the electronic apparatus 601 is a mobile terminal such as a smartphone, and can be connected to another network such as the Internet 653 via a core network 652, being connected to a base station installed at a predetermined place. In FIG. 40, an edge server 651 for implementing mobile edge computing (MEC) is disposed at a location closer to the mobile terminal, such as a location between the base station and the core network 652. Note that the edge server 651 may be provided in the core network 652. Further, a cloud server 654 is connected to the Internet 653. The edge server 651 and the cloud server 654 can perform various kinds of processes depending on purposes of use.

In FIG. 40, the machine learning process is performed by the electronic apparatus 601, the sensor 602, the edge server 651, or the cloud server 654. In each device, the machine learning process is performed by a processor such as a CPU executing a program, or is performed by dedicated hardware, for example. Note that, other than a CPU, a graphics processing unit (GPU), a general-purpose computing on graphics processing unit (GPGPU), a quantum computer, or the like may be used.

A configuration in which the processing unit 612 in the sensor 602 performs the machine learning process is as described above. The external configuration of the sensor 602 can be like a configuration shown in FIG. 41, for example.

In FIG. 41, the sensor 602 can be formed as a one-chip semiconductor device having a stack structure in which a plurality of substrates is stacked. The sensor 602 is formed by stacking two substrates: a substrate 951 and a substrate 952. In FIG. 41, a distance measuring unit 911 is mounted on the upper substrate 951. Components from a distance measurement processing unit 912 to a distance measurement control unit 915, and components from a CPU 921 to an input interface 926 are mounted on the lower substrate 952.

The distance measuring unit 911, and the components from the distance measurement processing unit 912 to the distance measurement control unit 915 constitute a distance measuring block 901. The components from the CPU 921 to the input interface 926 constitute a signal processing block 902. For example, the distance measuring block 901 corresponds to the distance measuring unit 611 in FIG. 24, and the signal processing block 902 corresponds to the processing unit 612 in FIG. 24. That is, in the stack structure in which the upper and lower substrates are stacked, a chip for the machine learning process is mounted on the lower substrate 952.

As such a configuration is adopted, the distance measurement information acquired by the distance measuring block 901 that is designed for distance measurement and is mounted on the upper substrate 951 or the lower substrate 952 is processed by the signal processing block 902 that is designed for the machine learning process and is mounted on the lower substrate 952. Thus, a series of processes can be performed in the one-chip semiconductor device. Note that, in a case where the signal processing block 902 corresponds to the processing unit 612 in FIG. 24, processes such as the machine learning process may be performed by the CPU 921.

As a series of processes are performed in the one-chip semiconductor device in this manner, information does not leak to the outside, which is preferable from the viewpoint of privacy protection. Furthermore, there is no need to transmit information. Thus, the signal processing block 902 can perform the machine learning process such as the inference process at high speed, using the distance measurement information supplied from the distance measuring block 901. For example, when the sensor is used in a game or the like that requires real-time properties, sufficient real-time properties can be secured. Further, when the machine learning process is performed in the signal processing block 902, various kinds of metadata are passed by the controller 603 or a digital signal processor (DSP) in the electronic apparatus 601. Thus, processes can be reduced, and power consumption can be lowered.

Note that the sensor 602 may have a configuration that includes a companion chip. For example, in a case where the sensor 602 includes a first semiconductor element that has the distance measuring unit 611 including the light receiving unit 12, the light emitting unit 14, and the like, and a second semiconductor element that includes the processing unit 612 designed as a signal processing circuit, the second semiconductor element can be formed as a companion chip. The first semiconductor element and the second semiconductor element can be integrated as a module. Further, the first semiconductor element and the second semiconductor element can be formed on the same substrate.

As described above, in the sensor 602, the companion chip includes the processing unit 612 designed as a signal processing circuit. Thus, the companion chip can perform the regular processing and the machine learning process. With this arrangement, even in a case where it is necessary to perform high-load signal processing as the regular processing or the machine learning process, the companion chip specialized for the performance of such signal processing can perform the processing. Particularly, as the processing unit 612 designed as a signal processing circuit performs the signal processing with hardware, the signal processing can be performed at higher speed and with lower power consumption than in a case where signal processing is performed with software.

Referring back to FIG. 40, the electronic apparatus 601 includes the controller 603 such as a CPU, but the controller 603 may perform the machine learning process. The machine learning process includes the learning process or the inference process. In a case where the controller 603 of the electronic apparatus 601 performs the inference process, the inference process can be performed without requiring time after distance measurement information is acquired by the distance measuring unit 611. Thus, high-speed processing can be performed. Accordingly, when the electronic apparatus 601 is used in a game or some other application that requires real-time properties, the user can perform an operation without having a feeling of strangeness caused by a delay. Further, in a case where the controller 603 of the electronic apparatus 601 performs the machine learning process, the process can be performed at lower costs than in a case where the cloud server 654 is used.

The processor of the edge server 651 may perform the machine learning process. Since the edge server 651 is provided at a position physically closer to the electronic apparatus 601 than the cloud server 654, it is possible to realize a lower process delay. The edge server 651 also has a higher processing ability such as a higher operation speed compared with the electronic apparatus 601 and the sensor 602. Accordingly, the edge server 651 can be designed for general purposes, and can perform the machine learning process whenever it successfully receives data, regardless of variations in specifications and performance of the electronic apparatus 601 and the sensor 602. In a case where the edge server 651 performs the machine learning process, it is possible to reduce the processing load on the electronic apparatus 601 and the sensor 602.

The processor of the cloud server 654 may perform the machine learning process. The cloud server 654 has a high processing ability such as a high operation speed, and thus, can be designed for general purposes. Accordingly, in a case where the cloud server 654 performs the machine learning process, the machine learning process can be performed, regardless of variations in specifications and performance of the electronic apparatus 601 and the sensor 602. Further, in a case where it is difficult for the processing unit 612 in the sensor 602 or the controller 603 in the electronic apparatus 601 to perform a high-load machine learning process, the cloud server 654 may perform the high-load machine learning process, and feed back the processing result to the processing unit 612 in the sensor 602 or the controller 603 in the electronic apparatus 601.

As described above, the processor of the electronic apparatus 601, the sensor 602, the edge server 651, or the cloud server 654 has at least one function (some or all of the functions) of the processing unit 612 and the generation unit 703, to perform the machine learning process. Also, the processor in each device may perform all the processes. Alternatively, after some of the processes are performed by the processor in a certain device, the remaining processes may be performed by the processor in another device.

Note that the machine learning process may be performed by a device other than the devices shown in FIG. 40. For example, the machine learning process may be performed by some other electronic apparatus to which the electronic apparatus 601 can be connected by wireless communication or the like. Specifically, in a case where the electronic apparatus 601 is a smartphone, examples of other electronic apparatuses can include a smartphone, a tablet terminal, a mobile telephone, a personal computer, a game machine, a television receiver, a wearable terminal, a digital still camera, and a digital video camera.

Also, in a case where a sensor mounted on a mobile structure such as an automobile, a sensor to be used in a remote medical device, or the like is used other than the configuration shown in FIG. 40, the machine learning process such as the inference process can be applied, but low latency is required in those environments. In such a case, it is desirable that the controller 603 provided in the electronic apparatus 601 (including in-vehicle devices) perform the machine learning process, instead of the cloud server 654 performing the machine learning process via a network. Further, in a case where there are no environments to connect to a network such as the Internet, or in the case of a device that is used in an environment where high-speed connection cannot be performed, it is desirable that the controller 603 provided in the electronic apparatus 601 also perform the machine learning process.

Note that the machine learning method to be used in the machine learning process can be a neural network, deep learning, or the like. A neural network is a model imitating a human cranial nerve circuit, and includes three kinds of layers: an input layer, an intermediate layer (a hidden layer), and an output layer. Meanwhile, deep learning is a model using a neural network having a multilayer structure, and can learn a complex pattern hidden in a large amount of data by repeating characteristic learning in each layer.

Further, examples of problem settings in the machine learning include supervised learning, unsupervised learning, semi-supervised learning, and reinforcement learning, and any of them may be used. For example, in supervised learning, feature amounts are learned on the basis of labeled training data (learning data) that is provided. As a result, it becomes possible to derive a label attached to unknown data. Meanwhile, in unsupervised learning, a large amount of unlabeled learning data is analyzed, and feature amounts are extracted. Clustering or the like is then performed on the basis of the extracted feature amounts. As a result, it becomes possible to perform tendency analysis and future prediction on the basis of a huge amount of unknown data.

Further, semi-supervised learning is a method in which supervised learning and unsupervised learning are mixed, and is a method for repeatedly performing learning while having feature amounts automatically calculated, by supplying a huge amount of training data in unsupervised learning after the feature amounts are learned in supervised learning. Meanwhile, reinforcement learning is a method for dealing with a problem in determining an action that an agent in a certain environment should take by observing the current state.

Example Configuration of a System

Figure 42:
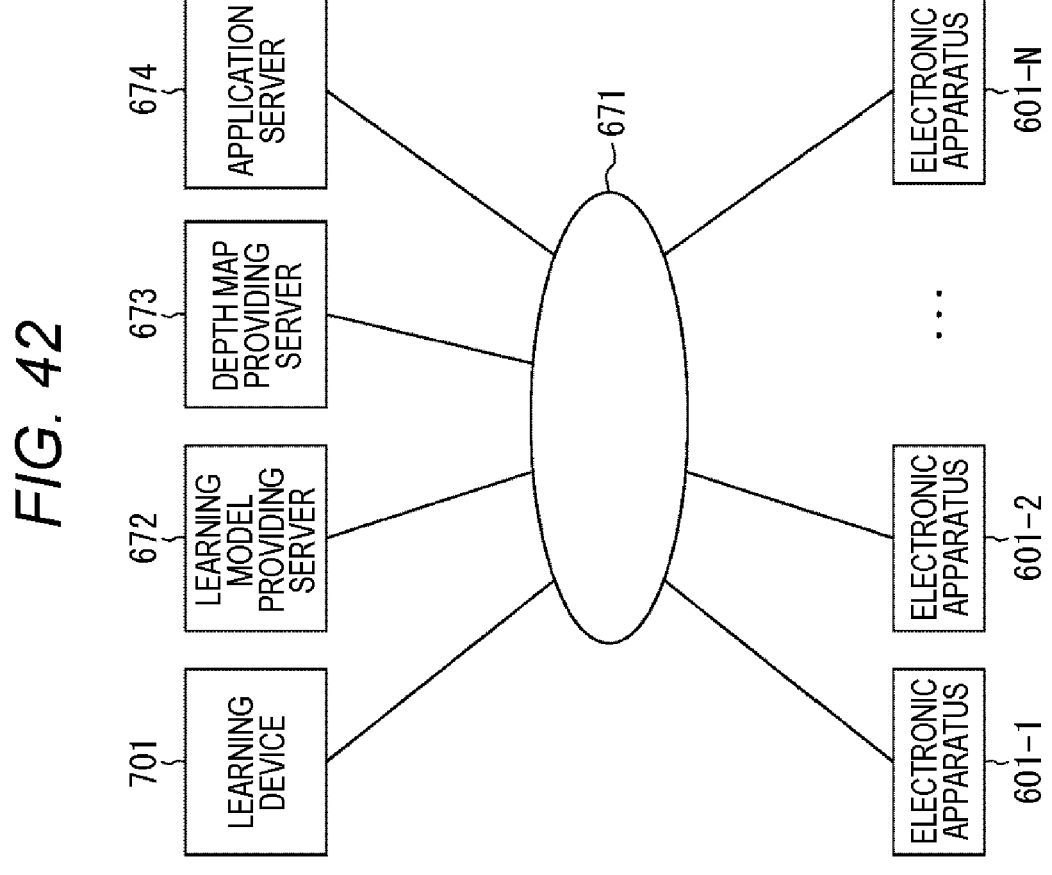
FIG. 42 is a diagram showing an example configuration of a system including devices to which the present technology is applied.

Data such as a learning model and a depth map may of course be used in a single device, and may also be exchanged between a plurality of devices and be used in those devices. FIG. 42 shows an example configuration of a system including devices to which the present technology is applied.

In FIG. 42, electronic apparatuses 601-1 to 601-N (N being an integer of 1 or greater), a learning device 701, a learning model providing server 672, a depth map providing server 673, and an application server 674 are connected to a network 671, and can exchange data with one another. The network 671 includes a mobile telephone network, the Internet, and the like. For example, the learning device 701, the learning model providing server 672, the depth map providing server 673, and the application server 674 are each provided as the cloud server 654 shown in FIG. 40.

The learning device 701 can generate a learning model using training data, and supply the learning model to the electronic apparatuses 601-1 to 601-N via the network 671. In each electronic apparatus 601, the processing unit 612 performs the machine learning process using the learning model supplied from the learning device 701. The learning model is not necessarily supplied directly from the learning device 701 to each electronic apparatus 601, but may be supplied to each electronic apparatus 601 via the learning model providing server 672 capable of providing various kinds of learning models, for example. The learning model providing server 672 may supply the learning model to a device other than the electronic apparatuses 601.

The electronic apparatuses 601-1 to 601-N can supply data processed therein such as an uncorrected depth map and a corrected depth map to other devices via the network 671. Here, an uncorrected depth map is the data output from the distance measuring unit 611, and is the data yet to be processed by the processing unit 612. A corrected depth map is the data output from the distance measuring unit 611, and is the data processed by the processing unit 612. Alternatively, the data to be supplied from the electronic apparatuses 601-1 to 601-N may include metadata or the like obtained by performing a recognition process or the like.

For example, the electronic apparatuses 601-1 to 601-N can supply an uncorrected depth map and a corrected depth map to the learning device 701 via the network 671. The learning device 701 can generate a learning model, using the uncorrected depth map and the corrected depth map gathered as training data from the respective electronic apparatuses 601. Depth maps are not necessarily supplied directly from each electronic apparatus 601 to the learning device 701, but may be supplied to the learning device 701 via the depth map providing server 673 capable of providing various kinds of depth maps, for example. The depth map providing server 673 may supply depth maps to a device other than the learning device 701.

The learning device 701 may update the learning model by performing, on the already generated learning model, a relearning process in which the depth maps gathered from the respective electronic apparatuses 601 are added to the training data. Further, in a case where the user performs a correcting operation on the corrected depth map (where the user inputs correct information, for example) in an electronic apparatus 601, data (feedback data) regarding the correction process may be used in the relearning process. For example, by notifying the learning device 701 of the feedback data from the electronic apparatus 601, the learning device 701 can perform the relearning process using the feedback data from the electronic apparatus 601, and update the learning model. Note that an application supplied from the application server 674 may be used when the user performs a correcting operation.

Although FIG. 42 shows an example case where the learning device 701 is the cloud server 654 herein, the electronic apparatuses 601 and the learning device 701 are not necessarily separate devices, and may be the same device. In a case where the electronic apparatuses 601 and the learning device 701 are the same device, the controller 603 of each electronic apparatus 601 or the processing unit 612 of the sensor 602 has the functions of the generation unit 703 of the learning device 701, for example. In a case where the electronic apparatuses 601 and the learning device 701 are formed with the same device, a common processor for executing the respective functions may be included, or separate processors may be included for the respective functions.

The learning process or the relearning process is the machine learning process, and, as described above with reference to FIG. 40, the learning process or the relearning process can be performed by the electronic apparatus 601, the sensor 602, the edge server 651, or the cloud server 654. In a case where the learning process is performed in the electronic apparatus 601 or the sensor 602, information does not leak to the outside, and thus, privacy can be protected. Further, in a case where the electronic apparatus 601 or the sensor 602 updates the learning model by performing the relearning process using a depth map or feedback data, the learning model can be improved in the device.

In a case where the relearning process is performed, the electronic apparatus 601 or the sensor 602 may transmit the updated learning model to the learning model providing server 672 so that the updated learning model is supplied to the other electronic apparatuses 601 and the other sensors 602. As a result, the updated learning model can be shared among the respective electronic apparatuses 601 and the respective sensors 602. Alternatively, the electronic apparatus 601 or the sensor 602 may transmit difference information about the relearned learning model (information about the difference between the learning model prior to the update and the updated learning model) as update information to the learning device 701, and the learning device 701 may generate an improved learning model on the basis of the update information and provide the improved learning model to the other electronic apparatuses 601 or the other sensors 602. As such difference information is exchanged, privacy can be protected, and communication costs can be lowered.

In a case where the learning process or the relearning process is performed in the cloud server 654 such as the learning device 701, the processes can be performed, regardless of variations in specifications and performance of the electronic apparatus 601 and the sensor 602. For example, the cloud server 654 can perform the learning process, using depth maps supplied as training data from the electronic apparatus 601 or the depth map providing server 673. Furthermore, when the electronic apparatus 601 or the sensor 602 acquires a depth map or feedback data, for example, the data is transmitted to the cloud server 654, so that the cloud server 654 can perform the relearning process. The learning model updated in the relearning process is supplied to the other electronic apparatuses 601 and the other sensors 602 by the learning model providing server 672. As a result, the updated learning model can be shared among the respective electronic apparatuses 601 and the respective sensors 602.

The application server 674 is a server capable of providing various kinds of applications via the network 671. The applications include an application that provides a function using a learning model or a depth map, for example. Each electronic apparatus 601 can implement a function using a learning model or a depth map, by executing the application downloaded from the application server 674 via the network 671.

Note that each electronic apparatus 601 may store a learning model provided from the learning device 701 beforehand into a storage unit such as a semiconductor memory, or may acquire a learning model from an external device such as the learning model providing server 672 via the network 671 when performing the machine learning process such as the inference process.

As described above, in a system including devices to which the present technology is applied, data such as a learning model and a depth map is exchanged and distributed among the respective devices, and various services using the data can be provided. For example, electronic apparatuses in which a learning model generated by the learning device 701 is installed can be manufactured and provided. Also, distance measurement information acquired from the sensor 602 may be input to the learning model generated by the learning device 701, and a depth map in which defective pixels have been corrected may be generated and provided as an output thereof. Further, the generated learning model, the generated corrected depth map, and three-dimensional data generated on the basis of the corrected depth map are stored into a readable recording medium, so that a storage medium storing the learning model, the corrected depth map, and the three-dimensional data, and electronic apparatuses each including the storage medium can be manufactured and provided. The storage medium may be a nonvolatile memory such as a magnetic disk, an optical disk, a magneto-optical disk, or a semiconductor memory, or may be a volatile memory such as a static random access memory (SRAM) or a dynamic random access memory (DRAM).

Example Application to an Endoscopic Surgery System

The technology (the present technology) according to the present disclosure can be applied to various products. For example, the technology according to the present disclosure may be applied to an endoscopic surgery system.

Figure 43:
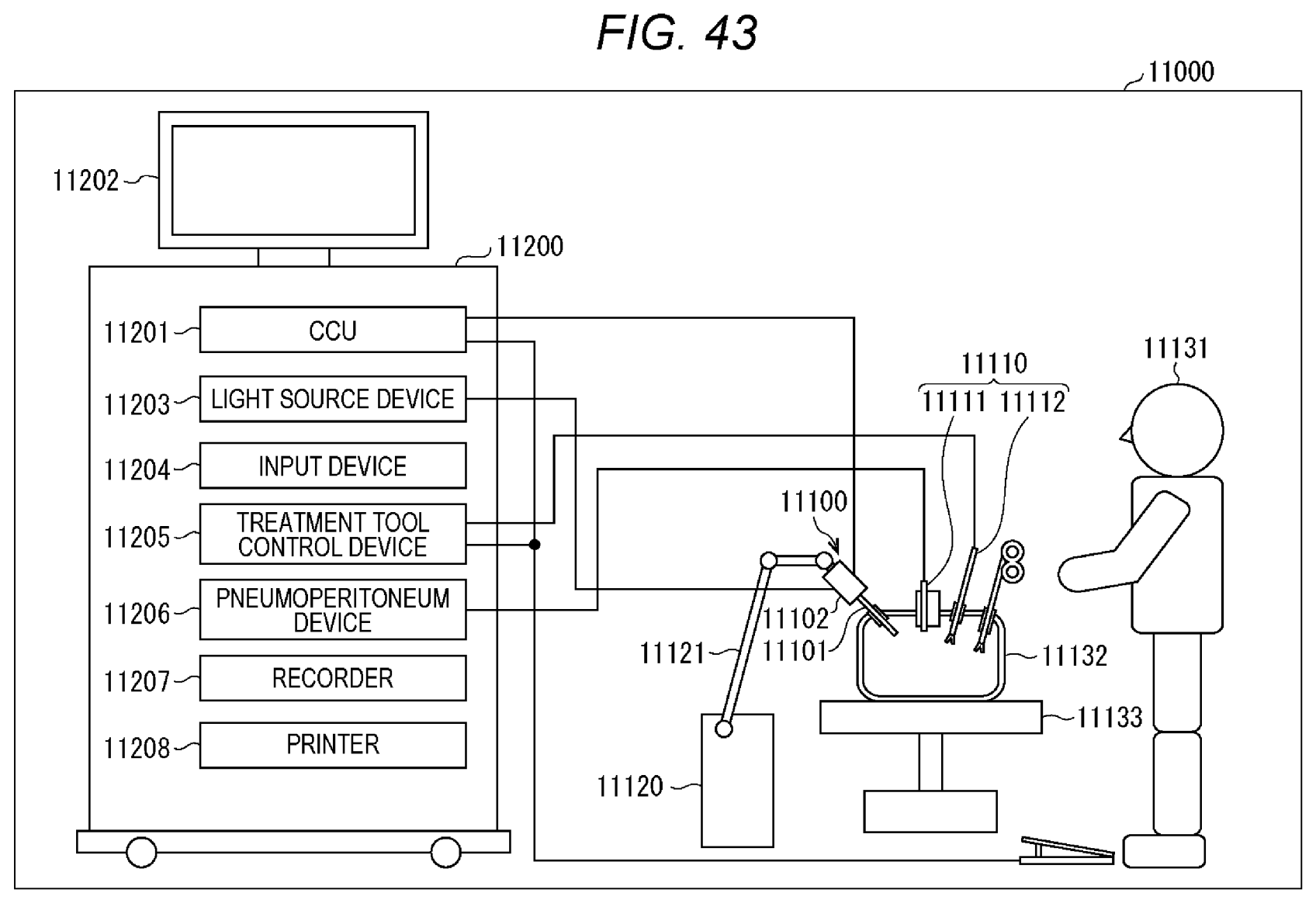

FIG. 43 is a diagram schematically showing an example configuration of an endoscopic surgery system to which the technology (the present technology) according to the present disclosure can be applied.

FIG. 43 shows a situation where a surgeon (a doctor) 11131 is performing surgery on a patient 11132 on a patient bed 11133, using an endoscopic surgery system 11000. As shown in the drawing, the endoscopic surgery system 11000 includes an endoscope 11100, other surgical tools 11110 such as a pneumoperitoneum tube 11111 and an energy treatment tool 11112, a support arm device 11120 that supports the endoscope 11100, and a cart 11200 on which various kinds of devices for endoscopic surgery are mounted.

The endoscope 11100 includes a lens barrel 11101 that has a region of a predetermined length from the top end to be inserted into a body cavity of the patient 11132, and a camera head 11102 connected to the base end of the lens barrel 11101. In the example shown in the drawing, the endoscope 11100 is designed as a so-called rigid scope having a rigid lens barrel 11101. However, the endoscope 11100 may be designed as a so-called flexible scope having a flexible lens barrel.

At the top end of the lens barrel 11101, an opening into which an objective lens is inserted is provided. A light source device 11203 is connected to the endoscope 11100, and the light generated by the light source device 11203 is guided to the top end of the lens barrel by a light guide extending inside the lens barrel 11101, and is emitted toward the current observation target in the body cavity of the patient 11132 via the objective lens. Note that the endoscope 11100 may be a forward-viewing endoscope, an oblique-viewing endoscope, or a side-viewing endoscope.

An optical system and an imaging element are provided inside the camera head 11102, and reflected light (observation light) from the current observation target is converged on the imaging element by the optical system. The observation light is photoelectrically converted by the imaging element, and an electrical signal corresponding to the observation light, or an image signal corresponding to the observation image, is generated. The image signal is transmitted as RAW data to a camera control unit (CCU) 11201.

The CCU 11201 is formed with a central processing unit (CPU), a graphics processing unit (GPU), or the like, and collectively controls operations of the endoscope 11100 and a display device 11202. Further, the CCU 11201 receives an image signal from the camera head 11102, and subjects the image signal to various kinds of image processing, such as a development process (a demosaicing process), for example, to display an image based on the image signal.

Under the control of the CCU 11201, the display device 11202 displays an image based on the image signal subjected to the image processing by the CCU 11201.

The light source device 11203 is formed with a light source such as a light emitting diode (LED), for example, and supplies the endoscope 11100 with illuminating light for imaging the surgical site or the like.

An input device 11204 is an input interface to the endoscopic surgery system 11000. The user can input various kinds of information and instructions to the endoscopic surgery system 11000 via the input device 11204. For example, the user inputs an instruction or the like to change imaging conditions (such as the type of illuminating light, the magnification, and the focal length) for the endoscope 11100.

A treatment tool control device 11205 controls driving of the energy treatment tool 11112 for tissue cauterization, incision, blood vessel sealing, or the like. A pneumoperitoneum device 11206 injects a gas into a body cavity of the patient 11132 via the pneumoperitoneum tube 11111 to inflate the body cavity, for the purpose of securing the field of view of the endoscope 11100 and the working space of the surgeon. A recorder 11207 is a device capable of recording various kinds of information about the surgery. A printer 11208 is a device capable of printing various kinds of information relating to the surgery in various formats such as text, images, graphics, and the like.

Note that the light source device 11203 that supplies the endoscope 11100 with the illuminating light for imaging the surgical site can be formed with an LED, a laser light source, or a white light source that is a combination of an LED and a laser light source, for example. In a case where a white light source is formed with a combination of RGB laser light sources, the output intensity and the output timing of each color (each wavelength) can be controlled with high precision. Accordingly, the white balance of an image captured by the light source device 11203 can be adjusted. Alternatively, in this case, laser light from each of the RGB laser light sources may be emitted onto the current observation target in a time-division manner, and driving of the imaging element of the camera head 11102 may be controlled in synchronization with the timing of the light emission. Thus, images corresponding to the respective RGB colors can be captured in a time-division manner. According to the method, a color image can be obtained without any color filter provided in the imaging element.

Further, the driving of the light source device 11203 may also be controlled so that the intensity of light to be output is changed at predetermined time intervals. The driving of the imaging element of the camera head 11102 is controlled in synchronism with the timing of the change in the intensity of the light, and images are acquired in a time-division manner and are then combined. Thus, a high dynamic range image with no black portions and no white spots can be generated.

Further, the light source device 11203 may also be designed to be capable of supplying light of a predetermined wavelength band compatible with special light observation. In special light observation, light of a narrower band than the illuminating light (or white light) at the time of normal observation is emitted, with the wavelength dependence of light absorption in body tissue being taken advantage of, for example. As a result, so-called narrow band light observation (narrow band imaging) is performed to image predetermined tissue such as a blood vessel in a mucosal surface layer or the like, with high contrast. Alternatively, in the special light observation, fluorescence observation for obtaining an image with fluorescence generated through emission of excitation light may be performed. In fluorescence observation, excitation light is emitted to body tissue so that the fluorescence from the body tissue can be observed (autofluorescence observation). Alternatively, a reagent such as indocyanine green (ICG) is locally injected into body tissue, and excitation light corresponding to the fluorescence wavelength of the reagent is emitted to the body tissue so that a fluorescent image can be obtained, for example. The light source device 11203 can be designed to be capable of supplying narrow band light and/or excitation light compatible with such special light observation.

Figure 44:
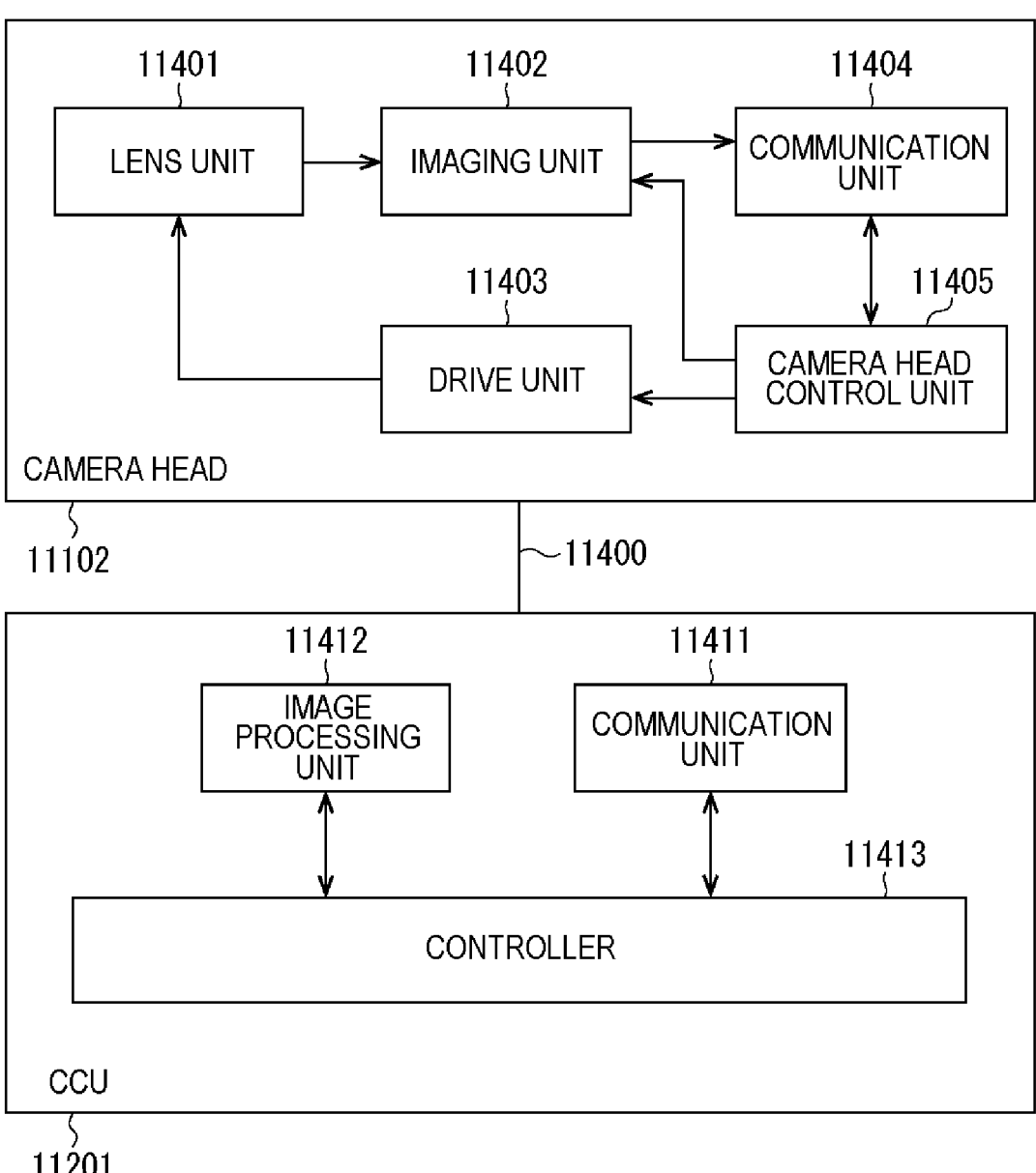
FIG. 44 is a block diagram showing an example of the functional configurations of a camera head and a CCU.

FIG. 44 is a block diagram showing an example of the functional configurations of the camera head 11102 and the CCU 11201 shown in FIG. 43.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a controller 11413. The camera head 11102 and the CCU 11201 are communicably connected to each other by a transmission cable 11400.

The lens unit 11401 is an optical system provided at the connecting portion with the lens barrel 11101. Observation light captured from the top end of the lens barrel 11101 is guided to the camera head 11102, and enters the lens unit 11401. The lens unit 11401 is formed with a combination of a plurality of lenses including a zoom lens and a focus lens.

The imaging unit 11402 may be formed with one imaging element (a so-called single-plate type), or may be formed with a plurality of imaging elements (a so-called multiple-plate type). In a case where the imaging unit 11402 is of a multiple-plate type, for example, image signals corresponding to the respective RGB colors may be generated by the respective imaging elements, and be then combined to obtain a color image. Alternatively, the imaging unit 11402 may be designed to include a pair of imaging elements for acquiring right-eye and left-eye image signals compatible with three-dimensional (3D) display. As the 3D display is conducted, the surgeon 11131 can grasp more accurately the depth of the body tissue at the surgical site. Note that, in a case where the imaging unit 11402 is of a multiple-plate type, a plurality of lens units 11401 is provided for the respective imaging elements.

Further, the imaging unit 11402 is not necessarily provided in the camera head 11102. For example, the imaging unit 11402 may be provided immediately behind the objective lens in the lens barrel 11101.

The drive unit 11403 is formed with an actuator, and, under the control of the camera head control unit 11405, moves the zoom lens and the focus lens of the lens unit 11401 by a predetermined distance along the optical axis. With this arrangement, the magnification and the focal point of the image captured by the imaging unit 11402 can be adjusted as appropriate.

The communication unit 11404 is formed with a communication device for transmitting and receiving various kinds of information to and from the CCU 11201. The communication unit 11404 transmits the image signal obtained as RAW data from the imaging unit 11402 to the CCU 11201 via the transmission cable 11400.

The communication unit 11404 also receives a control signal for controlling the driving of the camera head 11102 from the CCU 11201, and supplies the control signal to the camera head control unit 11405. The control signal includes information about imaging conditions, such as information for specifying the frame rate of captured images, information for specifying the exposure value at the time of imaging, and/or information for specifying the magnification and the focal point of captured images, for example.

Note that the above imaging conditions such as the frame rate, the exposure value, the magnification, and the focal point may be appropriately specified by the user, or may be automatically set by the controller 11413 of the CCU 11201 on the basis of an acquired image signal. In the latter case, the endoscope 11100 has a so-called auto-exposure (AE) function, an auto-focus (AF) function, and an auto-white-balance (AWB) function.

The camera head control unit 11405 controls the driving of the camera head 11102, on the basis of a control signal received from the CCU 11201 via the communication unit 11404.

The communication unit 11411 is formed with a communication device for transmitting and receiving various kinds of information to and from the camera head 11102. The communication unit 11411 receives an image signal transmitted from the camera head 11102 via the transmission cable 11400.

Further, the communication unit 11411 also transmits a control signal for controlling the driving of the camera head 11102, to the camera head 11102. The image signal and the control signal can be transmitted through electrical communication, optical communication, or the like.

The image processing unit 11412 performs various kinds of image processing on an image signal that is RAW data transmitted from the camera head 11102.

The controller 11413 performs various kinds of control relating to display of an image of the surgical portion or the like captured by the endoscope 11100, and a captured image obtained through imaging of the surgical site or the like. For example, the controller 11413 generates a control signal for controlling the driving of the camera head 11102.

Further, the controller 11413 also causes the display device 11202 to display a captured image showing the surgical site or the like, on the basis of the image signal subjected to the image processing by the image processing unit 11412. In doing so, the controller 11413 may recognize the respective objects shown in the captured image, using various image recognition techniques. As the distance measuring device 10 or the electronic apparatus 601 is used for the imaging unit 11402 and the image processing unit 11412, the controller 11413 can more correctly recognize a surgical tool such as forceps, a specific body site, bleeding, mist at a time of use of the energy treatment tool 11112, and the like, by more accurately detecting the shape and the depth of the edge of each object included in the captured image, for example. When causing the display device 11202 to display the captured image, the controller 11413 may cause the display device 11202 to superimpose various kinds of surgery aid information on the image of the surgical site on the display, using the recognition result. As the surgery aid information is superimposed and displayed, and thus, is presented to the surgeon 11131, it becomes possible to reduce the burden on the surgeon 11131, and enable the surgeon 11131 to proceed with the surgery in a reliable manner.

The transmission cable 11400 connecting the camera head 11102 and the CCU 11201 is an electrical signal cable compatible with electric signal communication, an optical fiber compatible with optical communication, or a composite cable thereof.

Here, in the example shown in the drawing, communication is performed in a wired manner using the transmission cable 11400. However, communication between the camera head 11102 and the CCU 11201 may be performed in a wireless manner.

Example Applications to Mobile Structures

The technology (the present technology) according to the present disclosure can be applied to various products. For example, the technology according to the present disclosure may be embodied as a device mounted on any type of mobile structure, such as an automobile, an electrical vehicle, a hybrid electrical vehicle, a motorcycle, a bicycle, a personal mobility device, an airplane, a drone, a vessel, or a robot.

FIG. 45 is a block diagram schematically showing an example configuration of a vehicle control system that is an example of a mobile structure control system to which the technology according to the present disclosure can be applied.

A vehicle control system 12000 includes a plurality of electronic control units connected via a communication network 12001. In the example shown in FIG. 45, the vehicle control system 12000 includes a drive system control unit 12010, a body system control unit 12020, an external information detection unit 12030, an in-vehicle information detection unit 12040, and an overall control unit 12050. Further, a microcomputer 12051, a sound/image output unit 12052, and an in-vehicle network interface (I/F) 12053 are also shown as the functional components of the overall control unit 12050.

The drive system control unit 12010 controls operations of the devices related to the drive system of the vehicle according to various programs. For example, the drive system control unit 12010 functions as control devices such as a driving force generation device for generating a driving force of the vehicle such as an internal combustion engine or a driving motor, a driving force transmission mechanism for transmitting the driving force to the wheels, a steering mechanism for adjusting the steering angle of the vehicle, and a braking device for generating a braking force of the vehicle.

The body system control unit 12020 controls operations of the various devices mounted on the vehicle body according to various programs. For example, the body system control unit 12020 functions as a keyless entry system, a smart key system, a power window device, or a control device for various lamps such as a headlamp, a backup lamp, a brake lamp, a turn signal lamp, a fog lamp, or the like. In this case, the body system control unit 12020 can receive radio waves transmitted from a portable device that substitutes for a key, or signals from various switches. The body system control unit 12020 receives inputs of these radio waves or signals, and controls the door lock device, the power window device, the lamps, and the like of the vehicle.

The external information detection unit 12030 detects information outside the vehicle equipped with the vehicle control system 12000. For example, an imaging unit 12031 is connected to the external information detection unit 12030. The external information detection unit 12030 causes the imaging unit 12031 to capture an image of the outside of the vehicle, and receives the captured image. On the basis of the received image, the external information detection unit 12030 may perform an object detection process for detecting a person, a vehicle, an obstacle, a sign, characters on the road surface, or the like, or perform a distance detection process.

The imaging unit 12031 is an optical sensor that receives light, and outputs an electrical signal corresponding to the amount of received light. The imaging unit 12031 can output an electrical signal as an image, or output an electrical signal as distance measurement information. Further, the light to be received by the imaging unit 12031 may be visible light, or may be invisible light such as infrared rays.

The distance measuring device 10 or the electronic apparatus 601 is used for the imaging unit 12031. As the distance measuring device 10 or the electronic apparatus 601 is used, it is possible to identify a pixel (a defective pixel or a flying pixel) that appears to exist between the foreground and the background, and perform a correction process by correcting the pixel to a correct position in the foreground or the background, or deleting the pixel. Accordingly, object detection can be correctly performed, and false recognition of objects can be reduced. As a result, it is possible to prevent an accident during automatic driving, for example. A machine learning process can be used for object detection. Specifically, a bounding box, or a technique semantic segmentation may be used in the object detection. In a case where a machine-learned learning model is used in a process for correcting the correction target pixel (a defective pixel or a flying pixel), the inference process using the learning model is performed inside the sensor, so that accurate object detection can be performed with a low delay. This can greatly contribute to prevention of the occurrence of an accident.

The in-vehicle information detection unit 12040 detects information about the inside of the vehicle. For example, a driver state detector 12041 that detects the state of the driver is connected to the in-vehicle information detection unit 12040. The driver state detector 12041 includes a camera that captures an image of the driver, for example, and, on the basis of detected information input from the driver state detector 12041, the in-vehicle information detection unit 12040 may calculate the degree of fatigue or the degree of concentration of the driver, or determine whether or not the driver is dozing off.

On the basis of the external/internal information acquired by the external information detection unit 12030 or the in-vehicle information detection unit 12040, the microcomputer 12051 can calculate the control target value of the driving force generation device, the steering mechanism, or the braking device, and output a control command to the drive system control unit 12010. For example, the microcomputer 12051 can perform cooperative control to achieve the functions of an advanced driver assistance system (ADAS), including vehicle collision avoidance or impact mitigation, follow-up running based on the distance between vehicles, vehicle velocity maintenance running, vehicle collision warning, vehicle lane deviation warning, or the like.

Further, the microcomputer 12051 can also perform cooperative control to conduct automatic driving or the like for autonomously running not depending on the operation of the driver, by controlling the driving force generation device, the steering mechanism, the braking device, or the like on the basis of information about the surroundings of the vehicle, the information having being acquired by the external information detection unit 12030 or the in-vehicle information detection unit 12040.

The microcomputer 12051 can also output a control command to the body system control unit 12030, on the basis of the external information acquired by the external information detection unit 12030. For example, the microcomputer 12051 controls the headlamp in accordance with the position of the leading vehicle or the oncoming vehicle detected by the external information detection unit 12030, and performs cooperative control to achieve an anti-glare effect by switching from a high beam to a low beam, or the like.

The sound/image output unit 12052 transmits an audio output signal and/or an image output signal to an output device that is capable of visually or audibly notifying the passenger(s) of the vehicle or the outside of the vehicle of information. In the example shown in FIG. 45, an audio speaker 12061, a display unit 12062, and an instrument panel 12063 are shown as output devices. The display unit 12062 may include an on-board display and/or a head-up display, for example.

Figure 46:
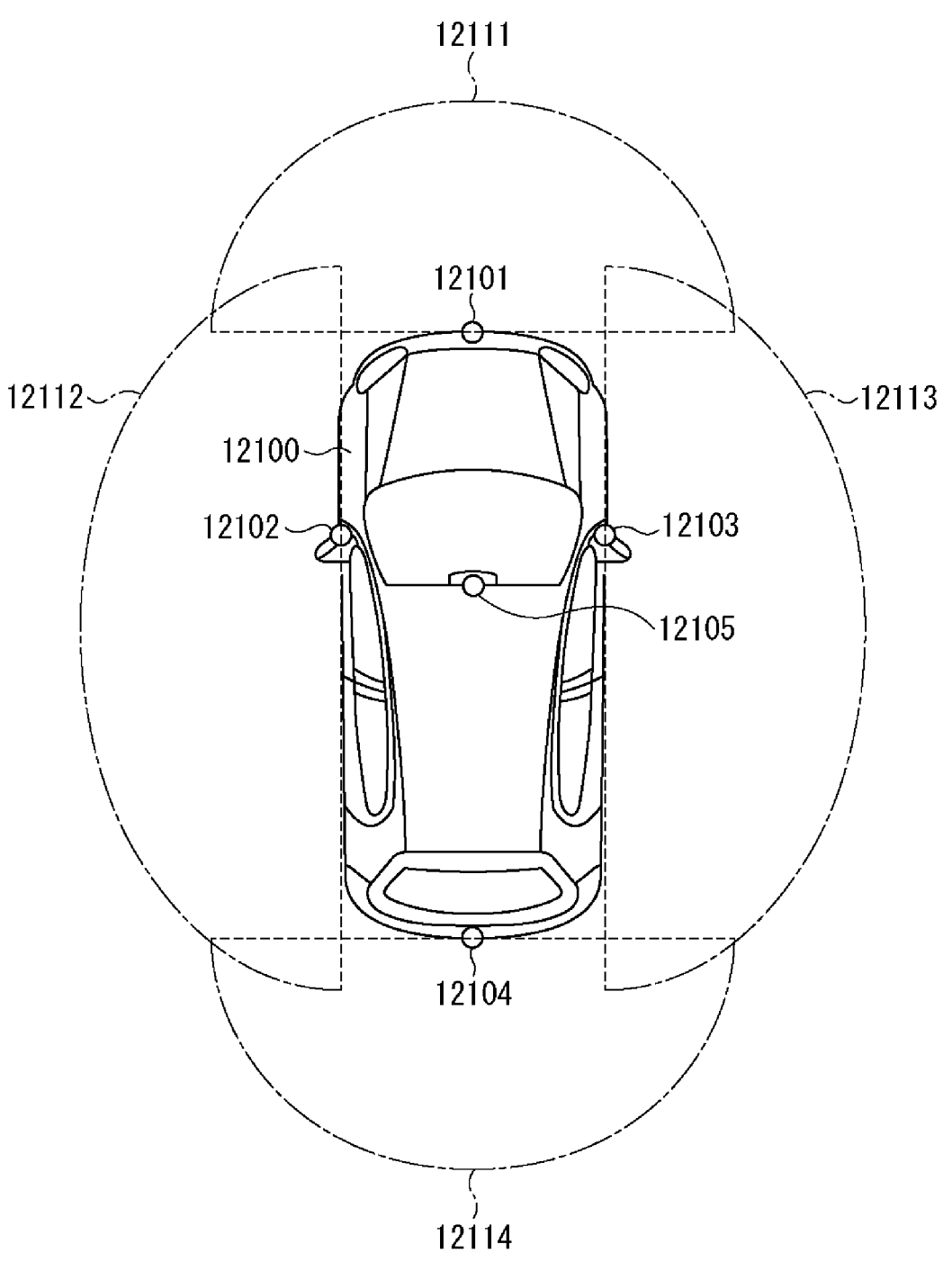
FIG. 46 is an explanatory diagram showing an example of installation positions of external information detectors and imaging units.

FIG. 46 is a diagram showing an example of installation positions of imaging units 12031.

In FIG. 46, imaging units 12101, 12102, 12103, 12104, and 12105 are included as the imaging units 12031.

Imaging units 12101, 12102, 12103, 12104, and 12105 are provided at the following positions: the front end edge of a vehicle 12100, a side mirror, the rear bumper, a rear door, an upper portion of the front windshield inside the vehicle, and the like, for example. The imaging unit 12101 provided on the front end edge and the imaging unit 12105 provided on the upper portion of the front windshield inside the vehicle mainly capture images ahead of the vehicle 12100. The imaging units 12102 and 12103 provided on the side mirrors mainly capture images on the sides of the vehicle 12100. The imaging unit 12104 provided on the rear bumper or a rear door mainly captures images behind the vehicle 12100. The imaging unit 12105 provided on the upper portion of the front windshield inside the vehicle is mainly used for detection of a vehicle running in front of the vehicle, a pedestrian, an obstacle, a traffic signal, a traffic sign, a lane, or the like.

Note that FIG. 46 shows an example of the imaging ranges of the imaging units 12101 to 12104. An imaging range 12111 indicates the imaging range of the imaging unit 12101 provided on the front end edge, imaging ranges 12112 and 12113 indicate the imaging ranges of the imaging units 12102 and 12103 provided on the respective side mirrors, and an imaging range 12114 indicates the imaging range of the imaging unit 12104 provided on the rear bumper or a rear door. For example, image data captured by the imaging units 12101 to 12104 are superimposed on one another, so that an overhead image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, on the basis of distance information obtained from the imaging units 12101 to 12104, the microcomputer 12051 calculates the distances to the respective three-dimensional objects within the imaging ranges 12111 to 12114, and temporal changes in the distances (the velocities relative to the vehicle 12100). In this manner, the three-dimensional object that is the closest three-dimensional object on the traveling path of the vehicle 12100 and is traveling at a predetermined velocity (0 km/h or higher, for example) in substantially the same direction as the vehicle 12100 can be extracted as the vehicle running in front of the vehicle 12100. Further, the microcomputer 12051 can set beforehand an inter-vehicle distance to be maintained in front of the vehicle running in front of the vehicle 12100, and can perform automatic brake control (including follow-up stop control), automatic acceleration control (including follow-up start control), and the like. In this manner, it is possible to perform cooperative control to conduct automatic driving or the like to autonomously travel not depending on the operation of the driver.

For example, in accordance with the distance information obtained from the imaging units 12101 to 12104, the microcomputer 12051 can extract three-dimensional object data concerning three-dimensional objects under the categories of two-wheeled vehicles, regular vehicles, large vehicles, pedestrians, utility poles, and the like, and use the three-dimensional object data in automatically avoiding obstacles. For example, the microcomputer 12051 classifies the obstacles in the vicinity of the vehicle 12100 into obstacles visible to the driver of the vehicle 12100 and obstacles difficult to visually recognize. The microcomputer 12051 then determines collision risks indicating the risks of collision with the respective obstacles. If a collision risk is equal to or higher than a set value, and there is a possibility of collision, the microcomputer 12051 can output a warning to the driver via the audio speaker 12061 and the display unit 12062, or can perform driving support for avoiding collision by performing forced deceleration or avoiding steering via the drive system control unit 12010.

At least one of the imaging units 12101 to 12104 may be an infrared camera that detects infrared rays. For example, the microcomputer 12051 can recognize a pedestrian by determining whether or not a pedestrian exists in images captured by the imaging units 12101 to 12104. Such pedestrian recognition is carried out through a process of extracting feature points from the images captured by the imaging units 12101 to 12104 serving as infrared cameras, and a process of performing a pattern matching on the series of feature points indicating the outlines of objects and determining whether or not there is a pedestrian, for example. If the microcomputer 12051 determines that a pedestrian exists in the images captured by the imaging units 12101 to 12104, and recognizes a pedestrian, the sound/image output unit 12052 controls the display unit 12062 to display a rectangular contour line for emphasizing the recognized pedestrian in a superimposed manner. Further, the sound/image output unit 12052 may also control the display unit 12062 to display an icon or the like indicating the pedestrian at a desired position.

In this specification, a system means an entire apparatus formed with a plurality of devices.

Note that the advantageous effects described in this specification are merely examples, and the advantageous effects of the present technology are not limited to them or may include other effects.

Note that embodiments of the present technology are not limited to the above described embodiments, and various modifications may be made to them without departing from the scope of the present technology.

Note that the present technology can also be embodied in the configurations described below.

(1)

A distance measuring device including:

a first determination unit that determines whether or not a difference in depth value between a first pixel in a depth map and a second pixel adjacent to the first pixel is larger than a first threshold; and a second determination unit that, when the first determination unit determines that the difference in distance between the first pixel and the second pixel is larger than the first threshold, determines whether or not a difference in confidence between the first pixel and the second pixel is larger than a second threshold, in which, when the second determination unit determines that the difference in confidence between the first pixel and the second pixel is larger than the second threshold, the first pixel is confirmed to be a defective pixel.

(2)

The distance measuring device according to (1), in which the second threshold is a fixed value or a variable value.

(3)

The distance measuring device according to (1) or (2), in which the second threshold is set at a value obtained by multiplying an average value of the confidences of a plurality of the second pixels by a predetermined value.

(4)

The distance measuring device according to (1) or (2), in which the second threshold is set at a value obtained by multiplying a standard deviation of the confidences of a plurality of the second pixels by a predetermined value.

(5)

The distance measuring device according to (1) or (2), in which the second threshold is set at a value obtained by multiplying a difference between the greatest value and the smallest value of the confidences of a plurality of the second pixels by a predetermined value.

(6)

The distance measuring device according to (1) or (2), in which the second threshold is set at a value obtained by multiplying the confidence of the first pixel by a predetermined value.

(7)

A distance measuring device including:

a first determination unit that determines whether or not a difference in depth value between a first pixel in a depth map and a second pixel adjacent to the first pixel is larger than a first threshold; and a second determination unit that, when the first determination unit determines that the difference in distance between the first pixel and the second pixel is larger than the first threshold, determines whether or not a difference in reflectance between the first pixel and the second pixel is larger than a second threshold, in which, when the second determination unit determines that the difference in reflectance between the first pixel and the second pixel is larger than the second threshold, the first pixel is confirmed to be a defective pixel.

(8)

The distance measuring device according to (7), in which the reflectance is a value obtained by multiplying a confidence by the square of a depth value.

(9)

The distance measuring device according to (7) or (8), in which the second threshold is a fixed value or a variable value.

(10)

The distance measuring device according to any one of (7) to (9), in which the second threshold is set at a value obtained by multiplying an average value of the reflectances of a plurality of the second pixels by a predetermined value.

(11)

The distance measuring device according to any one of (7) to (9), in which the second threshold is set at a value obtained by multiplying a standard deviation of the reflectances of a plurality of the second pixels by a predetermined value.

(12)

The distance measuring device according to any one of (7) to (9), in which the second threshold is set at a value obtained by multiplying a difference between the greatest value and the smallest value of the reflectances of a plurality of the second pixels by a predetermined value.

(13)

The distance measuring device according to any one of (7) to (9), in which the second threshold is set at a value obtained by multiplying the reflectance of the first pixel by a predetermined value.

(14)

The distance measuring device according to any one of (7) to (9), in which the second threshold is set to a sum of the square of a depth value of the first pixel and the square of a depth value of the second pixel.

(15)

A distance measuring method implemented by a distance measuring device that performs distance measurement, the distance measuring method including:

determining whether or not a difference in depth value between a first pixel in a depth map and a second pixel adjacent to the first pixel is larger than a first threshold;

determining whether or not a difference in confidence between the first pixel and the second pixel is larger than a second threshold, when the difference in distance between the first pixel and the second pixel is determined to be larger than the first threshold; and confirming the first pixel to be a defective pixel, when the difference in confidence between the first pixel and the second pixel is determined to be larger than the second threshold.

(16)

A distance measuring method implemented by a distance measuring device that performs distance measurement, the distance measuring method including:

determining whether or not a difference in depth value between a first pixel in a depth map and a second pixel adjacent to the first pixel is larger than a first threshold;

determining whether or not a difference in reflectance between the first pixel and the second pixel is larger than a second threshold, when the difference in distance between the first pixel and the second pixel is determined to be larger than the first threshold; and confirming the first pixel to be a defective pixel, when the difference in reflectance between the first pixel and the second pixel is determined to be larger than the second threshold.

(17)

A program for causing a computer to perform a process including the steps of:

determining whether or not a difference in depth value between a first pixel in a depth map and a second pixel adjacent to the first pixel is larger than a first threshold;

determining whether or not a difference in confidence between the first pixel and the second pixel is larger than a second threshold, when the difference in distance between the first pixel and the second pixel is determined to be larger than the first threshold; and confirming the first pixel to be a defective pixel, when the difference in confidence between the first pixel and the second pixel is determined to be larger than the second threshold.

(18)

A program for causing a computer to perform a process including the steps of:

determining whether or not a difference in depth value between a first pixel in a depth map and a second pixel adjacent to the first pixel is larger than a first threshold;

determining whether or not a difference in reflectance between the first pixel and the second pixel is larger than a second threshold, when the difference in distance between the first pixel and the second pixel is determined to be larger than the first threshold; and confirming the first pixel to be a defective pixel, when the difference in reflectance between the first pixel and the second pixel is determined to be larger than the second threshold.

(19)

An electronic apparatus including a processing unit that performs a process using a machine-learned learning model on at least part of first distance measurement information acquired by a sensor, and outputs second distance measurement information after a correction target pixel included in the first distance measurement information is corrected, in which the process includes:

a first process for correcting the correction target pixel, using the first distance measurement information including the correction target pixel as an input; and a second process for outputting the second distance measurement information.

(20)

The electronic apparatus according to (19), in which the first process includes a first step of identifying the correction target pixel.

(21)

The electronic apparatus according to (20), in which the first process includes a second step of correcting the identified correction target pixel.

(22)

The electronic apparatus according to (21), in which a process using the learning model is performed in the first step or the second step.

(23)

The electronic apparatus according to (21), in which a process using the learning model is performed in the first step and the second step.

(24)

The electronic apparatus according to any one of (20) to (23), in which the first distance measurement information is an uncorrected depth map, and the first step includes:

determining whether or not a difference in distance between a first pixel in a depth map and a second pixel adjacent to the first pixel is larger than a first threshold;

determining whether or not a difference in confidence or reflectance between the first pixel and the second pixel is larger than a second threshold, when the difference in distance between the first pixel and the second pixel is determined to be larger than the first threshold; and confirming the first pixel to be the correction target pixel, when the difference in confidence or reflectance between the first pixel and the second pixel is determined to be larger than the second threshold.

(25)

The electronic apparatus according to (19), in which the process further includes a third process for generating three-dimensional data on the basis of the second distance measurement information.

(26)

The electronic apparatus according to (25), in which a process using the learning model is performed in the third process.

(27)

The electronic apparatus according to (26), in which the first to the third processes are performed in an end-to-end machine learning process.

(28)

The electronic apparatus according to any one of (19) to (27), in which the first distance measurement information is an uncorrected depth map, and the second distance measurement information is a corrected depth map.

(29)

The electronic apparatus according to any one of (19) to (28), in which the correction target pixel is a defective pixel or a flying pixel.

(30)

The electronic apparatus according to any one of (19) to (29), in which the learning model includes a neural network that has learned with a data set for identifying the correction target pixel.

(31)

The electronic apparatus according to any one of (20) to (23), in which the first distance measurement information is an uncorrected depth map, and the first step includes the steps of:

inputting a depth map including the correction target pixel to an input layer of a neural network with the use of the neural network that has learned a normal depth map with an autoencoder, and outputting a depth map in which the correction target pixel has been corrected from an output layer of the neural network; and identifying the correction target pixel, on the basis of the depth map input to the input layer and positional information in the depth map output from the output layer.

(32)

The electronic apparatus according to (31), in which, in the first step, a pixel having different positional information between the depth map input to the input layer and the depth map output from the output layer is identified as the correction target pixel.

(33)

The electronic apparatus according to (28), in which the first process includes the step of inputting a depth map including the correction target pixel to an input layer of a neural network, and outputting a depth map in which the correction target pixel has been corrected from an output layer of the neural network, with the use of the neural network that has learned a normal depth map with an autoencoder.

(34)

The electronic apparatus according to any one of (19) to (33), further including the sensor, in which the sensor includes the processing unit.

(35)

The electronic apparatus according to any one of (19) to (33), in which the electronic apparatus is formed as a mobile terminal or a server.

(36)

A learning model generating method including:

acquiring training data including a depth map that is a depth map including a correction target pixel, a position of the correction target pixel having been identified in the depth map; and generating a learning model using the training data, the learning model receiving an input of the depth map including the correction target pixel and outputting positional information about the correction target pixel included in the depth map.

(37)

The learning model generating method according to (36), in which the positional information includes information regarding coordinates of the correction target pixel, or information regarding an abnormality probability of each pixel.

(38)

The learning model generating method according to (36) or (37), in which, when the learning model is generated, the positional information about the correction target pixel is acquired by:

determining whether or not a difference in distance between a first pixel in a depth map and a second pixel adjacent to the first pixel is larger than a first threshold;

determining whether or not a difference in confidence or reflectance between the first pixel and the second pixel is larger than a second threshold, when the difference in distance between the first pixel and the second pixel is determined to be larger than the first threshold; and confirming the first pixel to be the correction target pixel, when the difference in confidence or reflectance between the first pixel and the second pixel is determined to be larger than the second threshold.

(39)

A manufacturing method including the step of manufacturing an electronic apparatus in which the learning model generated by the learning model generating method according to any one of (36) to (38) is installed.

(40)

A manufacturing method including the step of manufacturing an electronic apparatus storing the learning model, by storing the learning model generated by the learning model generating method according to any one of (36) to (38) into a readable recording medium.

(41)

A depth map generating method including the steps of: inputting distance measurement information acquired from a sensor to the learning model generated by the learning model generating method according to any one of (36) to (38); and generating a depth map as an output of the learning model, a correction target pixel having been corrected in the depth map.

(42)

A manufacturing method including the step of manufacturing an electronic apparatus storing a corrected depth map, by storing the corrected depth map generated by the depth map generating method according to (41) into a readable recording medium.

(43)

A learning model generating method including:

acquiring training data that includes a depth map including a correction target pixel and positional informational about the correction target pixel, and a corrected depth map or positional informational about a corrected correction target pixel; and generating a learning model with the training data, the learning model receiving an input of the depth map including the correction target pixel and the positional information about the correction target pixel, and outputting the corrected depth map or the positional information about the corrected correction target pixel.

(44)

The learning model generating method according to (43), in which the positional information includes information regarding coordinates of the correction target pixel.

(45)

A manufacturing method including the step of manufacturing an electronic apparatus in which the learning model generated by the learning model generating method according to (43) or (44) is installed.

(46)

A manufacturing method including the step of manufacturing an electronic apparatus storing the learning model, by storing the learning model generated by the learning model generating method according to (43) or (44) into a readable recording medium.

(47)

A depth map generating method including the steps of: inputting distance measurement information acquired from a sensor to the learning model generated by the learning model generating method according to (43) to (44); and generating a depth map as an output of the learning model, a correction target pixel having been corrected in the depth map.

(48)

A manufacturing method including the step of manufacturing an electronic apparatus storing a corrected depth map, by storing the corrected depth map generated by the depth map generating method according to (47) into a readable recording medium.

(49)

A depth map generating method implemented by a distance measuring device that performs distance measurement, the depth map generating method including:

determining whether or not a difference in distance between a first pixel in a depth map and a second pixel adjacent to the first pixel is larger than a first threshold;

determining whether or not a difference in confidence or reflectance between the first pixel and the second pixel is larger than a second threshold, when the difference in distance between the first pixel and the second pixel is determined to be larger than the first threshold;

confirming the first pixel to be a correction target pixel, when the difference in confidence or reflectance between the first pixel and the second pixel is determined to be larger than the second threshold; and generating a depth map in which the confirmed correction target pixel has been corrected.

REFERENCE SIGNS LIST

10 Distance measuring device
11 Lens
12 Light receiving unit
13 Signal processing unit
14 Light emitting unit
15 Light emission control unit
16 Filter unit
31 Photodiode
41 Pixel array unit
42 Vertical drive unit
43 Column processing unit
44 Horizontal drive unit
45 System control unit
46 Pixel drive line
47 Vertical signal line
48 Signal processing unit
50 Pixel
51 Tap
61 Photodiode
62 Transfer transistor 63 FD portion
64 Reset transistor
65 Amplification transistor
66 Selection transistor
101 Foreground object
102 Background object
103, 104, 105 Edge
111, 112 Dotted line
121 Pixel group
122 Pixel group
123, 124 Pixel
150, 152, 154, 156, 158 Pixel
601 Electronic apparatus
602 Sensor
603 Controller
604 Output unit
611 Distance measuring unit
612 Processing unit
621 Learning model
701 Learning device
703 Generation unit
704 Output unit

The invention claimed is:

1. A distance measuring device comprising:

a light receiving unit configured to acquire depth information, a memory storing a program, and at least one processor configured to execute the program to perform operations comprising:

performing a first determination based on depth values acquired by the light receiving unit that determines whether or not a difference in depth value between a first pixel in a depth map and a second pixel adjacent to the first pixel is larger than a first threshold; and performing a second determination that, when the first determination determines that a difference in distance between the first pixel and the second pixel is larger than the first threshold, determines whether or not a difference in confidence between the first pixel and the second pixel is larger than a second threshold, wherein, when the second determination determines that the difference in confidence between the first pixel and the second pixel is larger than the second threshold, the first pixel is confirmed to be a defective pixel.

2. The distance measuring device according to claim 1, wherein the second threshold is one of a fixed value or a variable value.

3. The distance measuring device according to claim 1, wherein the second threshold is set at a value obtained by multiplying an average value of the confidences of a plurality of the second pixels by a predetermined value.

4. The distance measuring device according to claim 1, wherein the second threshold is set at a value obtained by multiplying a standard deviation of the confidences of a plurality of the second pixels by a predetermined value.

5. The distance measuring device according to claim 1, wherein the second threshold is set at a value obtained by multiplying a difference between a greatest value and a smallest value of the confidences of a plurality of the second pixels by a predetermined value.

6. The distance measuring device according to claim 1, wherein the second threshold is set at a value obtained by multiplying the confidence of the first pixel by a predetermined value.

7. A distance measuring method implemented by a distance measuring device that performs distance measurement, the distance measuring method comprising:

receiving signals from a light receiving unit configured to acquire depth information;

determining, based on depth values acquired by the light receiving unit, whether or not a difference in depth value between a first pixel in a depth map and a second pixel adjacent to the first pixel is larger than a first threshold;

determining whether or not a difference in confidence between the first pixel and the second pixel is larger than a second threshold, when a difference in distance between the first pixel and the second pixel is determined to be larger than the first threshold; and confirming the first pixel to be a defective pixel, when the difference in confidence between the first pixel and the second pixel is determined to be larger than the second threshold.

8. The distance measuring method according to claim 7, wherein the second threshold is one of a fixed value or a variable value.

9. The distance measuring method according to claim 7, wherein the second threshold is set at a value obtained by multiplying an average value of the confidences of a plurality of the second pixels by a predetermined value.

10. The distance measuring method according to claim 7, wherein the second threshold is set at a value obtained by multiplying a standard deviation of the confidences of a plurality of the second pixels by a predetermined value.

11. The distance measuring method according to claim 7, wherein the second threshold is set at a value obtained by multiplying a difference between a greatest value and a smallest value of the confidences of a plurality of the second pixels by a predetermined value.

12. The distance measuring method according to claim 7, wherein the second threshold is set at a value obtained by multiplying the confidence of the first pixel by a predetermined value.

13. A non-transitory computer readable medium storing a program, the program being executable by at least one processor to perform operations comprising:

receiving signals from a light receiving unit configured to acquire depth information;

determining, based on depth values acquired by the light receiving unit, whether or not a difference in depth value between a first pixel in a depth map and a second pixel adjacent to the first pixel is larger than a first threshold;

determining whether or not a difference in confidence between the first pixel and the second pixel is larger than a second threshold, when a difference in distance between the first pixel and the second pixel is determined to be larger than the first threshold; and confirming the first pixel to be a defective pixel, when the difference in confidence between the first pixel and the second pixel is determined to be larger than the second threshold.

14. The non-transitory computer readable medium according to claim 13, wherein the second threshold is one of a fixed value or a variable value.

15. The non-transitory computer readable medium according to claim 13, wherein the second threshold is set at a value obtained by multiplying an average value of the confidences of a plurality of the second pixels by a predetermined value.

16. The non-transitory computer readable medium according to claim 13, wherein the second threshold is set at a value obtained by multiplying a standard deviation of the confidences of a plurality of the second pixels by a predetermined value.

17. The non-transitory computer readable medium according to claim 13, wherein the second threshold is set at a value obtained by multiplying a difference between a greatest value and a smallest value of the confidences of a plurality of the second pixels by a predetermined value.

18. The non-transitory computer readable medium according to claim 13, wherein the second threshold is set at a value obtained by multiplying the confidence of the first pixel by a predetermined value.

* * * * *